United States Patent Office 3,790,620
Patented Feb. 5, 1974

3,790,620
ARYL ESTERS OF PHENYL KETENE CARBOXYLIC ACIDS
Kenneth Butler, Old Lyme, Conn., assignor to Pfizer Inc., New York, N.Y.
No Drawing. Original application Jan. 5, 1968, Ser. No. 695,851, now Patent No. 3,574,189, dated Apr. 6, 1971. Divided and this application Oct. 31, 1969, Ser. No. 873,087
Int. Cl. C07c 69/66
U.S. Cl. 260—471 R        8 Claims

ABSTRACT OF THE DISCLOSURE

Arylchloro (and bromo) carbonyl ketenes, arylcarboxy ketene esters and aryl carbothiolic phenylesters derived therefrom, methods for their preparation and the use of the esters as acylating agents for the production of esters of $\alpha$-carboxy and $\alpha$-carbothiolic arylacetyl derivatives of 6-amino-penicillanic acid and, by hydrolysis, the corresponding acid derivatives are described.

CROSS-REFERENCE TO RELATED APPLICATION

This application is a division of copending application Ser. No. 695,851, filed Jan. 5, 1968, now U.S. Pat. 3,574,-189.

BACKGROUND OF THE INVENTION

This invention relates to a series of novel derivatives of arylcarboxy ketenes, to methods for their preparation and to their use as intermediates for further synthesis. More particularly, it relates to a series of novel arylchlorocarbonyl ketenes and to the corresponding bromo analogs; to novel arylcarboxy- and arylcarbothiolic ketene esters derived therefrom; to the use of the esters as novel acylating agents for the acylation of amines such as 6-aminopenicillanic acid, and to the novel acyl amines thus produced.

The production of ketenes from malonic acid derivatives is described in the literature. Staudinger, Helv. Chim. Acta 8, 306 (1925), for example, prepared a series of low-molecular-weight dialkyl ketenes by the thermal decomposition of di(lower)alkyl substituted malonic anhydrides. In a modification of this method using mixed anhydrides prepared from disubstituted malonic acids and diphenyl ketene, Staudinger et al., Ibid, 6, 291 (1923) and Ber. 46, 3539 (1913) prepared various disubstituted ketenes by thermal decomposition. A still further method comprises the dehalogenation of $\alpha$-halo acyl halides with zinc (Staudinger, Ann. 356, 71 (1907); 380, 298 (1911)). By extension of this reaction, Staudinger et al., Ber. 42, 4908 (1909) prepared ethyl carbethoxy ketene by the dehalogenation of diethyl-$\alpha$-bromo-$\alpha$-ethyl malonate. Another method, the decomposition of diazo ketones, has been used to prepare certain diaryl ketenes (Smith et al., Org. Syntheses 20, 47, 1940; Gilman et al., Rec. trav. chim., 48, 464, 1929). It is further known that certain disubstituted acetyl chlorides undergo dehydrohalogenation under the influence of tertiary amines to form keto ketenes. This method, however, appears to be limited to the preparation of certain aryl and high-molecular-weight keto ketenes, all of which are relatively resistant to dimerization (Staudinger et al., Ber. 41, 594, 1908).

The reaction of phenylmalonic acid with phosphorus pentachloride (1:2 molar ratio) in ether solution is reported by Sorm et al. (Collection Czechoslov. Chem. Communs. 20, 593-6, 1955) to produce phenylmalonyl chloride. The same authors report (loc. cit.) that when the reaction is conducted in the absence of a solvent at the reflux temperature, phenylchloromalonyl chloride is produced. Both products are isolated by vacuum distillation.

The preparation of lower alkyl esters of phenylcarboxy ketene by thermal decomposition of diazoketo esters has been described by Staudinger et al. (Ber. 49, 2522, 1916). However, the method used by Staudinger is rather complex and results, on an overall basis, in rather poor yields. The process of the present invention for making such esters, on the other hand, is simple and productive of satisfactory yields.

The use of ketenes as acetylating agents is well known in the art. The acylation of amino groups by means of simple or mixed acid anhydrides, acid halides, acid azides, $\beta$-thiolacetones, acylated enols and carboxylic acids with carbodiimides is also known in the art (Sheehan, U.S. Pat. 3,159,617, Dec. 1, 1964). However, the introduction of $\alpha$-carboxy arylacetyl groups into 6-aminopenicillanic acid has, up until now, been limited to the use of a simple or mixed anhydride, an acid halide of an arylmalonic acid or an aryl malonic acid ester as acylating agent (U.S. Pat. 3,142,673, British Pat. 1,004,670).

SUMMARY OF THE INVENTION

It has now been unexpectedly found that a variety of aryl chlorocarbonyl ketenes, and the corresponding bromo analogs, can readily be prepared by the reaction of aryl malonic acids with a halogenating agent followed by vacuum distillation of the reaction product thus formed. The process and the compounds produced are summarized by the reaction:

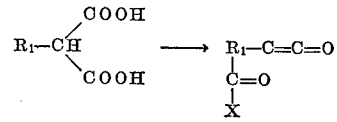

wherein $R_1$, broadly referred to herein as an aryl group, is selected from the group consisting of: thienyl, furyl, pyridyl, phenyl, and substituted phenyl wherein the substituent is selected from the group consisting of (lower)alkyl, chloro, bromo, (lower)alkoxy, di(lower)alkylamino and trifluoromethyl, and X is selected from the group consisting of chloro and bromo.

The process of this invention, in view of the teaching of Sorm et al. (loc. cit.) that phenylmalonyl chloride and phenylchloromalonyl chloride are obtained by the action of phosphorus pentachloride on phenylmalonic acid in the presence of a solvent and the products recovered by vacuum distillation, is most surprising and unexpected. Repetition of the Sorm et al. procedure for making phenylmalonyl chloride has been found to produce phenylchlorocarbonyl ketene rather than phenylmalonyl chloride. The existence of the ketene compound was completely unrecognized by Sorm et al.

The process, in general, comprises reacting an aryl substituted malonic acid with a halogenating agent selected from the group consisting of $P(X)_5$, $P(X)_3$, $PO(X)_3$ and $SO(X)_2$ wherein X is as defined above at a temperature of from about 0° C. to about 50° C. The dihalide thus produced is thermally decomposed at about 80°–100° C. to provide the aryl halocarbonyl ketene.

The arylhalocarbonyl ketenes exhibit a dual functionality and react both as acid halides and ketenes. They are, therefore, valuable as intermediates for further synthesis. Alcohols ($R_2$—OH) and thiophenols ($R_7SH$) for example, react with the arylhalocarbonyl ketenes at low temperatures, e.g. from about −70° C. to about 30° C. to produce the corresponding esters of aryl carboxy and arylcarbothiolic ketenes which are useful as acylating agents. Reaction appears to occur first with the ketene group to form a transient intermediate

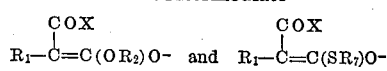

which rearranges with elimination of hydrogen halide to the arylcarboxy and arylcarbothiolic ketene ester.

The novel arylcarboxy and arylcarbothiolic ketene esters of this invention are especially valuable as agents for the acylation of amines with production of esters of α-carbothiolic and α-carboxy-α-arylacetyl amines. They are particularly useful for the acylation of amines such as 6-aminopenicillanic acid for the production of known and novel antibacterial agents. Prior art methods for introducing α-carboxy arylacetyl groups into amino compounds such as 6-aminopenicillanic acid have made use of acid anhydrides, mixed or simple, or acid halides of aryl malonic acids. The use of the prior acylating agents requires extreme caution during reaction and recovery steps in order to obtain satisfactory yields and avoid decarboxylation of the carboxy group. The acylating agents of this invention on the other hand react smoothly and rapidly with amines at low temperatures and produce no undesirable by-products.

The acid halides and esters of the aryl carboxy ketenes form 3-aryl substituted 2-oxo-oxetenes (1,3-epoxypropenes) in solution. These compounds react in a manner analogous to that of the compounds from which they are derived.

The above reactions are summarized in the following sequence:

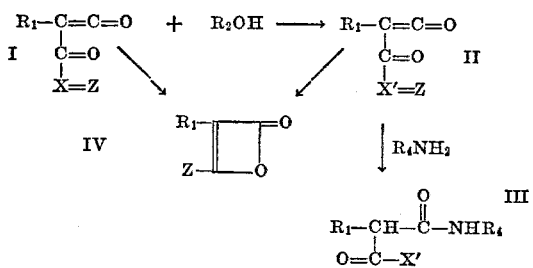

wherein $R_1$ and X are as defined above; X' is selected from the group consisting of $OR_2$ and $SR_7$ wherein $R_2$ is selected from the group consisting of phenyl and
substituted phenyl wherein the substituent is selected from the group consisting of at least one of chloro, bromo, fluoro, lower alkyl, lower alkoxy, lower alkanoyl, carbo(lower)alkoxy, nitro, and di(lower)alky amino;
furyl
quinolyl
methyl substituted quinolyl
phenazinyl
9,10-anthraquinonyl
phenanthrenequinonyl
anthracenyl
phenanthryl
(1,3-benzodioxolyl)
3-(2-methyl-4-pyronyl)
3-(4-pyronyl) and
N-methylpyridyl;

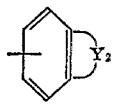

wherein $Y_2$ is selected from the group consisting of:
—CH=CH—O—
—CH=CH—S—
—CH$_2$—CH$_2$—S—
—CH=N—CH=CH—
—CH=CH—CH=CH—
—C(O)—CH=CH—C(O)— and
—C(O)—C(O)—CH=CH—;

and

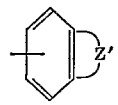

wherein Z' is lower alkylene and is selected from the group consisting of —(CH$_2$)$_3$— and —(CH$_2$)$_4$—, and substituted derivatives thereof wherein the substituent is selected from the group consisting of methyl, chloro, and bromo;

benzyl and
substituted benzyl wherein the substituent is selected from the group consisting of chloro, bromo, fluoro, lower alkyl, lower alkoxy, lower alkanoyl, carbo(lower)alkoxy, nitro, and di(lower)alkylamino;
phthaimidomethyl
benzohydryl
trityl
cholesteryl
alkenyl having up to 8 carbon atoms;
alkynyl having up to 8 carbon atoms;
(1-indanyl)methyl
(2-indanyl)methyl
furylmethyl
pyridylmethyl
(2-pyrrolidono)methyl
(4-imidazolyl)methyl
[2,2-di(lower alkyl)-1,3-dioxolon-4-yl]methyl
cycloalkyl and (lower alkyl) substituted cycloalkyl having from 3 to 7 carbon atoms, in the cycloalkyl moiety;
bicyclo [4·4·0] decyl
thujyl
fenchyl
isofenchyl
7-adamantanyl
ac-indanyl and substituted derivatives thereof wherein the substituent is selected from the group consisting of methyl, chloro and bromo;
ac-tetrahydronaphthyl and substituted derivatives thereof wherein the substituent is selected from the group consisting of methyl, chloro and bromo;
alkyl and substituted lower alkyl wherein the substituent is selected from the group consisting of at least one of:
chloro
bromo
fluoro
nitro
carbo (lower alkoxy)
lower alkanoyl
lower alkoxy and
cyano;
—CH$_2$—CH$_2$—NR$_5$R$_6$
—CH$_2$—CH$_2$—CH$_2$—NR$_5$R$_6$
—CH$_2$—CH(CH$_3$)—NR$_5$R$_6$ and
—CH(CH$_3$)—CH$_2$—NR$_5$R$_6$ wherein —NR$_5$R$_6$ is selected from the group consisting of
—NH(lower alkanoyl),

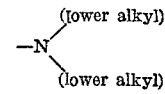

wherein the (lower alkyl) groups may be alike or different; and —N(lower alkyl)anilino; and —(lower alkylene)—Y$_1$ wherein (lower alkylene) contains from 1 to 3 carbon atoms; and Y$_1$ is selected from the group consisting of:
azetidino
aziridino
pyrrolidino
piperidino
morpholino
thiomorpholino
N-(lower alkyl)piperazino
pyrrolo imidazolo
2-imidazolino
2,5-dimethylpyrrolidino
1,4,5,6-tetrahydropyrimidino
4-methylpiperidino and
2,6-dimethylpiperidino;

and $R_7$ is selected from the group consisting of phenyl and mono-, di-, and tri-substituted phenyl wherein the substituent is selected from the group consisting of at least one of chloro, bromo, fluoro, lower alkyl, lower alkoxy and trifluoromethyl, with the proviso that only one of the positions ortho to the thio group of the phenyl moiety be substituted; and $R_4$ is

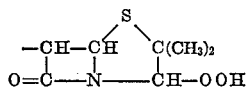

Of the lower alkyl, lower alkoxy, lower alkanoyl and carbo(lower)alkoxy groups those having from one to four carbon atoms in the alkyl, alkoxy and alkanoyl moieties are preferred since the reactants bearing such groups are more readily available than are those required for such groups having a greater number of carbon atoms.

Also included within the scope of this invention are the pharmaceutically acceptable salts of the novel compounds of Formula III in which one or both acid groups are involved in salt formation. Salts such as the sodium, potassium, calcium, magnesium, ammonium and substituted ammonium salts, e.g., procaine, dibenzylamine, N,N'-dibenzylethylenediamine, N,N'-bis(dehydroabietyl)ethylenediamine, 1-ephenamine, N-ethylpiperidine, N-benzyl-$\beta$-phenethylamine, trialkylamines, including triethylamine, as well as salts with other amines which have been used to form salts with benzylpenicillin are useful for the preparation of pharmaceutically elegant compositions of these valuable antibiotics.

DETAILED DESCRIPTION OF THE INVENTION

The production of arylchloro (and bromo) carbonyl ketenes comprises the reaction of an arylmalonic acid with a halogenating agent selected from the group consisting of $P(X)_5$, $P(X)_3$, $PO(X)_3$ and $SO(X)_2$ wherein X is as defined above at temperatures ranging from about 0° C. to about 50° C. for periods ranging from about one hour to about 10 hours. The reaction is conducted in the presence of a solvent system, preferably a reaction-inert solvent system. Suitable solvents are dialkyl ethers, e.g., diethyl ether, dipropyl ether, mono- and dimethyl ethers of ethylene glycol and propylene glycol, methylene chloride and chloroform.

The reaction period is, of course, dependent upon the reaction temperature and the nature of the reactants. However, for a given combination of reactants, the lower temperatures require longer reaction periods than do higher temperatures.

The molar proportions of reactants, i.e. arylmalonic acid and halogenating agent, can vary widely, e.g. up to 1:10 or higher, but for satisfactory yields should be at least stoichiometric. In actual practice the stoichiometric ratio of reactants is preferred.

The reactants may be added all at once or separately. If separately, the order of addition is not critical. However, it appears that the reaction is smoother and subject to fewer side-reactions, as evidenced by the color of the reaction mixture, particularly upon distillation, when the arylmalonic acid is added to the halogenating agent. The reaction mixture, under such conditions, generally progresses from a yellow to a red color. The reaction mixture on reverse addition, i.e. the addition of halogenating agent to the arylmalonic acid, progresses from yellow to black.

The arylhalocarbonyl ketene products are isolated from the reaction by distillation in vacuo. Because of their great reactivity they are generally stored under a nitrogen atmosphere at low temperatures and in the absence of light.

Reaction of the aryl halocarbonyl ketenes with alcohols and thiophenols is conducted on a 1:1 molar ratio at a temperature of from about −70° C. to about 30° C. when conversion of the arylhalocarbonyl ketene to a ketene ester is desired. A reaction-inert solvent, such as ethyl ether, methyl ether, dioxane, methylene chloride, chloroform, is desirably used to permit better mixing and control of the reaction. The use of greater than a 1:1 molar ratio of arylhalocarbonyl ketene to alcohol or thiophenol or temperatures above 30° C. produces malonic acid diesters. For example, when two moles of alcohol is used per mole of arylhalocarbonyl ketene the corresponding diester of the arylmalonic acid is produced. Half-amides of arylmalonic acid esters are obtained by reacting the arylhalocarbonyl ketenes with an alcohol followed by reaction of the resulting arylcarboxy ketene ester with a primary or secondary amine as is described herein. Isolation of the intermediate ester is not necessary. A tertiary amine may be used as acid acceptor to remove the hydrogen halide produced during the formation of the ester.

The arylcarboxy and aryl carbothiol ketene esters produced as described above are excellent acylating agents particularly suited for the acylation of amines to produce $\alpha$-carbothiol- and $\alpha$-carboxyarylacetyl amines. They are especially valuable as agents for the acylation of 6-aminopenicillanic acid. Many of the penicillin ester compounds of this invention exhibit improved absorption on oral administration over that produced by the corresponding free acid or alkali metal salt forms. They, therefore, represent convenient and effective dosage forms of the $\alpha$-carbothiol- and $\alpha$-carboxy aryl penicillins.

Additionally, many of the esters described herein, although inactive or of relatively low activity against gram-negative organism per se, are metabolized to the parent acid, i.e. $\alpha$-carboxybenzylpenicillin, when injected parenterally into the animal, including the human body. The rate of metabolic conversion of such esters to the parent acid occurs at such a rate as to provide an effective and prolonged concentration of the parent acid in the animal body. In effect, such esters act as depot sources for the parent acid. Especially useful in this respect are those compounds wherein the ester group is —$COOCH_2CH_2Y_1$ wherein $Y_1$ is a basic group such as di(lower alkyl)amino, pyrrolo, pyrrolidino, piperidino, phthalimido, imidazolino and diisopropylamino; and those wherein the ester group (—$COOR_2$) contains a tertiary carbon atom, such as t-butyl, trityl and 2-naphthyl.

The acylation of 6-aminopenicillanic acid is conducted at a temperature of from about −70° C. to about 50° C. and preferably at a temperature of from about 0° C. to about 30° C. The reaction period is generally from a few minutes up to about 5 hours. A reaction-inert solvent such as ethyl acetate, dioxane, tetrahydrofuran, methyl isobutyl ketone, chloroform or methylene chloride is generally used to facilitate stirring and temperature control. It has been found especially convenient to first form the arylcarboxy or arylcarbothiol ketene ester as described above and to use the reaction mixture, without isolation of the ketene ester, directly in the amine acylation reaction. In such instances an organic base, i.e. a tertiary amine such as triethylamine or other trialkylamine, preferably a tri(lower alkyl)amine, is used to remove the hydrogen halide produced in formation of the ketene ester. From a practical standpoint, the 6-aminopenicillanic acid is used as its triethylamine salt. For this reason, methylene chloride is a preferred solvent since the triethylamine salt is readily soluble therein. The sodium or potassium salts of 6-aminopenicillanic acid can also be used but the preferred salt is the triethylamine salt because of its greater solubility in the solvent systems used. An excess of the amine to be acylated can, of course, be used as acid acceptor but is generally avoided, not only for economic reasons but also to prevent possible ammonolysis of the ester group. The reaction is desirably conducetd under an atmosphere of nitrogen.

The N-acylation reaction can also be conducted in neutral or alkaline aqueous solution by taking advantage of the slower rate of reaction of the arylcarboxy or arylcarbothiol ketene esters with water at neutral or alkaline pH levels relative to the rate of reaction with the amine group. The reaction is conducted at temperatures ranging from just above the freezing point of the aqueous system to about 50° C. and preferably at from 0° C. to about 20° C. To permit attainment of low temperatures and to facilitate reaction, it is advantageous to employ a mixed solvent system, i.e. water plus a water miscible reaction-inert organic solvent such as dioxane or tetrahydrofuran. The ketene ester is, of course, desirably used as a solution in the same reaction-inert solvent and is preferably added to the aqueous solution of the 6-aminopenicillanic acid.

The acylated products are isolated by conventional methods. A typical method, for example, comprises evaporating the reaction mixture to dryness under reduced pressure, dissolving the residue in citrate buffer (pH 5.5) and extracting the product therefrom with chloroform. The chloroform extracts are washed with citrate buffer (pH 5.5), dried with anhydrous sodium sulfate and evaporated to dryness. In another method, which is of value for the isolation of acrylation products poorly soluble in methylene chloride, or chloroform, the above method is followed but using n-butanol as extracting solvent in place of chloroform. The product remaining after removal of the n-butanol solvent by evaporation is triturated with ether to produce an amorphous solid.

In still another method, essentially a variation of the above methods, saturated sodium bicarbonate (or potassium bicarbonate) is used in place of the citrate buffer. This method, of course, produces the sodium (or potassium) salt of the acylation product. If necessary, to obtain a solid product, the salt is triturated with ether.

In yet another method, the residue remaining after removal of the volatiles from the reaction mixture is taken up in water at pH of from about 2.3 to 2.9, usually about pH 2.7, and the free acid form of the acylation product extracted from the acid solution with chloroform, ether, n-butanol or other suitable solvent. The chloroform, ether or n-butanol extract is then washed with aqueous acid (pH 2.3–2.9) and the product recovered by lyophilization or by conversion to a solvent-insoluble salt as by neutralization with an n-butanol solution of sodium or potassium 2-ethyl-hexanoate.

The esters are converted by known methods to the corresponding acids; for example, when $R_2$ is benzyl or a substituted benzyl group, its removal is accomplished by catalytic hydrogenation in a reaction-inert solvent such as water, ethanol, dioxane, at pH of from about 5 to about 9 and at about atmospheric pressure and ambient temperature. Favored catalysts are platinum, rhodium, nickel and palladium. When $R_2$ is other than benzyl or substituted benzyl its removal is effected by mild acid treatment or enzymatically with an esterase such as liver homogenate.

When preparation of the free acid form of the herein described pencillins is desired, the preferred ester groups are those wherein $R_2$ is trityl, t-butyl, and β-diisopropylaminoethyl. These groups are readily removed by mild acid treatment resulting in satisfactory yields of the desired acid forms of the penicillins.

The valuable products of this invention are remarkably effective in treating a number of susceptible gram-positive and gram-negative infections in animals, including man. For this purpose, the pure materials or mixtures thereof with other antibiotics can be employed. They may be administered alone or in combination with a pharmaceutical carrier selected on the basis of the chosen route of administration and standard pharmaceutical practice. For example, they may be administered orally in the form of tablets containing such excipients as starch, milk sugar, certain types of clay, etc., or in capsules alone or in admixture with the same or equivalent excipients. They may also be administered orally in the form of elixirs or oral suspensions which may contain flavoring or coloring agents, or be injected parenterally, that is, for example, intramuscularly or subcutaneously. For parenteral administration they are best used in the form of a sterile aqueous solution which may be either aqueous such as water, isotonic saline, isotonic dextrose, Ringer's solution, or non-aqueous such as fatty oils of vegetable origin (cotton seed, peanut oil, corn, sesame) and other non-aqueous vehicles which will not interfere with the therapeutic efficiency of the preparation and are non-toxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, as well as local anesthetics and inorganic salts to afford desirable pharmacological properties.

The oral and parenteral dosage levels for the herein described compounds are, in general, on the order of up to 200 mg./kg. and 100 mg./kg. of body weight per day, respectively.

The antimicrobial spectra of several esters of α-carboxybenzyl penicillins against *Staphylococcus aureus* and *Escherichia coli* 5 are presented below. The tests were run under standardized conditions in which nutrient broth containing various concentrations of the test material was seeded with the particular organism specified, and the minimum growth (MIC) at which growth of each organism failed to occur was observed and recorded. The test materials have the following formula and were tested as their sodium or potassium salts. Benzylpenicillin (K salt) when thus tested gave values of 0.156, >100 vs. *S. aureus* and *Escherichia coli*, respectively.

TABLE I.—IN VITRO SPECTRA

| $R_2$ | S. aureus | E. coli |
|---|---|---|
| 1-naphthyl | 0.39 | 6.25 |
| 5-indanyl | 0.39 | 6.25 |
| 5-(1,3-benzodioxolyl) | 3.12 | 25 |
| 2-naphthyl | 1.56 | 12.5 |
| 6-quinoly | 1.56 | 50 |
| H | 1.25 | 3.12 |
| Phenyl | 3.12 | 25 |
| o-Methylphenyl | 0.78 | 12.5 |
| m-Methylphenyl | 0.78 | 6.25 |
| p-Methylphenyl | 0.39 | 6.25 |
| o-Ethylphenyl | 0.39 | 25 |
| o-Isopropylphenyl | 0.39 | 12.5 |
| o-Formylphenyl | 1.56 | 25 |
| o-Acetylphenyl | 50 | >200 |
| p-Acetylphenyl | 25 | >200 |
| o-Nitrophenyl | 25 | >200 |
| 2,3-dimethylphenyl | 0.78 | 50 |
| 3,4-dimethylphenyl | 0.78 | 25 |
| 2,3-dimethoxyphenyl | 1.56 | 50 |
| 2-chloro-5-methylphenyl | 3.12 | 3.12 |
| 4-chloro-3-methylphenyl | 1.56 | 1.56 |
| 2-chloro-3,5-dimethylphenyl | 1.56 | 1.56 |
| 2-chloro-3,4-dimethylphenyl | 1.56 | 3.12 |
| 2-chloro-4,5-dimethylphenyl | 0.39 | 0.39 |
| 4-chloro-2,3-dimethylphenyl | 0.19 | 0.19 |
| 4-chloro-2,5-dimethylphenyl | 0.19 | 0.39 |
| 4-chloro-2,6-dimethylphenyl | 0.19 | 0.19 |
| 2,4-dichloro-6-methylphenyl | 0.39 | 0.39 |
| 2,4-dichloro-3,5-dimethylphenyl | 1.56 | 3.12 |
| 4,5-dichloro-2,3-dimethylphenyl | 0.04 | 0.09 |
| 4-chloro-2-nitrophenyl | 25 | >200 |
| 1-(1,2,3,4-tetrahydronaphthyl) | 0.39 | 12.5 |
| 2-(1,4-naphthoquinonyl) | 12.5 | >200 |
| 4-indanyl | 0.39 | 6.25 |
| 5-indanyl | 0.39 | 6.25 |
| 5-quinonyl | 1.56 | 50 |
| 6-quinonyl | 1.56 | 50 |
| 8-quinonyl | 1.56 | 50 |
| 3-(2-methyl-4-pyronyl) | 0.78 | 50 |
| Methyl | 0.625 | 50 |
| Ethyl | 1.25 | >100 |
| n-Propyl | 6.25 | >200 |
| Isopropyl | 6.25 | >200 |
| n-Butyl | 50 | >200 |
| Sec-butyl | 3.12 | >200 |
| t-Butyl | 1.56 | 100 |
| 2-methylpropyl | 3.12 | >100 |
| Hexyl | >200 | |
| Octyl | >200 | >200 |
| Decyl | >200 | >200 |
| Tetradecyl | >200 | >200 |

TABLE I—Continued

| $R_1$ | S. aureus | E. coli |
|---|---|---|
| 2-cyanoethyl | 1.9 | 6.25 |
| 2-methoxyethyl | 3.12 | >100 |
| 2-acetoxyethyl | 3.12 | >200 |
| 1-(1-carbethoxy)ethyl | 100 | >200 |
| 2-(1,2,3-tricarbethoxy)propyl | 1.56 | 200 |
| 2-chloroethyl | 50 | >200 |
| 2,2,2-trichloroethyl | 100 | >200 |
| 2,2,2-trifluoroethyl | 1.56 | 25 |
| 2-(2-trifluoromethyl)propyl | 0.78 | 200 |
| 1-ethoxy-2,2,2-trifluoroethyl | 0.78 | 50 |
| 1-ethoxy-2,2,2-trichloroethyl | 0.78 | 12.5 |
| 1-isopropoxy-2,2,2-trichloroethyl | 1.56 | 100 |
| 1-butoxy-2,2,2-trichloroethyl | 0.39 | 50 |
| Carbethoxy ethoxy methyl | 25 | 100 |
| Dicarbethoxy ethoxy methyl | 1.56 | 50 |
| 1-(2,3-dibutyryloxy)propyl | >500 | >200 |
| 3-oxobutyl | 50 | >200 |
| 1,1-dimethyl acetonyl | >200 | >200 |
| 2-nitrobutyl | 100 | >200 |
| 2-dimethylaminoethyl | 1.56 | 50 |
| 2-diethylaminoethyl | 0.78 | 12.5 |
| 2-di(n-propyl)aminoethyl | 0.78 | 6.25 |
| 2-di(isopropyl)aminoethyl | 1.56 | 100 |
| 2-di(n-butyl)aminoethyl | 0.78 | 12.5 |
| 3-dimethylaminopropyl | 0.78 | 25 |
| 3-di-(n-propyl)amino-2-propyl | 0.39 | 3.12 |
| 2-pyrrolidinoethyl | 0.78 | 6.25 |
| 2-(2-imidazolino)ethyl | 1.56 | 50 |
| 2-piperidinoethyl | 0.78 | 3.12 |
| 2-morpholinoethyl | 1.56 | 6.25 |
| 2-(2,5-dimethylpyrrolidino)ethyl | 1.56 | 12.5 |
| 2-(4-methylpiperidino)ethyl | 0.19 | 6.25 |
| 3-(pyrrolidino)propyl | 0.19 | 12.5 |
| 3-piperidinopropyl | 1.56 | 12.5 |
| 3-morpholinopropyl | 1.56 | 6.25 |
| 3-pyrrolidino-2-propyl | 0.39 | 3.12 |
| 3-piperidino-2-propyl | 0.39 | 1.56 |
| 2-aziridinoethyl | 50 | |
| 2-pyrrolidino-1-propyl | 0.78 | 6.25 |
| 2-azetidinoethyl | 3.12 | 100 |
| 2-piperidino-1-propyl | 0.78 | 6.25 |
| 2-(2,6-dimethyl piperidino)ethyl | 1.56 | 12.5 |
| 2-morpholino-1-propyl | 3.12 | 50 |
| 2-di(n-propylamino)-1-propyl | 1.56 | 6.25 |
| 2-(N-methylanilino)ethyl | 0.39 | 100 |
| 3-di(n-propylamino)propyl | 0.19 | 12.5 |
| 3-dimethylamino-2-propyl | 1.56 | 25 |
| 3-morpholino-2-propyl | 1.56 | 6.25 |

Table II presents in vivo data for several compounds of this invention in mice (PO=oral and SQ=subcutaneous routes of administration). The values are obtained under standardized conditions. The procedure comprises production of an acute experimental *E. coli* 266 infection in mice by the intraperitoneal incubation of the mice with a standardized ($10^{-6}$) *E. coli* 266 culture suspended in 5% hog gastric mucin. The test compounds, in the form of their sodium or potassium salts, are administered to the infected mice by a multiple dosing regimen in which the first dose is given 0.5 hour after inoculation and is repeated 4, 24 and 48 hours later. The percent of mice surviving are then determined.

The $LD_{100}$ of *E. coli* 266 (the lowest concentration required to produce 100% mortality in mice) is $10^{-7}$. Control animals receive inocula of $10^{-5}$, $10^{-6}$ and $10^{-7}$ as a check on possible variation in virulence which can occur.

TABLE II
[In vivo data vs. *E. coli* 266 in mice]

| | Percent survivors | | | |
|---|---|---|---|---|
| | PO (mg./kg.) | | SQ (mg./kg.) | |
| $R_2$ | 200 | 100 | 200 | 100 |
| Carbethoxyethoxymethyl | 0 | 20 | 0 | 10 |
| Dicarbethoxyethoxymethyl | 30 | 0 | 60 | 40 |
| 1-ethoxy-2,2,2-trichloroethyl | 90 | 60 | 70 | 70 |
| 1-isopropoxy-2,2,2-trichloroethyl | 20 | 20 | 40 | 30 |
| 1-butoxy-2,2,2-trichloroethyl | 10 | 20 | 0 | 10 |
| 1-naphthyl | 30 | 20 | 30 | 0 |
| 2-naphthyl | 40 | 0 | 50 | 10 |
| 5-indanyl | 100 | 60 | 70 | 60 |
| 5-indanyl (TEA salt) | 100 | 70 | 100 | 100 |
| 4-indanyl | 80 | 50 | 80 | 40 |
| 5-quinolyl | 10 | 0 | 50 | 30 |
| 6-quinolyl | 20 | 20 | 10 | 20 |
| 5-(1,3-benzodioxolyl) | 30 | 20 | 30 | 50 |
| m-Methylphenyl | 70 | 30 | 80 | 70 |
| p-Methylphenyl | 30 | 20 | 20 | 20 |
| o-Methylphenyl | 30 | 0 | 0 | 10 |
| o-Ethylphenyl | 20 | 10 | 10 | 0 |
| o-Isopropylphenyl | 90 | 60 | 50 | 50 |
| 2,3-dimethylphenyl | 80 | 10 | 80 | 60 |
| 3,4-dimethylphenyl | 80 | 30 | 50 | 20 |
| 4-methoxyphenyl | 20 | 10 | 40 | 30 |
| 2,6-dimethoxyphenyl | 10 | 0 | 0 | 20 |

TABLE II—Continued
[In vivo data vs. *E. coli* 266 in mice]

| | Percent survivors | | | |
|---|---|---|---|---|
| | PO (mg./kg.) | | SQ (mg./kg.) | |
| $R_2$ | 200 | 100 | 200 | 100 |
| m-Fluorophenyl | 70 | 20 | 50 | 20 |
| 2-chloro-6-methylphenyl | 30 | 10 | 40 | 30 |
| 4-chloro-2-methylphenyl | 40 | 0 | 20 | 30 |
| 2-chloro-5-methylphenyl | 0 | 0 | 30 | 10 |
| 4-chloro-3-methylphenyl | 70 | 10 | 60 | 30 |
| 2-chloro-3,4-dimethylphenyl | 20 | 20 | 30 | 0 |
| 4-chloro-3-methylphenyl | 70 | 10 | 60 | 30 |
| 2-chloro-3,4-dimethylphenyl | 20 | 20 | 30 | 0 |
| 4-chloro-3,5-dimethylphenyl | 60 | 10 | 60 | 30 |
| 4-chloro-2,3-dimethylphenyl | 90 | 60 | 90 | 60 |
| 4-chloro-2,6-dimethylphenyl | 10 | 10 | 30 | 10 |
| 2-chloro-4,5-dimethylphenyl | 20 | 20 | 70 | 10 |
| 4-chloro-2,5-dimethylphenyl | 0 | 0 | 10 | 0 |
| 2,4-dichloro-6-methylphenyl | 10 | 10 | 10 | 20 |
| 2,4-dichloro-3,5-dimethylphenyl | 50 | 10 | 70 | 50 |
| 4-chloro-2,3,5-trimethylphenyl | 60 | 50 | 80 | 40 |
| 4-chloro-2,6-dinitrophenyl | 10 | 0 | 20 | 0 |
| 2-(5,6,7,8-tetrahydronaphthyl) | 60 | 40 | 60 | 50 |
| Phenyl | 0 | 0 | 10 | 0 |
| 2-dimethylaminoethyl | 0 | 0 | a 10 | b 10 |
| 2-diethylaminoethyl | 0 | 0 | 10 | 10 |
| 2-di(n-propyl)aminoethyl | 20 | 10 | 90 | 80 |
| 2-di(isopropyl)aminoethyl | 0 | 0 | 40 | 0 |
| 2-di(n-butyl)aminoethyl | 0 | 10 | 90 | 80 |
| 3-dimethylaminopropyl | 0 | 0 | 30 | 10 |
| 3-di(n-propyl)amino-2-propyl | 20 | 0 | 70 | 30 |
| 2-pyrrolidinoethyl | 10 | 10 | 80 | 60 |
| 2-(2-imidazolino)ethyl | 0 | 0 | 40 | c 10 |
| 2-piperidinoethyl | 10 | 10 | 80 | 60 |
| 2-morpholinoethyl | 0 | 0 | 30 | 0 |
| 2-(2,5-dimethylpyrrolidino)ethyl | 0 | 0 | 60 | 50 |
| 2-(4-methylpiperidino)ethyl | 30 | 0 | 60 | 50 |
| 3-(pyrrolidino)propyl | 0 | 0 | 80 | 20 |
| 3-piperidinopropyl | 0 | 0 | 100 | 80 |
| 3-morpholinopropyl | 0 | 0 | 80 | 70 |
| 3-pyrrolidino-2-propyl | 0 | 0 | 70 | 50 |
| 3-piperidino-2-propyl | 0 | 0 | 90 | 40 |
| 2-pyrrolidino-1-propyl | 10 | 0 | 80 | 70 |
| 2-azetidinoethyl | 10 | 0 | 0 | 0 |
| 2-piperidino-1-propyl | | | 80 | 70 |
| 2-(2,6-dimethyl piperidino)ethyl | 10 | 0 | 100 | 80 |
| 2-morpholino-1-propyl | 10 | 30 | 40 | 20 |
| 2-di(n-propylamino)-1-propyl | 0 | 10 | 90 | 60 |
| 2-(N-methylanilino)ethyl | 40 | 0 | 80 | 10 |
| 3-di(n-propylamino)propyl | 0 | 0 | 80 | 90 |
| 3-dimethylamino-2-propyl | 0 | 0 | 20 | 20 |
| 3-morpholino-2-propyl | 0 | 10 | 70 | 20 |
| 2-formamidoethyl | 20 | 0 | 20 | 10 |
| H | | 0 | | 70 | a 150 mg./kg.    b 75 mg./kg.    c 50 mg./kg.

EXAMPLE I

Phenylchlorocarbonyl ketene (A) To phenylmalonic acid (20 g.) in ethyl ether (100 ml.) there is added phosphorous pentachloride (46 g.). A vigorous reaction occurs. The reaction mixture is refluxed for four hours than the ether partially removed by heating on a steam bath. The reaction mixture becomes black when about half the ether is removed and the remaining ether is removed under reduced pressure (at 100 mm.). The residue is distilled under vacuum and the fraction boiling at 75°–90° C. at 1.5–4 mm. collected. The product, a yellow liquid, is redistilled at 74° C. and 1.5 mm. It shows a strong peak in the infrared region of the spectrum at 4.69μ.

Repetition of this procedure but using 10 g. of phenylmalonic acid instead of 20 g. produces a less vigorous reaction on addition of the phosphorous pentachloride. The same product is obtained.

(B) Phosphorous pentachloride (23 g.) is added over a 5-minute period to a stirred solution of phenylmalonic acid (10 g.) in ethyl ether (50 ml.) initially at a temperature of 0°–5° C. The temperature rises to 13° C. during the addition. The mixture is then refluxed for five hours and allowed to stand overnight at room temperature. Removal of the ether at 20 mm. produces a dark concentrate which is vacuum distilled to give the desired product: B.P. 80–88° C. at 1.5–2.0 mm. and 74° C. at 0.2 mm.

(C) To a stirred solution of phosphorous pentachloride (46 g.) in ethyl ether (100 ml.) there is added phenylmalonic acid (10 g.) over a two-minute period. The mixture is stirred at room temperature for four hours then refluxed for four hours and allowed to stand overnight at room temperature. The excess phosphorous pentachloride is filtered off and the ether boiled off at atmosphere pressure. The reaction mixture gradually progresses in color from dark yellow to red. The residue is distilled in vacuo to give the product: B.P. 83°–86° C. at 1.5 mm. as a yellow liquid.

(D) Repetition of this procedure but using an equivalent amount of phosphorous oxychloride as halogenating agent in place of phosphorous pentachloride produces the same product.

EXAMPLE II

The procedure of Example I–C is repeated but using the appropriate malonic acid derivative in place of phenylmalonic acid to produce the following compounds.

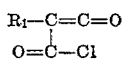

| $R_1$ | $R_1$ |
|---|---|
| 2-thienyl | 3-furyl |
| 3-thienyl | 2-pyridyl |
| 2-furyl | 3-pyridyl |
| o-Tolyl | 4-pyridyl |
| m-Tolyl | o-Bromophenyl |
| p-Tolyl | m-Bromophenyl |
| o-Methoxyphenyl | o-Chlorophenyl |
| m-Methoxyphenyl | p-Chlorophenyl |
| p-Methoxyphenyl | m-Chlorophenyl |
| o-Trifluoromethylphenyl | o-Butoxyphenyl |
| p-Trifluoromethylphenyl | o-Dimethylaminophenyl |
| m-Trifluoromethylphenyl | o-Diethylaminophenyl |
| o-Isopropylphenyl | m-Dimethylaminophenyl |
|  | p-Dimethylaminophenyl |

EXAMPLE III

Repetition of the procedures of Examples I–C and II but using $PBr_5$ in place of $PCl_5$ produces the corresponding bromo compounds.

EXAMPLE IV

Methyl ester of phenylcarboxy ketene

To a solution of phenylchlorocarbonyl ketene (0.5 g.) in dry chloroform (5 ml.) there is added anhydrous methanol (0.1 ml.) at room temperature. Hydrogen chloride is liberated. The mixture, maintained under at atmosphere of nitrogen, is stirred for 20 minutes and the product recovered by evaporation of the solvent.

EXAMPLE V

Dibenzyl phenyl malonate

Benzyl alcohol (0.6 ml.) is added to a solution of phenylchlorocarbonyl ketene (1.0 g.) in dry, ethanol-free, chloroform (12 ml.) at room temperature. Hydrogen chloride is evolved almost immediately upon addition of the benzyl alcohol. The mixture is stirred for five minutes, additional benzyl alcohol (0.6 ml.) added, and stirring continued for three hours. The chloroform solvent is evaporated off. The residue, upon standing, crystallizes. After two recrystallizations from hexane it melts at 69°–70° C.

Analysis.—Calcd. for $C_{23}H_{20}O_4$ (percent): C, 76.65; H, 5.59. Found (percent): C, 76.92; H, 5.49.

EXAMPLE VI

Benzyl phenyl-N-benzylmalonamate

Benzyl alcohol (0.6 ml. in 2 ml. of methylene chloride) is added to a solution of phenylchlorocarbonyl ketene (1.0 g.) in methylene chloride (12 ml.) at −70° C. in a closed system filled with nitrogen gas. The mixture is stirred for three minutes then benzylamine (1.2 ml. in the 2 ml. of methylene chloride) added. An immediate precipitate forms. The mixture is held at −70° C. for one hour with occasional shaking and then warmed to room temperautre. The mixture is held at −70° C. for one hour with occasional shaking and then warmed to room temperature. The mixture is filtered and the filtrate evaporated to dryness. The residue, a somewhat gummy solid, is slurried in ether, filtered and then recrystallized twice from hexane, M.P. 143–143.5° C.

Analysis.—Calcd. for $C_{23}H_{21}NO_3$ (percent): C, 76.85; H, 5.88; N, 3.89. Found (percent): C, 76.67; H, 5.86; N, 3.99

Repetition of this example but using the compounds of Examples II and III in place of phenylchlorocarbonyl ketene produces the corresponding malonamates.

EXAMPLE VII

A mixture of phenylmalonic acid (5 g.) and thionyl chloride (30 ml.) is heated to reflux for six hours to give a clear yellow solution. Removal of the excess thionyl chloride by evaporation provides the crude phenylchlorocarbonyl ketene. The pure compound is obtained by distillation in vacuo.

EXAMPLE VIII

Esters of arylcarboxy ketenes—General preparation method

To a solution of the appropriate aryl halocarbonyl ketene (0.1 mole) in methylene chloride (sufficient to provide a clear solution and generally from about 5 to 10 ml. per gram of ketene) there is added the proper alcohol $R_2OH$ (0.1 mole). The reaction mixture is maintained under an atmosphere of nitrogen and stirred for a period of from 20 minutes to 3 hours, care being taken to exclude moisture. The temperature may range from about −70° C. to about −20° C.

The compounds thus prepared are presented below.

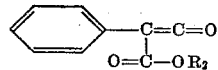

| $R_2$ | $R_2$ |
|---|---|
| 1-methyl-2-nitroethyl | Phthalimidomethyl |
| 4-nitrobutyl | 1-methyl-4-oxopentyl |
| 1-methyl-3-nitropropyl | 1-methyl-3-oxobutyl |
| 2,2-dinitroethyl | 1-acetyl-1-methylpropyl |
| 1-methyl-2-chloro-2-nitroethyl | 2-acetylbutyl |
| 1-trichloromethyl-2-nitroethyl | 2-acetylpropyl |
| 1,1-dimethyl-2,2,2-trichlorethyl | 5-oxohexyl |
| 2-methoxyethyl | 1-methoxy-2,2,2-trichloroethyl |
| 2-ethoxyethyl | 1-methoxy-2,2,2-trifluoroethyl |
| 2-isobutoxyethyl | Methyl |
| 4-ethoxy-n-butyl | Ethyl |
| 1,1-dimethyl-2-ethoxyethyl | n-Propyl |
| 1-cyanoethyl | n-Butyl |
| 4-cyanobutyl | Sec-butyl |
| 2-cyano-1-methylethyl | t-Butyl |
| 1-chloromethyl-2-cyanoethyl | Decyl |
| 1-cyano-2,2-dichloropropyl | Octadecyl |
| 1-cyano-2,2,2-trichloroethyl | 2-chloroethyl |
| 1-methyl-1-(1′-cyano-1′-methyl-ethoxy)ethyl | 3-chloropropyl |
| 2-acetoxyethyl | 1-methyl-2-chloroethyl |
| 2-butyryloxyethyl | 1-ethyl-2-chloroethyl |
| 2-acetoxy-n-butyl | 1-methyl-2-chloropropyl |
| carbomethoxymethyl | 1,1-dimethyl-2-chloroethyl |
| 2-carbethoxyethyl | 2-bromoethyl |
| 4-carbethoxybutyl | 2-bromo-1-butyl |
| 2-carbethoxypropyl | 1,3-dichloropropyl |
| 1-carbethoxyethyl | 1,1-dichloromethylethyl |
| 1-choromethyl-2-carbethoxyethyl | 2-bromo-3-chloropropyl |
| 1-trichloromethyl-2-carbomethoxyethyl | 1-bromomethyl-2-chloroethyl |
| 1-carbethoxy-2,2-dichloropropyl | 1,1-dichloromethylethyl |
| 1-carbomethoxy-2,2,2-trichloroethyl | 1,1-dimethyl-2,2-dichloroethyl |
| 1-carbomethoxymethyl-2,2,2-trichloroethyl | 2,3,3-tribromopropyl |
| Acetonyl | 2,2,3,3-tetrabromorpropyl |
| Acetonylmethyl | 2,2,2-trifluoroethyl |
| 4-oxopentyl | 2-nitroethyl |
| 2-dimethylaminoethyl | 2,3-diacetoxypropyl |
| 2-dibutylaminoethyl | 2,3-distearoyloxypropyl |
| 2-diisopropylaminoethyl | (1,2,3-tricarbomethoxy)-2-propyl |
| 3-diisopropylaminopropyl | 2-fluoroethyl |
| 3-diethylaminopropyl | 2,2,3,3,4,4-heptafluorobutyl |
| 2-diethylaminoethyl | Phenyl |
| 2-di-(n-propyl)aminoethyl | o-Chlorophenyl |
| 3-di-methylaminopropyl | p-Chlorophenyl |
| 3-di-(n-propyl)amino-2-propyl | m-Bromophenyl |
| 2-(2,5-dimethylpyrrolidino)ethyl | o-Tolyl |
| 2-(4-methylpiperiidno)ethyl | p-Tolyl |
| 3-piperidinopropyl | m-ethylphenyl |
| 3-pyrrolidino-2-propyl | o-Isopropylphenyl |
|  | p-T-butylphenyl |
|  | o-Methoxyphenyl |
|  | m-Ethoxyphenyl |
|  | p-Butoxyphenyl |

TABLE—Continued

| R₂ | R₂ |
|---|---|
| 3-piperidino-2-propyl | σ-Fluorophenyl |
| 2-(2-imidazolino)ethyl | σ-Formylphenyl |
| 3-(2-imidazolino)propyl | p-Acetylphenyl |
| 2-piperidinoethyl | p-Butyrylphenyl |
| 2-morpholinoethyl | α-Nitrophenyl |
| 3-morpholinopropyl | m-Nitrophenyl |
| 3-thiomorpholinopropyl | σ-Carbomethoxyphenyl |
| 2-pyrrolidinoethyl | p-Carbomethoxyphenyl |
| 2-pyrroloethyl | m-Carbethoxyphenyl |
| 2-N-methylpiperazinoethyl | σ-Dimethylaminophenyl |
| 3-N-butylpiperazinopropyl | m-Di-n-propylaminophenyl |
| 2-(1,4,5,6-tetrahydropyrimidino)ethyl | p-Methylethylaminophenyl |
| | 2,3-dimethylphenyl |
| 3-dimethylamino-2-propyl | 3,5-dimethylphenyl |
| 2-diethylamino-1-propyl | 2,6-diethylphenyl |
| 2,3,4,6-tetramethylphenyl | 5-ethyl-3-methylphenyl |
| 2,6-dichlorophenyl | 2,3,4-trimethylphenyl |
| 2,4,6-tribromophenyl | 2,6-diethyl-4-methylphenyl |
| Pentafluorophenyl | 7-isoquinolyl |
| 2,4-dinitrophenyl | 4-benzolfuryl |
| 2,3,6-trinitrophenyl | 2-phenanthrenequinonyl |
| 2,4-difluorophenyl | 2-(1,4-anthraquinonyl) |
| 3-chloro-2-fluorophenyl | 3-phenanthryl |
| 2-chloro-6-methoxyphenyl | 3-thionaphthenyl |
| 3-methoxy-2-methylphenyl | Cyclopropyl |
| 2-carbomethoxy-5-fluorophenyl | Cyclobutyl |
| 2-acetyl-4-fluorophenyl | Cyclopentyl |
| 3-bromo-5-methylphenyl | Cyclohexyl |
| 4-chloro-2,6-dimethylphenyl | Cycloheptyl |
| 3-chloro-4-fluoro-6-nitrophenyl | 1-methyl-1-cyclopentyl |
| 4-indanyl | 3-methyl-1-cyclopentyl |
| 8-quinolyl | 2,2-dimethyl-1-cyclopentyl |
| 4-(6-methylquinolyl) | 2-methyl-1-cyclohexyl |
| 1-naphthyl | 3,5-dimethyl-1-cyclohexyl |
| 5-(1,2,3,4-tetrahydronaphthyl) | 3-isopropyl-1-cyclopentyl |
| 2-phenazinyl | 1-methyl-1-cyclobutyl |
| 3-(2-methyl-4-pyronyl) | 1-indanyl |
| 2-(1,4-naphthoquinonyl) | 7-adamantanyl |
| 2-furyl | 2-bicyclo[4.4.0]-decyl |
| 2-methyl-1-indanyl | 4-cyclohexyl-1-cyclohexyl |
| 2-(1,2,3,4-tetrahydronaphthyl) | 1-methyl-1-cycloheptyl |
| Thujyl | Fenchyl |
| 2-chloro-1-indanyl | Propargyl |
| Allyl | 1-butyn-3-yl |
| Crotyl | 1-pentyl-3-yl |
| 3-buten-1-yl | 3-methyl-1-pentyn-3-yl |
| 3-penten-1-yl | 2-hexyn-1-yl |
| 3-penten-2-yl | 2-heptyn-1-yl |
| 2-methyl-3-buten-1-yl | 2-ocytn-1-yl |
| 4-hexen-1-yl | 3,4,4-trimethyl-5-pentyn-1-yl |
| 1-hexen-3-yl | 3-ethyl-1-pentyn-3-yl |
| 2,2-dimethyl-3-buten-1-yl | 2-octen-1-yl |
| 2-hepten-1-yl | 1-octen-3-yl |
| 2-hepten-4-yl | 4-(N-methyl)pyridyl |
| 3-(N-methyl)pyridyl | σ-Ethoxybenzyl |
| Benzyl | m-Acetylbenzyl |
| σ-Chlorobenzyl | p-Butyrylbenzyl |
| p-Butyrylbenzyl | σ-Carbomethoxybenzyl |
| p-Bromobenzyl | p-(Carbo-t-butoxy)benzyl |
| m-Methylbenzyl | σ-Fluorobenzylbenzyl |
| σ-Fluorobenzyl | p-Dimethylaminobenzyl |
| p-Methoxybenzyl | Benzohydryl |
| σ-Nitrobenzyl | 1-indanylmethyl |
| Trityl | 2-pyridylmethyl |
| Cholesteryl | 2-furylmethyl |
| [2,2-dimethyl-1,3-dioxolon-4-yl]methyl | (2-pyrrolidono)methyl |

| R₂ | R₂ |
|---|---|
| Methyl | 2-cyanoethyl |
| Ethyl | 3-cyanopropyl |
| n-Butyl | 2-cyano-1-methylpropyl |
| t-Butyl | 1-cyano-2-chloropropyl |
| Decyl | 1-cyano-2,2-dichloropropyl |
| Tetradecyl | 1-cyano-2,2,2-trichloroethyl |
| 2-chloroethyl | 1-methyl-1-(1′-cyano-1′-methylethoxy)propyl |
| 2-chloropropyl | 2-acetoxyethyl |
| 4-chloro-1-butyl | 2-butyryloxyethyl |
| 1-methyl-1-3-chloropropyl | 3-acetoxypropyl |
| 2-bromoethyl | Carbomethoxymethyl |
| 1-ethyl-2-bromoethyl | 2-carbethoxyethyl |
| 1,3-dichloropropyl | 3-carbobutoxypropyl |
| 2-bromo-3-chloropropyl | 2-carbethoxypropyl |
| 3,4-dichloro-1-butyl | 1-trichloromethyl-2-carbomethoxyethyl |
| 2,2-dichloroethyl | 1-carbethoxy-2,2-dichloropropyl |
| 1,1-dimethyl-2,2-dichloroethyl | 1-carbomethoxy-2,2,2-trichloroethyl |
| 2,2,3-tribromopropyl | Acetonyl |
| 2,2,3-trichlorobutyl | 2-oxopentyl |
| 2,2,2-trichloroethyl | 4-oxopentyl |
| 2,2,2-trifluoroethyl | 2-acetylbutyl |
| 3-nitropropyl | 1-methyl-3-oxohexyl |
| 2-nitrobutyl | 3-oxopentyl |
| 2,2-dinitroethyl | 4-oxohexyl |
| 2-chloro-2-nitropropyl | 1-ethoxy-2,2,2-trichloroethyl |
| 1-trichloromethyl-2-nitroethyl | 1-methoxy-2,2,2-trifluoroethyl |
| 1-trifluoromethylethyl | 2,3-diacetoxypropyl |
| 1,1-dimethyl-2,2,2-trifluoroethyl | 2,3-distearoyloxypropyl |
| 1-ethyl-1-methyl-2,2,2-trichloroethyl | (1,2,3-tricarbomethoxy)-2-propyl |
| 2-methoxyethyl | 3-fluoropropyl |
| 3-sec-butoxypropyl | 4,4,4-trichlorobutyl |
| 4-methoxy-n-butyl | Chlorodicarbomethoxymethyl |
| 1,1-dimethyl-2-methoxyethyl | 1,1-dicarbethoxymethyl-2-ethoxyethyl |
| Carbethoxy ethoxymethyl | 2,6-dichlorophenyl |
| Phenyl | 2-chloro-4-fluorophenyl |
| σ-Chlorophenyl | 2,3,5,6-tetrabromophenyl |
| m-Chlorophenyl | 2,4-dinitrophenyl |
| p-Bromophenyl | 5-fluoro-2-nitrophenyl |
| m-Tolyl | 6-methoxy-2-methylphenyl |
| σ-Ethylphenyl | 2-acetyl-4-fluorophenyl |
| p-T-butylphenyl | 3-dimethylamino-4-methylphenyl |
| σ-Methoxyphenyl | 3-chloro-4-fluoro-6-nitrophenyl |
| m-Isopropoxyphenyl | 3-carbomethoxy-4-chlorophenyl |
| p-Butoxyphenyl | 2-carbomethoxy-4-chloro-5-methylphenyl |
| p-Acetylphenyl | |
| m-Butyrylphenyl | 1-naphthyl |
| σ-Nitrophenyl | 2-naphthyl |
| p-Carbomethoxyphenyl | 5-indanyl |
| σ-Dimethylaminophenyl | 6-(1,2,3,4-tetrahydronaphthyl) |
| 2,3-dimethylphenyl | 3-quinolyl |
| 3-methyl-6-propylphenyl | 7-quinolyl |
| 2,4-dimethyl-3-ethylphenyl | 5-(1,3-benzodioxolyl) |
| 3,4-dimethyl-2,6-diethylphenyl | 7-(1,2-naphthoquinonyl) |
| 2-dimethylaminoethyl | 1-chloro-2-indanyl |
| 2-diisopropylaminoethyl | Cyclopropyl |
| 3-diethylaminopropyl | Cyclohexyl |
| 2-piperidinoethyl | 1-indanyl |
| 3-morpholinopropyl | 7-adamantanyl |
| 3-thiomorpholinopropyl | 2-methyl-1-cyclopentyl |
| 2-pyrrolidinoethyl | 4-methyl-1-cyclohexyl |
| 2-(2-imidazolino)ethyl | 3,3-dimethyl-1-cyclohexyl |
| 2-pyrroloethyl | 4-t-butyl-1-cyclohexyl |
| 3-N-methylpiperazinopropyl | 1,2,4-trimethyl-1-cyclopentyl |
| 2-diethylamino-1-propyl | 3,3,5-trimethyl-5-cyclohexyl |
| 3-diethylamino-2-propyl | 1-methyl-1-cycloheptyl |
| 3-morpholino-2-propyl | 3-bicyclo-[4.4.0]-decyl |
| 2-(1,4,5,6-tetrahydropyrimidino)ethyl | Isofenchyl |
| 1-(1,2,3,4-tetrahydronaphthyl) | 1-ethyl-1-indanyl |
| Allyl | σ-Chlorobenzyl |
| Crotyl | m-Bromobenzyl |
| 4-pentyn-1-yl | p-Butylbenzyl |
| 3-pentyn-1-yl | σ-Methylbenzyl |
| 3-methyl-1-buten-3-yl | m-Nitrobenzyl |
| 5-hexen-2-yl | σ-Fluorobenzyl |
| 2-methyl-3-penten-2-yl | p-Methoxybenzyl |
| 4-methyl-4-penten-2-yl | (4-imidazolyl)methyl |
| 2,2-dimethyl-3-buten-1-yl | σ-Acetylbenzyl |
| 4-hepten-1-yl | p-Carbethoxybenzyl |
| 1-hepten-4-yl | σ-Dimethylaminobenzyl |
| 4-octen-1-yl | Benzohydryl |
| Propargyl | Trityl |
| 1-butyn-4-yl | Cholesteryl |
| 1-pentyn-3-yl | 2-indanylmethyl |
| 1-hexyn-3-yl | 3-furylmethyl |
| 3-octyn-2-yl | 3-pryridylmethyl |
| 5-methyl-3-hexyn-2-yl | Benzyl |
| 3-(N-methyl)pyridyl | |
| 4-(N-methyl)pyridyl | |

In like manner but using the appropriate thiophenol in place of R₂OH, the following compounds are prepared.

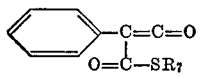

| R₇ | R₇ |
|---|---|
| Phenyl | p-Fluorophenyl |
| σ-Tolyl | 2,4-dichlorophenyl |
| p-Tolyl | 2,4,5-trichlorophenyl |
| m-Ethylphenyl | p-Methoxyphenyl |
| σ-n-Propylphenyl | σ-Ethoxyphenyl |
| p-Isopropylphenyl | 3-methoxy-4-methylphenyl |
| p-t-Butylphenyl | 4-methoxy-2,5-dimethylphenyl |
| 2,5-dimethylphenyl | 6-chloro-3-isopropylphenyl |
| 2,5-diethylphenyl | 4-bromo-3-methylphenyl |
| 2-methyl-5-isopropylphenyl | 2-chloro-3,5-dimethylphenyl |
| m-Chlorophenyl | 4,6-dichloro-3-dimethylphenyl |
| σ-Bromophenyl | σ-Trifluoromethylphenyl |

EXAMPLE IX

The following additional ketene esters are prepared by the general procedure of Example VIII from arylhalo carbonyl ketenes of Examples II and III wherein R₁ is 2-furyl, 2-thienyl, 3-thienyl, 2-pyridyl, 4-pyridyl, p-tolyl, σ-methoxyphenyl, p - methoxyphenyl, σ-trifluoromethylphenyl, p-chlorophenyl, σ-dimethylaminophenyl and p-dimethylaminophenyl. For convenience only the R₂ values are listed.

Repetition of this procedure but using the appropriate thiophenol in place of R₂OH produces the compounds:

| R₇ | R₇ |
|---|---|
| Phenyl | 2,3,4-trichlorophenyl |
| σ-Tolyl | m-Methoxyphenyl |
| p-Ethylphenyl | 3-methoxy-2-methylphenyl |
| m-Tolyl | σ-Ethoxyphenyl |
| p-Butylphenyl | 6-methoxy-2-methylphenyl |
| 3,5-dimethylphenyl | 4-methoxy-3,5-dimethylphenyl |
| 2,5-diethylphenyl | 5-chloro-2-methylphenyl |
| 2-methyl-5-isopropylphenyl | 5-bromo-2-methylphenyl |
| σ-Chlorophenyl | 4-chloro-3,5-dimethylphenyl |
| m-Bromophenyl | 2,4-dichloro-3-methylphenyl |
| p-Fluorophenyl | p-Trifluoromethylphenyl |
| 2,5-dichlorophenyl | |

EXAMPLE X

Again following the procedure of Example VIII, the arylcarboxyketene esters listed below are prepared. The aryl group, $R_1$, for each of the $R_2$ values is 3-furyl, m-tolyl-m - methoxyphenyl, p - trifluoromethylphenyl, 3-pyridyl, o-isopropylphenyl, o-chlorophenyl, o-bromophenyl, m-bromophenyl, m-chlorophenyl, o-butoxyphenyl, o-butylphenyl, o-diethylaminophenyl and m-dimethylaminophenyl.

| $R_1$ | $R_2$ |
|---|---|
| Methyl | 3-cyanopropyl |
| n-Propyl | 1-cyano-2-chloropropyl |
| t-Butyl | 1-cyano-2,2,2-trichloroethyl |
| Dodecyl | 1-methyl-1-(1'-cyano-1'-methylethoxy)propyl |
| Octadecyl | 2-propionyloxyethyl |
| 3-chloropropyl | 2-acetoxy-n-butyl |
| 3-chloro-1-butyl | 4-propionyloxy-n-butyl |
| 1-methyl-2-chloropropyl | Carbomethoxymethyl |
| 1,1-dimethyl-2-chloroethyl | 2-carbethoxyethyl |
| 2-bromopropyl | 3-carbomethoxypropyl |
| 4-bromo-1-butyl | 1-carbethoxyethyl |
| 1,3-dichloropropyl | 1-trichloromethyl-2-carbomethoxyethyl |
| 1,4-dibromo-2-butyl | 1-carbethoxy-2-chloropropyl |
| 2,2-dichloroethyl | 1-carbomethoxy-2,2,2-trichloroethyl |
| 2,2,3-trichlorobutyl | 1-carbomethoxyethyl-2,2,2-trichloroethyl |
| 2,2,2-trichloroethyl | Acetonyl |
| 2-(2-trifluoromethyl(propyl) | 2-oxopentyl |
| 2-nitroethyl | 2-acetylbutyl |
| 2-nitrobutyl | 3-oxopentyl |
| 4-nitrobutyl | 4-oxohexyl |
| 1-methyl-2-nitropropyl | 1-methoxy-2,2,2-trichloroethyl |
| 2-chloro-2-nitropropyl | 2,3-diacetoxypropyl |
| 1-trifluoromethylethyl | 2-fluoroethyl |
| 2-methoxyethyl | 1-trifluoromethyl-2-nitroethyl |
| 2-isobutoxyethyl | Carbethoxyethoxymethyl |
| 3-methoxypropyl | 2,4-dibromophenyl |
| 4-ethoxy-n-butyl | Pentachlorophenyl |
| Phenyl | 2-bromo-4-fluorophenyl |
| o-Tolyl | 5-bromo-2-methoxyphenyl |
| m-Ethylphenyl | 3-methoxy-2-methylphenyl |
| o-N-propylphenyl | 2-acetyl-4-fluorophenyl |
| p-Chlorophenyl | 2-dimethylamino-3,5-dimethylphenyl |
| m-Bromophenyl | 4-carbethoxy-2-chlorophenyl |
| p-Methoxyphenyl | p-(Carbo-t-butoxy)phenyl |
| o-Ethoxyphenyl | 2,3-dimethoxyphenyl |
| o-Fluorophenyl | 5-indanyl |
| m-Nitrophenyl | 5-(1,2,3,4-tetrahydronaphthyl) |
| o-Carboisopropoxyphenyl | 4-quinolyl |
| p-Dimethylaminophenyl | 2-(1-methylimidazolyl) |
| 2,5-dimethylphenyl | 1-naphthyl |
| 4-isopropyl-3-methylphenyl | 2-dimethylaminoethyl |
| o-Formylphenyl | 3-diethylaminopropyl |
| Cyclopropyl | 2-piperidinoethyl |
| Cyclohexyl | 3-morpholino-2-propyl |
| 1-methyl-1-cyclohexyl | 2-(4-methylpiperidino)ethyl |
| 1-indanyl | 3-piperidino-2-propyl |
| 2-methyl-1-indanyl | 2-diethylamino-1-propyl |
| 7-adamantanyl | 3-diethylamino-2-propyl |
| 1-isopropyl-1-cyclohexyl | 2-morpholinoethyl |
| 2-methyl-6-ethyl-1-cyclohexyl | 3-thiomorpholinopropyl |
| Bicyclo-[4.4.0]-3-decyl | 2-pyrrolidinoethyl |
| 1-methyl-1-cycloheptyl | 3-pyrrolopropyl |
| 1,2,5-trimethyl-1-cyclopentyl | 2-diisopropylaminoethyl |
| Thujyl | 2-(1,4,5,6-tetrahydropyrimidino)ethyl |
| 4-chloro-1-indanyl | Benzyl |
| 3-bromo-1-indanyl | o-Bromobenzyl |
| 1-(2-chloro-1,2,3,4-tetrahydronaphthyl) | p-Chlorobenzyl |
| Allyl | p-Fluorobenzyl |
| 3-buten-1-yl | o-Nitrobenzyl |
| 3-penten-2-yl | o-Dimethylaminobenzyl |
| 1-penten-5-yl | m-Methylbenzyl |
| 2-methyl-3-buten-1-yl | o-Acetylbenzyl |
| 4-hexen-1-yl | p-Ethoxybenzyl |
| 4-methyl-3-penten-2-yl | Benzohydryl |
| Propargyl | Trityl |
| 2-butyn-1-yl | Cholesteryl |
| 1-pentyn-3-yl | (1-indanyl)methyl |
| 1-hexyn-3-yl | (2-pyrrolidono)methyl |
| 2-heptyn-1-yl | |
| 3-ethyl-1-pentyn-3-yl | |
| 4-octyn-1-yl | |
| 3-N-(methyl)pyridyl | |
| 2-cyanoethyl | |

Replacement of $R_2OH$ in the above procedure of $R_7SH$ produces the following compounds:

| $R_7$ | $R_7$ |
|---|---|
| Phenyl | 2,4,5-trichlorophenyl |
| o-Tolyl | p-Methoxyphenyl |
| p-Ethylphenyl | m-Ethoxyphenyl |
| o-Isopropylphenyl | 2-methoxy-4-methylphenyl |
| 2,5-diethylphenyl | 4-methoxy-2,5-dimethylphenyl |
| 3-methyl-5-ethylphenyl | 4-chloro-2-methylphenyl |
| p-Chlorophenyl | 4-bromo-3-methylphenyl |
| o-Bromophenyl | 5-chloro-2,4-dimethylphenyl |
| p-Fluorophenyl | 4,6-dichloro-3-methylphenyl |
| p-Trifluoromethylphenyl | |

EXAMPLE XI

General methods for acylation of 6-aminopenicillanic acid

To a solution of the appropriate aryl halocarbonyl ketene (0.1 mole) in methylene chloride (sufficient to provide a clear solution and generally from about 5 to 10 ml. per gram of ketene) there is added the proper alcohol $R_2OH$ (0.1 mole). The reaction mixture is maintained under an atmosphere of nitrogen and stirred for a period of from 20 minutes to 3 hours, care being taken to exclude moisture. The temperature may range from about $-70°$ C. to about $-20°$ C. The infrared spectrum of the mixture is then taken to determine and confirm the presence of the ketene ester. A solution of 6-aminopenicillanic acid-triethylamine salt (0.1 mole) in methylene-chloride (50 ml.) is added and the mixture stirred at $-70°$ to $-20°$ C. for ten minutes. The cooling bath is then removed and the reaction mixture stirred continuously and allowed to warm to room temperature. The product is isolated by one of the methods below.

Method A.—The reaction mixture is evaporated to dryness under reduced pressure and the residue taken up in citrate buffer (pH 5.5). The product is extracted from the buffer solution with chloroform. The chloroform extract is washed with citrate buffer (pH 5.5) then dried with anhydrous sodium sulfate and evaporated to dryness to give the sodium salt.

Method B.—The procedure of Method A is followed but using n-butanol as extracting solvent in place of chloroform. The product obtained after evaporation of the n-butanol solvent is triturated with ether to give an amorphous solid.

Method C.—This procedure, a variation of Method A, uses a saturated aqueous solution of sodium (or potassium) bicarbonate in place of citrate buffer to produce the sodium (or potassium) salt of the penicillin product. It is generally used for the recovery of those penicillin products which are poorly soluble in methylene chloride or chloroform.

Method D.—The reaction mixture is extracted twice with saturated aqueous sodium or potassium bicarbonate, washed with water, dried and evaporated to dryness to give the sodium (or potassium) salt. The product, if not a solid, is triturated with ether.

Method E.—This method, a modification of Method D, is used for those penicillins which are difficultly soluble in methylene chloride. The sodium (or potassium) bicarbonate solution (Method D) is extracted with n-butanol, the butanol extract dried and evaporated to dryness.

Method F.—This method is used to isolate the free acid form of the penicillins.

The residue remaining after evaporation of the reaction mixture to dryness is taken up in aqueous acid, e.g. HCl, at pH 2.7 and the product extracted therefrom by means of n-butanol. The butanol extract is washed with aqueous acid (pH 2.7) and then lyophilized.

Method F.—The butanol extract of Method F is neutralized with an n-butanol solution of potassium 2-ethyl hexanoate to precipitate the potassium salt of the penicillin.

The following compounds are thus prepared.

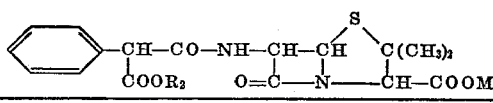

| $R_2$ | Method | M |
|---|---|---|
| Methyl | A | Na |
| Ethyl | A | Na |
| n-Propyl | A | Na |
| i-Propyl | A | Na |
| n-Butyl | A | Na |
| Sec-butyl | A | Na |
| i-Butyl | A | Na |
| t-Butyl | A | Na |
| 2-ethyl-1-butyl | D | K |
| Hexyl | B | Na |
| Octyl | D | K |

TABLE—Continued

| $R_2$ | Method | M |
|---|---|---|
| Decyl | | K |
| Dodecyl | B | Na |
| Tetradecyl | D | Na |
| Octadecyl | D | K |
| 2-chloroethyl | A | Na |
| 2-chloropropyl | A | Na |
| 3-chloropropyl | A | Na |
| 1-methyl-2-chloroethyl | A | Na |
| 2-chloro-1-butyl | A | Na |
| 3-chloro-1-butyl | A | Na |
| 4-chloro-1-butyl | A | Na |
| 1-ethyl-2-chloroethyl | A | Na |
| 1-methyl-3-chloropropyl | A | Na |
| 1-methyl-2-chloropropyl | A | Na |
| 2,2-dimethyl-2-chloroethyl | A | Na |
| 1,1-dimethyl-2-chloroethyl | A | Na |
| 2-bromoethyl | B | K |
| 2-bromopropyl | B | K |
| 3-bromopropyl | B | K |
| 1-methyl-2-bromoethyl | B | K |
| 2-bromo-1-butyl | B | K |
| 4-bromo-1-butyl | B | K |
| 1-ethyl-2-bromoethyl | B | K |
| 1,1-dimethyl-2-bromoethyl | B | K |
| 1,3-dichloropropyl | A | Na |
| 2,3-dibromopropyl | A | Na |
| 1,1-dichloromethylethyl | A | Na |
| 2-bromo-3-chloropropyl | A | Na |
| 2-chloro-3-bromopropyl | A | Na |
| 1,4-dibromo-2-butyl | A | Na |
| 3,4-dichloro-1-butyl | A | Na |
| 3,4-dichloro-2-butyl | A | Na |
| 1-bromomethyl-2-chloroethyl | A | Na |
| 2,3-dibromo-2-methylpropyl | A | Na |
| 1,1-dichloromethylethyl | A | Na |
| 2,2-dichloroethyl | A | Na |
| 1-1-dimethyl-2,2-dichloroethyl | A | Na |
| 1,methyl-1-trichloromethylethyl | A | Na |
| 2,3,3-tribromopropyl | A | Na |
| 2,2,3-tribromopropyl | A | Na |
| 2,2,3-trichlorobutyl | A | Na |
| 2-chloro-2,3-dibromobutyl | A | Na |
| 2,2,3,3-tetrabromopropyl | A | Na |
| 2,2,2-trichloroethyl | A | Na |
| 2,2,2-trifluoroethyl | A | Na |
| 2-(2-trifluoromethyl)propyl | A | Na |
| 3,3,3-trifluoropropyl | A | Na |
| 2-nitroethyl | B | K |
| 2-nitropropyl | B | K |
| 3-nitropropyl | B | K |
| 1-methyl-2-nitroethyl | B | K |
| 2-nitrobutyl | B | K |
| 3-nitrobutyl | B | K |
| 4-nitrobutyl | B | K |
| 1-ethyl-2-nitroethyl | B | K |
| 1-methyl-2-nitroethyl | B | K |
| 2-methyl-2-nitropropyl | B | K |
| 2,2-dinitroethyl | C | Na |
| 1-methyl-2,2-dinitroethyl | C | Na |
| 1-ethyl-2,2-dinitroethyl | C | Na |
| 2-bromo-2-nitroethyl | B | Na |
| 2-chloro-2-nitropropyl | B | Na |
| 2-bromo-2-nitropropyl | B | Na |
| 1-methyl-2-chloro-2-nitroethyl | B | Na |
| 3-methyl-3-nitropropyl | B | Na |
| 1-methyl-2-bromo-2-nitroethyl | B | Na |
| 2-chloro-2-nitrobutyl | B | Na |
| 1-trichloromethyl-2-nitroethyl | B | Na |
| 1-trifluoromethylethyl | A | Na |
| 1-trifluoromethylpropyl | A | Na |
| 1,1-dimethyl-2,2,2-trifluoroethyl | A | Na |
| 1,1-dimethyl-2,2,2-trichloroethyl | A | Na |
| 1-ethyl-1-methyl-2,2,2-trichloroethyl | A | Na |
| 2-methoxyethyl | F-1 | K |
| 2-ethoxyethyl | F-1 | K |
| 2-isopropoxyethyl | F-1 | K |
| 2-n-butoxyethyl | F-1 | K |
| 2-isobutoxyethyl | F-1 | K |
| 3-methoxypropyl | F-1 | K |
| 3-sec-butoxypropyl | F-1 | K |
| 3-n-propoxypropyl | F-1 | K |
| 4-methoxy-n-butyl | F-1 | K |
| 4-ethoxy-n-butyl | F-1 | K |
| 4-butoxy-n-butyl | F-1 | K |
| 1,1-dimethyl-2-methoxyethyl | F-1 | K |
| 1,1-dimethyl-2-ethoxyethyl | F-1 | K |
| 1-cyanoethyl | E | K |
| 2-cyanoethyl | E | K |
| 3-cyanopropyl | E | K |
| 4-cyanobutyl | E | K |
| 2-cyano-1-methylpropyl | E | K |
| 2-cyano-1-methylethyl | E | K |
| 1-cyano-1-methylethyl | E | K |
| 1-chloromethyl-2-cyanoethyl | B | K |
| 1-cyano-2-chloropropyl | B | K |
| 1-cyano-2,2-dichloropropyl | B | K |
| 1-cyano-1-chloromethyl-2-chloroethyl | B | K |
| 1-cyano-2,2,2-trichloroethyl | B | K |
| 1-cyano-2,2,2-tribromoethyl | B | K |
| 1-methyl-1-(1'-cyano-1'-methylethoxy)ethyl | B | K |
| 1-methyl-1-(1'-cyano-1'-methylethoxy)propyl | B | K |
| 2-formyloxyethyl | B | Na |
| 2-acetoxyethyl | B | Na |
| 2-propionyloxyethyl | B | Na |
| 2-butyryloxyethyl | B | Na |
| 2-acetoxypropyl | B | Na |
| 3-butyryloxypropyl | B | Na |
| 3-acetoxypropyl | B | Na |
| 2-acetoxy-n-butyl | B | Na |
| 4-acetoxy-n-butyl | B | Na |
| 4-propionyloxy-n-butyl | B | Na |
| 1-methyl-2-acetoxyethyl | B | Na |
| 1-methyl-3-acetoxypropyl | B | Na |
| Carbomethoxymethyl | B | Na |
| Carbobutoxymethyl | B | Na |
| 2-carbethoxyethyl | B | Na |
| 2-carboisopropoxyethyl | B | Na |
| 3-carbomethoxypropyl | B | Na |
| 3-carbobutoxypropyl | B | Na |
| 4-carbethoxybutyl | C | Na |
| 4-carboproproxybutyl | C | Na |
| 1-methyl-2-carbomethoxyethyl | C | Na |
| 2-carbethoxypropyl | C | Na |
| 1-carbethoxyethyl | C | Na |
| 1-carbethoxypropyl | C | Na |
| 1-chloromethyl-2-carbethoxyethyl | B | K |
| 1-trichloromethyl-2-carbomethoxyethyl | B | K |
| 1-carbethoxy-2-chloropropyl | B | K |
| 1-carbopropoxy-2-chloropropyl | B | K |
| 1-carbethoxy-2,2-dichloropropyl | B | K |
| 1-carbethoxy-1-chloromethyl-2-chloroethyl | B | K |
| 1-carbomethoxy-2,2,2-trichloroethyl | B | K |
| 1-carbethoxy-2-chloroethyl | B | K |
| 1-carbomethoxy-2-chloroethyl | B | K |
| 1-carboisobutyloxy-2,2,2-trichloroethyl | B | K |
| 1-carbomethoxymethyl-2,2,2-trichloroethyl | B | K |
| Acetonyl | E | Na |
| Acetonylmethyl | E | Na |
| 2-oxopentyl | E | Na |
| 1-methyl-3-oxobutyl | E | Na |
| 4-oxopentyl | E | Na |
| 2-methyl-3-oxobutyl | E | Na |
| 1,1-dimethylacetonyl | E | Na |
| 1-methyl-4-oxopentyl | E | Na |
| 1-ethyl-2-oxoethyl | E | Na |
| 1-methyl-3-oxobutyl | E | Na |
| 1-acetyl-1-methylpropyl | B | Na |
| 1,2-dimethyl-3-oxobutyl | B | Na |
| 1,1-dimethyl-3-oxobutyl | B | Na |
| 2-methyl-3-oxopentyl | B | Na |
| 2-acetylbutyl | B | Na |
| 1-acetonylbutyl | B | Na |
| 1-methyl-3-oxohexyl | B | Na |
| 1-ethyl-2-methyl-3-oxobutyl | B | Na |
| 1-methyl-4-methyl-3-oxopentyl | B | Na |
| 2-acetylpropyl | B | Na |
| 3-oxopentyl | B | Na |
| 1-methyl-2-oxohexyl | B | Na |
| 4-oxohexyl | B | Na |
| 5-oxohexyl | B | Na |
| 1-methoxy-2,2,2-trichlorethyl | A | Na |
| 1-ethoxy-2,2,2-trichloroethyl | A | Na |
| 1-propoxy-2,2,2-trichloroethyl | A | Na |
| 1-butoxy-2,2,2-trichloroethyl | A | Na |
| 1-methoxy-2,2,2-trifluoroethyl | A | Na |
| 1-ethoxy-2,2,2-trifluoroethyl | A | Na |
| 1-butoxy-2,2,2-trifluoroethyl | A | Na |
| 2,3-diacetoxypropyl | B | K |
| 2,3-dibutyryloxypropyl | B | K |
| 2,3-dicapryloxypropyl | B | K |
| 2,3-dicaproyloxypropyl | B | K |
| 2,3-distearoyloxypropyl | B | K |
| (1,2,3-tricarbomethoxy)-2-propyl | B | K |
| (1,2,3-tricarbethoxy)-2-propyl | B | K |
| (1,2,3-tricarbopropoxy)-2-propyl | B | K |
| (1,2,3-tricarbobutoxy)-2-propyl | B | K |
| 2-chloro-3,3-dimethoxypropyl | B | K |
| 2-chloro-3,3-diethoxypropyl | B | K |
| 3,3-diethoxypropyl | B | K |
| 1-methyl-2,2-diethoxyethyl | B | K |
| 2-oxo-3-chloropropyl | B | K |
| 1-methyl-3-oxobutyl | B | K |
| 1-trichloromethyl-3-oxobutyl | B | K |
| 1-chloromethyl-4-oxopentyl | B | K |
| 1-ethyl-2-oxobutyl | B | K |
| 2,2-dimethyl-3-oxopentyl | B | K |
| 1,1,3-trimethyl-2-oxobutyl | B | K |
| 2-chloro-2-nitro-3-methylbutyl | B | K |
| 2-chloromethyl-3-chloro-2-nitropropyl | B | K |
| 3-chloro-3-nitropropyl | B | K |
| 2-fluoroethyl | A | Na |
| 3-fluoropropyl | A | Na |
| 1-chloromethyl-2-fluoroethyl | A | Na |
| 2,2,3,3,4,4,4-heptafluorobutyl | A | Na |
| 1-nitro-1-trifluoromethyl-2,2,2-trifluoroethyl | A | Na |
| 1,trichloromethyl-2,3,3,3-terrachloropropyl | A | Na |
| 2-chloro-3,3-difluoropropyl | A | Na |
| 1-methoxy-2-chloro-2,2-difluoroethyl | A | Na |
| 1-trifluoromethyl-2-nitroethyl | A | Na |
| 4,4,4-trifluorobutyl | A | Na |
| Dicarbethoxymethyl | B | Na |
| 1,1-dicarbethoxymethyl-2-ethoxyethyl | B | Na |
| Carbethoxyethoxymethyl | B | Na |
| Chlorodicarbomethoxymethyl | B | Na |
| Bromodicarbomethoxymethyl | B | Na |
| 1-isopropoxy-2,2,2-trichloroethyl | A | Na |
| 1-sec-butoxy-2,2,2-trichloroethyl | A | Na |
| 1-isobutyoxy-2,2,2-trichloroethyl | A | Na |
| 1-t-butoxy-2,2,2-trichloroethyl | A | Na |
| Dicarbomethoxyethoxymethyl | B | Na |
| Cyclopropyl | A | Na |
| Cyclobutyl | A | Na |
| Cyclopentyl | A | Na |
| Cyclohexyl | A | Na |
| Cycloheptyl | A | Na |
| 1-methyl-1-cyclopentyl | A | Na |
| 2-methyl-1-cyclopentyl | A | Na |

TABLE—Continued

| $R_2$ | Method | M |
|---|---|---|
| 3-methyl-1-cyclopentyl | A | Na |
| 2,2-dimethyl-1-cyclopentyl | B | K |
| 1,3-dimethyl-1-cyclopentyl | B | K |
| 2,5-dimethyl-1-cyclopentyl | B | K |
| 2,4-dimethyl-1-cyclopentyl | B | K |
| 1,2,2-trimethyl-1-cyclopentyl | B | K |
| 1,2,5-trimethyl-1-cyclopentyl | B | K |
| 2,3,4-trimethyl-1-cyclopentyl | B | K |
| 1,2,4-trimethyl-1-cyclopentyl | B | K |
| 1-isopropyl-1-cyclopentyl | B | K |
| 3-isopropyl-1-cyclopentyl | B | K |
| 1-methyl-1-cyclohexyl | B | K |
| 2-methyl-1-cyclohexyl | B | K |
| 3-methyl-1-cyclohexyl | B | K |
| 3-methyl-1-indanyl | A | Na |
| 3-ethyl-1-indanyl | A | Na |
| 5-methyl-1-indanyl | B | K |
| 7-methyl-1-indanyl | B | K |
| 2,2-dimethyl-1-indanyl | B | K |
| 2,3-dimethyl-1-indanyl | B | K |
| 2,3-diethyl-1-indanyl | B | K |
| 3,3-dimethyl-1-indanyl | B | K |
| 2-chloro-1-indanyl | A | Na |
| 4-chloro-1-indanyl | A | Na |
| 2-bromo-1-indanyl | A | Na |
| 3-bromo-1-indanyl | A | Na |
| 1-chloro-2-indanyl | A | Na |
| 9-fluorenyl | B | K |
| 2,4-dipropyl-1-cyclopentyl | B | K |
| 3-isobutyl-5-methyl-1-cyclohexyl | B | K |
| 2-isobutyl-5-methyl-1-cyclohexyl | B | K |
| 1,5-dimethyl-2-isopropyl-1-cyclohexyl | B | K |
| 2,2,3,6,6-pentamethyl-1-cyclohexyl | B | K |
| 2,2,4,4,6-pentamethyl-1-cyclohexyl | B | K |
| 2-methyl-4-sec-butyl-1-cyclohexyl | B | K |
| 1-(2-methyl-1,2,3,4-tetrahydronaphthyl) | B | K |
| 1-(4-methyl-1,2,3,4-tetrahydronaphthyl) | B | K |
| 1-(7-methyl-1,2,3,4-tetrahydronaphthyl) | B | K |
| 1-(1,3-dimethyl-1,2,3,4-tetrahydronaphthyl) | B | K |
| 1-(3,4-dimethyl-1,2,3,4-tetrahydronaphthyl) | B | K |
| 1-(5,8-dimethyl-1,2,3,4-tetrahydronaphthyl) | B | K |
| 1-(1,2,7-trimethyl-1,2,3,4-tetrahydronaphthyl) | B | K |
| 1-(4,5,7-trimethyl-1,2,3,4-tetrahydronaphthyl) | B | K |
| 1-(1,5,8-trimethyl-1,2,3,4-tetrahydronaphthyl) | B | K |
| 2-(1-methyl-1,2,3,4-tetrahydronaphthyl) | B | K |
| 2-(6-methyl-1,2,3,4-tetrahydronaphthyl) | B | K |
| 2-(2,6-dimethyl-1,2,3,4-tetrahydronaphthyl) | B | K |
| 2-(4,4-dimethyl-1,2,3,4-tetrahydronaphthyl) | B | K |
| 2-(1,1,4,5-tetramethyl-1,2,3,4-tetrahydronaphthyl) | B | K |
| 1-(2-chloro-1,2,3,4-tetrahydronaphthyl) | B | K |
| 1-(3-chloro-1,2,3,4-tetrahydronaphthyl) | B | K |
| 2-(1-bromo-1,2,3,4-tetrahydronaphthyl) | B | K |
| 1-(2-bromo-1,2,3,4-tetrahydronaphthyl) | B | K |
| 2-(3-bromo-1,2,3,4-tetrahydronaphthyl) | B | K |
| Phenyl | B | Na |
| o-Tolyl | B | Na |
| m-Tolyl | B | Na |
| p-Tolyl | B | Na |
| o-Ethylphenyl | B | Na |
| m-Ethylphenyl | B | Na |
| o-N-propylphenyl | B | Na |
| p-N-propylphenyl | B | Na |
| o-Isopropylphenyl | B | Na |
| p-T-butylphenyl | B | Na |
| o-Methoxyphenyl | B | Na |
| m-Methoxyphenyl | B | Na |
| p-Methoxyphenyl | B | Na |
| o-Ethoxyphenyl | B | Na |
| m-Ethoxyphenyl | B | Na |
| p-Ethoxyphenyl | B | Na |
| p-N-butoxyphenyl | B | Na |
| o-Chlorophenyl | A | Na |
| m-Chlorophenyl | A | Na |
| p-Chlorophenyl | A | Na |
| o-Bromophenyl | A | Na |
| m-Bromophenyl | A | Na |
| m-Fluorophenyl | A | Na |
| p-Fluorophenyl | A | Na |
| o-Formylphenyl | A | Na |
| m-Formylphenyl | A | Na |
| o-Acetylphenyl | A | Na |
| p-Acetylphenyl | A | Na |
| p-Butyrylphenyl | A | Na |
| o-Nitrophenyl | C | K |
| m-Nitrophenyl | C | K |
| p-Nitrophenyl | C | K |
| o-Carbomethoxyphenyl | C | Na |
| m-Carbomethoxyphenyl | C | Na |
| p-Carbomethoxyphenyl | C | Na |
| o-Carbethoxyphenyl | C | Na |
| p-Carbo-n-propoxyphenyl | C | Na |
| p-Carbo-n-octyloxyphenyl | C | Na |
| o-Dimethylaminophenyl | F-1 | K |
| o-Diethylaminophenyl | F-1 | K |
| o-Di-n-butylaminophenyl | F-1 | K |
| m-Dimethylaminophenyl | F-1 | K |
| m-Di-n-propylaminophenyl | F-1 | K |
| p-Dimethylaminophenyl | F-1 | K |
| p-Methylethylaminophenyl | F-1 | K |
| p-Methylisopropylaminophenyl | F-1 | K |
| 2,3-dimethylphenyl | D | K |
| 2,4-dimethylphenyl | D | K |
| 2,5-dimethylphenyl | D | K |
| 2,6-dimethylphenyl | D | K |
| 3,4-dimethylphenyl | D | K |
| 3,5-dimethylphenyl | D | K |
| 2,3-diethylphenyl | D | K |
| 2,4-diethylphenyl | D | K |
| 2,6-diethylphenyl | D | K |
| 2,4-di-n-propylphenyl | D | K |
| 2,6-di-n-propylphenyl | D | K |
| 5-ethyl-3-methylphenyl | D | K |
| 6-ethyl-2-methylphenyl | D | K |
| 2-ethyl-4-methylphenyl | D | K |
| 2-methyl-6-n-propylphenyl | D | K |
| 4-isopropyl-3-methylphenyl | D | K |
| 2-methyl-4-sec-butylphenyl | B | Na |
| 3-methyl-4-t-butylphenyl | B | Na |
| 2,3,4-trimethylphenyl | B | Na |
| 2,4,6-trimethylphenyl | B | Na |
| 3,4,5-trimethylphenyl | B | Na |
| 2,6-dimethyl-4-ethylphenyl | B | Ma |
| 3,5-dimethyl-4-ethylphenyl | B | Na |
| 4,6-dimethyl-2-ethylphenyl | B | Na |
| 2,6-diethyl-4-methylphenyl | B | Na |
| 4,5-dimethyl-2-isopropylphenyl | B | Na |
| 2,3,4,6-tetramethylphenyl | B | Na |
| 3,6-diethyl-2,4-dimethylphenyl | B | Na |
| 4-butyl-5-isopropyl-2-methylphenyl | B | Na |
| Pentamethylphenyl | B | Na |
| 2,6-dichlorophenyl | A | Na |
| 2,4-dibromophenyl | A | Na |
| 2,6-dibromphenyl | A | Na |
| 2,3,6-trichlorophenyl | A | Na |
| 2,4,6-trichlorophenyl | A | Na |
| 3,4,5-trichlorophenyl | A | Na |
| 2,4,6-tribromophenyl | A | Na |
| 2,3,5,6-tetrachlorophenyl | A | Na |
| 2,3,4,6-tetrabromphenyl | A | Na |
| Pentachlorophenyl | A | Na |
| Pentabromophenyl | A | Na |
| 2,4-dinitrophenyl | C | Na |
| 2,6-dinitrophenyl | C | Na |
| 3,5-dinitrophenyl | C | Na |
| 2,3,6-trinitrophenyl | C | Na |
| 2,3,4,6-tetranitrophenyl | C | Na |
| Pentanitrophenyl | C | Na |
| 2,4-difluorophenyl | A | Na |
| 2,6-difluorophenyl | A | Na |
| 2,3,5-trifluorophenyl | A | Na |
| 2,4,6-trifluorophenyl | A | Na |
| 2,3,5,6-tetrafluorophenyl | A | Na |
| Pentafluorophenyl | A | Na |
| 3-chloro-2-fluorophenyl | A | Na |
| 3-chloro-4-fluorophenyl | A | Na |
| 2-bromo-4-fluorophenyl | A | Na |
| 2,6-dichloro-4-fluorophenyl | A | Na |
| 4,5-dichloro-2-fluorophenyl | A | Na |
| 4-bromo-3,5-difluorophenyl | A | Na |
| 4,6-dibromo-2-fluorophenyl | A | Na |
| 2-bromo-3,5-dichloro-4-fluorophenyl | A | Na |
| 3-fluoro-2,4,6-trichlorophenyl | A | Na |
| 2-methoxy-4-methylphenyl | A | Na |
| 5-bromo-2-methoxyphenyl | A | Na |
| 4-bromo-3-methoxyphenyl | A | Na |
| 2-chloro-6-methoxyphenyl | A | Na |
| 3-methoxy-2-methylphenyl | B | K |
| 2-ethoxy-3-methylphenyl | B | K |
| 2-methoxy-6-propylphenyl | B | K |
| 2-carbomethoxy-5-fluorophenyl | B | K |
| 5-fluoro-2-methoxyphenyl | B | K |
| 2-acetyl-4-fluorophenyl | B | K |
| 4-acetyl-2-fluorophenyl | B | K |
| 6-chloro-2-methylphenyl | B | Na |
| 4-chloro-2-methylphenyl | B | Na |
| 2-chloro-5-methylphenyl | B | Na |
| 2-fluoro-4-methylphenyl | B | Na |
| 4-fluoro-3-methylphenyl | B | Na |
| 2-bromo-6-methylphenyl | B | Na |
| 3-bromo-5-methylphenyl | B | Na |
| 2-bromo-4-t-butylphenyl | B | Na |
| 2-chloro-4-isopropylphenyl | B | Na |
| 2-ethyl-4-fluorophenyl | B | Na |
| 2-isobutyl-4-fluorophenyl | B | Na |
| 6-bromo-3,4-dimethylphenyl | B | K |
| 4-chloro-2,3-dimethylphenyl | B | K |
| 4-chloro-3,5-dimethylphenyl | B | K |
| 4-chloro-2,5-dimethylphenyl | B | K |
| 4-chloro-2,6-dimethylphenyl | B | K |
| 4-chloro-6-isopropyl-3-methylphenyl | B | Na |
| 4-bromo-3-isopropyl-6-methylphenyl | B | K |
| 4-chloro-2,3-diethylphenyl | B | K |
| 2-chloro-4,5-dimethylphenyl | B | K |
| 2-chloro-3,4-dimethylphenyl | B | K |
| 4,6-dichloro-2-methylphenyl | B | K |
| 4,6-dibromo-2-methylphenyl | B | K |
| 2,4-dichloro-3,5-dimethylphenyl | B | K |
| 4-chloro-2,3,5-trimethylphenyl | B | K |
| 4-chloro-2-nitrophenyl | B | K |
| 4-chloro-2,6-dinitrophenyl | B | K |
| 6-chloro-2,4-dinitrophenyl | B | K |
| 3-fluoro-4-nitrophenyl | B | K |
| 3-chloro-4-fluoro-6-nitrophenyl | B | K |
| 2-bromo-6-fluoro-4-nitrophenyl | E | K |
| 2,4-dibromo-3-fluoro-6-nitrophenyl | E | K |
| 4-chloro-5-fluoro-2-nitrophenyl | E | K |
| 4-acetyl-2-fluoro-5-nitrophenyl | E | K |
| 2-acetyl-6-bromo-4-fluorophenyl | E | K |
| 2-fluoro-4-propionylphenyl | E | K |
| 2-fluoro-4-butyrylphenyl | E | K |
| 3,4-dicarbomethoxy-2,5,6-tribromophenyl | B | K |
| 2-acetyl-4-chlorophenyl | B | K |
| 4-acetyl-2-chlorophenyl | B | K |
| 4-acetyl-2-bromophenyl | B | K |
| 2-acetyl-3,5-dichlorophenyl | A | Na |
| 2-acetyl-4-methoxyphenyl | A | Na |
| 4-chloro-2-propionylphenyl | A | Na |
| 2-acetyl-6-dimethylaminophenyl | F-1 | K |

TABLE—Continued

| R₂ | Method | M |
|---|---|---|
| 4-dimethylamino-2-methylphenyl | F-1 | K |
| 4-carbomethoxy-2-dimethylaminophenyl | F-1 | K |
| 2-carbomethoxy-5-dimethylaminophenyl | F-1 | J |
| 4-t-butyl-3-nitrophenyl | B | Na |
| 2-methyl-4-nitro-5-isopropylphenyl | B | Na |
| 2-methyl-6-nitro-4-isopropylphenyl | B | Na |
| 6-nitro-1,2,3,4-tetramethylphenyl | B | Na |
| 2-methoxy-5-nitro-4-propylphenyl | B | Na |
| 2-nitro-3,4,5-trimethylphenyl | B | Na |
| 2-ethyl-6-methyl-4-nitrophenyl | B | Na |
| 4-chloro-5-fluoro-2-nitrophenyl | B | Na |
| 2,3-dimethoxyphenyl | A | Na |
| 2,6-dimethoxyphenyl | A | Na |
| 3,4-dimethoxy-4-methylphenyl | A | Na |
| 3,5-dimethoxy-2-methylphenyl | A | Na |
| 2,5-dimethoxy-4-propylphenyl | A | Na |
| 3,5-diethoxy-2,6-dimethylphenyl | A | Na |
| 3,4,5-trimethoxyphenyl | A | Na |
| m-Acetylphenyl | B | K |
| o-Propionylphenyl | B | K |
| p-Propionylphenyl | B | K |
| 3-carbomethoxy-5-methoxyphenyl | B | K |
| 2-carbomethoxy-4-methoxyphenyl | B | K |
| 2-carbomethoxy-6-methoxyphenyl | B | K |
| 2,5-dicarbomethoxyphenyl | B | K |
| 3,4-dicarbomethoxyphenyl | B | K |
| 3,4-dicarbethoxyphenyl | B | K |
| 2,3-dicarbomethoxyphenyl | B | K |
| 2,6-dicarbomethoxyphenyl | B | K |
| 2,4-dicarbomethoxyphenyl | B | K |
| 3,5-dicarbomethoxyphenyl | B | K |
| 2,4-dicarbomethoxy-3,5-dimethylphenyl | B | K |
| 2-carbomethoxy-3-methoxy-5-methylphenyl | E | K |
| 4-carbomethoxy-2,6-dichlorophenyl | E | K |
| 2-carbomethoxy-3,5-dimethoxy-4,6-dimethylphenyl | E | K |
| 4-carbomethoxy-2,6-dimethoxyphenyl | E | K |
| 2-bromo-4-carbomethoxy-6-methoxyphenyl | E | K |
| 4-carbomethoxy-2-methoxy-3-nitrophenyl | E | K |
| 5-carbomethoxy-2-methoxy-3-nitrophenyl | E | K |
| 3-carbomethoxy-2,4-dinitro-6-methoxyphenyl | E | K |
| 4-indanyl | A | Na |
| 5-indanyl | A | Na |
| 5-methyl-4-indanyl | A | Na |
| 1-methyl-4-indanyl | A | Na |
| 6-methyl-4-indanyl | A | Na |
| 7-methyl-4-indanyl | A | Na |
| 3-methyl-4-indanyl | A | Na |
| 1-methyl-5-indanyl | A | Na |
| 2-methyl-5-indanyl | A | Na |
| 7-methyl-5-indanyl | A | Na |
| 6-t-butyl-5-indanyl | A | Na |
| 4,6-dimethyl-5-indanyl | C | Na |
| 1,1-dimethyl-4-indanyl | C | Na |
| 1,1,2-trimethyl-4-indanyl | C | Na |
| 1,1,2-triethyl-4-indanyl | B | K |
| 1,1,2,3-tetramethyl-4-indanyl | B | K |
| 1,1,5,6-tetramethyl-4-indanyl | B | K |
| 5,7-dimethyl-4-indanyl | B | K |
| 5-chloro-4-indanyl | A | Na |
| 7-chloro-4-indanyl | A | Na |
| 7-bromo-4-indanyl | A | Na |
| 6-chloro-5-indanyl | A | Na |
| 1,7-dimethyl-4-indanyl | B | K |
| 1,1,7-trimethyl-4-indanyl | B | K |
| 4-(indanyl)phenyl | B | K |
| 2,4-(dicyclopent-2-enyl)phenyl | B | K |
| 4-(α,α-dimethylbenzyl)phenyl | B | K |
| 1-naphthyl | B | Na |
| 2-naphthyl | B | Na |
| 1-(5,6,7,8-tetrahydronaphthyl) | B | Na |
| 2-(5,6,7,8-tetrahydronaphthyl) | B | Na |
| 3-(2-methyl-4-pyronyl) | B | Na |
| 3-quinolyl | F-1 | K |
| 4-quinolyl | F-1 | K |
| 5-quinolyl | F-1 | K |
| 6-quinolyl | F-1 | K |
| 7-quinolyl | F-1 | K |
| 8-quinolyl | F-1 | K |
| 5-(1,4-naphthoquinonyl) | B | Na |
| 6-(1,4-naphthoquinonyl) | B | Na |
| 4-(coumarinyl) | C | K |
| 5-(coumarinyl) | C | K |
| 6-(coumarinyl) | C | K |
| 3-thianaphthenyl | B | Na |
| 4-thianaphthenyl | B | Na |
| 1-phenazinyl | F-1 | K |
| 2-phenazinyl | F-1 | K |
| 2-(anthraquinonyl) | B | Na |
| 4-(6-methylquinolyl) | F-1 | K |
| 2-(4-methylquinolyl) | F-1 | K |
| 1-fluorenyl | A | Na |
| 2-fluorenyl | A | Na |
| 6-(1,2-naphthoquinonly) | B | Na |
| 7-(1,2-naphthoquinonyl) | B | Na |
| 1-anthraquinonyl | B | Na |
| 7-isoquinolyl | F-1 | K |
| 8-isoquinolyl | F-1 | K |
| 4-(1,3-benzodioxolyl) | B | K |
| 5-(1,3-benzodioxolyl) | B | K |
| 3-(4-pyronyl) | B | K |
| 1-(3-methyl-5,6,7,8-tetrahydronaphthyl) | C | Na |
| 1-(4-methyl-5,6,7,8-tetrahydronaphthyl) | C | Na |
| 2-(1-methyl-5,6,7,8-tetrahydronaphthyl) | C | Na |
| 2-(3-methyl-5,6,7,8-tetrahydronaphthyl) | C | Na |
| 2-(4-methyl-5,6,7,8-tetrahydronaphthyl) | C | Na |
| 2-(5-methyl-5,6,7,8-tetrahydronaphthyl) | C | Na |
| 1-(4,4-dimethyl-5,6,7,8-tetrahydronaphthyl) | E | K |
| 1-(4,8-dimethyl-5,6,7,8-tetrahydronaphthyl) | E | K |
| 2-(1,6-dimethyl-5,6,7,8-tetrahydronaphthyl) | E | K |
| 1-(2,4,6-trimethyl-5,6,7,8-tetrahydronaphthyl) | E | K |
| 1-(2,4,7-trimethyl-5,6,7,8-tetrahydronaphthyl) | E | K |
| 1-(3,4,6-trimethyl-5,6,7,8-tetrahydronaphthyl) | E | K |
| 2-(1,5,6-trimethyl-5,6,7,8-tetrahydronaphthyl) | E | K |
| 2-(3,4,6-trimethyl-5,6,7,8-tetrahydronaphthyl) | E | K |
| 2-(3,4,7-trimethyl-5,6,7,8-tetrahydronaphthyl) | E | K |
| 2-(1,4,7-trimethyl-5,6,7,8-tetrahydronaphthyl) | E | K |
| 1-(1,2,4-triethyl-5,6,7,8-tetrahydronaphthyl) | E | K |
| 2-(5,5,8,8-tetramethyl-5,6,7,8-tetrahydronapthhyl) | E | K |
| 3-bromo-2-propionylphenyl | E | K |
| 4-bromo-2-butyryl-3,5-dimethylphenyl | B | Na |
| 2-isopropyl-4-isobutyryl-5-methylphenyl | B | Na |
| 2-chloro-6-isopropyl-3-methyl-4-nitrophenyl | B | Na |
| 2-acetyl-5-dimethylaminophenyl | F-1 | Na |
| 2-carbomethoxy-5-methoxy-4-nitrophenyl | B | K |
| 2-furyl | E | Na |
| 3-furyl | E | K |
| 3-carbomethoxy-2,4,6-trinitrophenyl | B | K |
| 2-(1,4-naphthoquinonyl) | B | K |
| 2-dimethylaminoethyl | F-1 | K |
| 2-dibutylaminoethyl | F-1 | K |
| 2-diisopropylaminoethyl | F-1 | K |
| 2-di(n-propyl)aminoethyl | F-1 | K |
| 2-diethylaminoethyl | F-1 | K |
| 3-diethylaminopropyl | F-1 | K |
| 3-diisopropylaminopropyl | F-1 | K |
| 3-dibutylaminopropyl | F-1 | K |
| 2-(2-imidazolino)ethyl | F-1 | K |
| 3-(2-imidazolino)propyl | F-1 | K |
| 2-piperidinoethyl | F | H |
| 3-piperidinopropyl | F | H |
| 2-pyrrolidinoethyl | F | H |
| 3-morpholinopropyl | F | H |
| 3-thiomorpholinopropyl | F | H |
| 2-(1,4,5,6-tetrahydropyrimidino)ethyl | F | Na |
| 2-(N-methyl)piperazinoethyl | F | H |
| 3-N-butylpiperazinopropyl | F-1 | K |
| 2-(2,5-dimethylpyrrolidino)ethyl | F-1 | K |
| 2-aziridinoethyl | F-1 | K |
| 2-diisobutylaminoethyl | B | Na |
| 3-dimethylaminopropyl | B | Na |
| 3-di-(n-propyl)aminopropyl | A | K |
| 2-thiomorpholinoethyl | C | Na |
| 2-(4-methylpiperidino)ethyl | C | Na |
| Pyrrolidinomethyl | F-1 | K |
| Aziridinomethyl | F-1 | K |
| (2-imidazolino)methyl | F-1 | K |
| (1,4,5,6-tetrahydropyrimidino)methyl | F-1 | K |
| Pyrrolidonomethyl | F-1 | K |
| Piperidinomethyl | F-1 | K |
| Morpholinomethyl | F | H |
| Thiomorpholinomethyl | F | H |
| 3-aziridinopropyl | C | K |
| 3-di-(n-propyl)amino-2-propyl | F-1 | K |
| 2-diethylamino-1-propyl | F-1 | K |
| 3-pyrrolidino-2-propyl | F-1 | K |
| 3-piperidino-2-propyl | F-1 | K |
| 3-diethylamino-2-propyl | F-1 | K |
| 3-morpholino-2-propyl | F-1 | K |
| 3-di-(n-butyl)amino-2-propyl | F-1 | K |
| 3-dimethylamino-2-propyl | F-1 | K |
| 2-pyrrolidino-1-propyl | F-1 | K |
| 2-di(n-butyl)amino-1-propyl | F-1 | K |
| 2-thiomorpholino-1-propyl | F-1 | K |
| 2-(2-imidazolino)-1-propyl | F-1 | K |
| 3-(1,4,5,6-tetrahydropyrimidino)-2-propyl | F-1 | K |
| 2-acetamidoethyl | B | K |
| 2-butyramidoethyl | B | K |
| 3-propionamidopropyl | B | K |
| 2-acetamido-2-propyl | B | K |
| 2-(methylethylamino)ethyl | B | K |
| 2-(methylbutylamino)ethyl | B | K |
| 2-(ethylisopropylamino)ethyl | B | K |
| 2-(ethylbutylamino)ethyl | B | K |
| 3-(methylpropylamino)propyl | B | K |
| 3-(ethylisopropylamino)propyl | B | K |
| 3-(methylethylamino)-2-propyl | B | K |
| 3-(ethylbutylamino)-2-propyl | B | K |
| 2-(methylethylamino)-1-propyl | B | K |
| 2-(methylbutylamino)-1-propyl | B | K |
| 3-imidazolo-2-propyl | B | K |
| 3-aziridino-2-propyl | F-1 | K |
| 3-pyrrolo-2-propyl | F-1 | K |
| 3-thiomorpholino-2-propyl | F-1 | K |
| 3-(N-methyl)piperazino-2-propyl | F-1 | K |
| 2-piperidino-1-propyl | F-1 | K |
| 2-morpholino-1-propyl | F-1 | K |
| 2-(N-ethyl)piperazino-1-propyl | F-1 | K |
| 3-(2-imidazolino)-2-propyl | F-1 | K |
| 2-(2,6-dimethylpiperidino)ethyl | B | K |
| 2-di-(n-propyl)amino-1-propyl | F-1 | K |
| 2-(N-methylanilino)ethyl | C | Na |
| 2-(N-ethylanilino)ethyl | B | K |
| 2-(N-isopropylanilino)ethyl | B | K |
| 2-(N-n-propylanilino)ethyl | C | K |
| 2-(N-n-butylanilino)ethyl | C | K |
| 3-(N-methylanilino)propyl | C | K |
| 3-(N-isopropylanilino)propyl | C | K |
| 2-(N-methylanilino)-2-propyl | C | K |
| 3-(N-ethylanilino)-2-propyl | F-1 | K |
| 3-(N-n-butylanilino)-2-propyl | F-1 | K |
| 2-(N-methylanilino)-1-propyl | F-1 | K |
| 2-(N-n-propylanilino)-1-propyl | F-1 | K |
| 3-(N-ethylanilino)propyl | F-1 | K |
| 3-pyrrolidinopropyl | F-1 | Na |
| 2-pyrroloethyl | F-1 | Na |
| 3-pyrrolopropyl | F-1 | Na |
| 2-imidazoloethyl | F-1 | Na |

TABLE—Continued

| R₂ | Method | M |
|---|---|---|
| 2-morpholinoethyl | F-1 | Na |
| 2-azetidinoethyl | F-1 | K |
| Azetidinomethyl | F-1 | K |
| 2-pyridylmethyl | B | Na |
| 4-pyridylmethyl | B | Na |
| 4-imidazolylmethyl | B | Na |
| 2-(N-phenylimidazolyl)methyl | B | Na |
| Phthalimidomethyl | B | Na |
| 3-(N-methyl)pyridyl | F-1 | K |
| 4-(N-methyl)pyridyl | F-1 | K |
| Allyl | A | Na |
| Crotyl | A | Na |
| 3-buten-1-yl | A | Na |
| 3-penten-1-yl | A | Na |
| 4-penten-1-yl | A | Na |
| 3-penten-2-yl | B | K |
| 1-penten-5-yl | B | K |
| 2-methyl-3-buten-1-yl | B | K |
| 3-methyl-1-buten-3-yl | B | K |
| 5-hexen-2-yl | B | K |
| 1-hexen-3-yl | B | K |
| 4-hexen-1-yl | B | K |
| 1-hexen-4-yl | B | K |
| 2-hexen-1-yl | B | K |
| 3-hexen-2-yl | C | Na |
| 3-hexen-1-yl | C | Na |
| 2-methyl-3-penten-2-yl | C | Na |
| 4-methyl-3-penten-2-yl | C | Na |
| 2-methyl-4-penten-2-yl | D | K |
| 4-methyl-4-penten-2-yl | D | K |
| 2,2-dimethyl-3-buten-1-yl | D | K |
| 2-hepten-1-yl | D | K |
| 4-hepten-1-yl | B | Na |
| 6-hepten-1-yl | B | Na |
| 1-hepten-4-yl | B | Na |
| 2-hepten-4-yl | B | Na |
| 2-methyl-3-hexen-2-yl | B | Na |
| 2-methyl-4-hexen-3-yl | B | Na |
| 2-methyl-4-hexen-6-yl | B | Na |
| 2-methyl-5-hexen-2-yl | E | K |
| 2-methyl-5-hexen-3-yl | F | Na |
| 2-methyl-5-hexen-4-yl | F | Na |
| 3-methyl-2-hexen-4-yl | F | Na |
| 3-methyl-3-hexen-2-yl | F | Na |
| 3-methyl-4-hexen-3-yl | F | Na |
| 3-methyl-5-hexen-3-yl | F-1 | Na |
| 2,2-dimethyl-3-penten-1-yl | F-1 | Na |
| 2,3-dimethyl-2-penten-4-yl | F-1 | Na |
| 2,4-dimethyl-1-penten-3-yl | F-1 | Na |
| 2,4-dimethyl-1-penten-4-yl | F-1 | Na |
| 2,4-dimethyl-2-penten-4-yl | B | Na |
| 2,2,3-trimethyl-3-buten-1-yl | B | Na |
| 2-octen-1-yl | B | Na |
| 4-octen-1-yl | B | Na |
| 1-octen-3-yl | B | Na |
| Propargyl | A | Na |
| 1-butyn-3-yl | A | Na |
| 1-butyn-4-yl | A | Na |
| 2-butyn-1-yl | A | Na |
| 1-pentyn-3-yl | A | Na |
| 2-methyl-3-butyn-1-yl | A | Na |
| 3-methyl-1-pentyn-3-yl | B | Na |
| 2-hexyn-1-yl | B | Na |
| 1-hexyn-3-yl | B | Na |
| 2,3-dimethyl-4-pentyn-3-yl | B | Na |
| 5-methyl-3-hexyn-2-yl | B | Na |
| 3-methyl-3-hexyn-3-yl | B | Na |
| 3-ethyl-1-pentyn-3-yl | B | Na |
| 2-methyl-3-hexyn-2-yl | C | Na |
| 3-methyl-1-heptyn-3-yl | C | Na |
| 2,4-dimethyl-5-hexyn-3-yl | C | Na |
| 2,2,3-trimethyl-4-pentyn-3-yl | C | Na |
| 3-octyn-1-yl | C | Na |
| 2-octyn-1-yl | C | Na |
| 3-octyn-2-yl | C | Na |
| Benzyl | A | Na |
| o-Chlorobenzyl | A | Na |
| m-Chlorobenzyl | A | Na |
| p-Bromobenzyl | A | Na |
| m-Methylbenzyl | B | Na |
| p-Ethylbenzyl | B | Na |
| o-Nitrobenzyl | C | K |
| m-Nitrobenzyl | C | K |
| o-Methoxybenzyl | C | K |
| p-Ethoxybenzyl | C | K |
| m-Acetylbenzyl | B | K |
| p-Butyrylbenzyl | B | K |
| o-Carbomethoxybenzyl | B | Na |
| p-(Carbo-t-butoxy)benzyl | B | Na |
| o-Fluorobenzyl | A | Na |
| o-Dimethylaminobenzyl | F-1 | Na |
| p-Dimethylaminobenzyl | F-1 | Na |
| Benzohydryl | B | Na |
| Trityl | B | Na |
| Cholesteryl | B | Na |
| 2-furylmethyl | D | Na |
| 2-pyridylmethyl | F | H |
| [2,2-dimethyl-1,3-dioxolon-4-yl]-methyl | B | Na |
| (2-pyrrolidono)methyl | B | Na |
| Imidozolylmethyl | F-1 | K |
| 1-indanylmethyl | B | Na |
| 2-indanylmethyl | B | Na |
| Phthalimidomethyl | F-1 | K |
| 4-pyridylmethyl | F-1 | K |

By means of these procedures but substituting R₇SH for R₂OH, the following compounds are prepared.

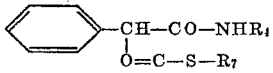

| R₇ | Method | M |
|---|---|---|
| Phenyl | A | Na |
| o-Tolyl | A | Na |
| m-Tolyl | A | Na |
| p-Tolyl | A | Na |
| o-Ethylphenyl | B | K |
| m-Ethylphenyl | B | K |
| p-Ethylphenyl | B | K |
| o-N-propylphenyl | B | K |
| o-Isopropylphenyl | B | K |
| p-Isopropylphenyl | B | K |
| p-Butylphenyl | B | K |
| p-t-Butylphenyl | B | K |
| p-Sec-butylphenyl | B | K |
| 2,5-dimethylphenyl | B | K |
| 3,5-dimethylphenyl | B | K |
| 2,5-diethylphenyl | B | K |
| 3-methyl-5-ethylphenyl | B | K |
| 2-methyl-5-isopropylphenyl | B | K |
| 4-t-butyl-2-isopropylphenyl | B | K |
| o-Chlorophenyl | B | Na |
| m-Chlorophenyl | B | Na |
| p-Chlorophenyl | B | Na |
| o-Bromophenyl | B | Na |
| m-Bromophenyl | B | Na |
| p-Bromophenyl | B | Na |
| m-Fluorophenyl | B | Na |
| p-Fluorophenyl | B | Na |
| 2,4-dichlorophenyl | A | Na |
| 2,5-dichlorophenyl | A | Na |
| 3,4-dichlorophenyl | A | Na |
| 4-bromo-3-chlorophenyl | A | Na |
| 2,3,5-trichlorophenyl | A | Na |
| 2,4,5-trichlorophenyl | A | Na |
| 2,4-dibromophenyl | A | Na |
| 2,5-dibromophenyl | A | Na |
| 2,4,5-tribromophenyl | A | Na |
| 4-chloro-2-methylphenyl | B | Na |
| 5-chloro-2-methylphenyl | B | Na |
| 6-chloro-2-methylphenyl | B | Na |
| 4-chloro-3-methylphenyl | B | Na |
| 3-chloro-4-methylphenyl | B | Na |
| 6-chloro-3-isopropylphenyl | B | Na |
| 4-bromo-3-methylphenyl | B | Na |
| 2-bromo-4-methylphenyl | B | Na |
| 5-bromo-2-methylphenyl | B | Na |
| 4-chloro-3,5-dimethylphenyl | B | K |
| 4-chloro-2,5-dimethylphenyl | B | K |
| 5-chloro-2,4-dimethylphenyl | B | K |
| 4,6-dichloro-3-dimethylphenyl | A | Na |
| 2,4-dichloro-3-dimethylphenyl | A | Na |
| 2,4-difluorophenyl | A | Na |
| o-Trifluoromethylphenyl | A | Na |
| m-Trifluoromethylphenyl | A | Na |
| p-Trifluoromethylphenyl | A | Na |
| m-Methoxyphenyl | C | Na |
| p-Methoxyphenyl | C | Na |
| o-Ethoxyphenyl | C | Na |
| m-Ethoxyphenyl | C | Na |
| p-Ethoxyphenyl | C | Na |
| p-Propoxyphenyl | C | Na |
| p-Butoxyphenyl | C | Na |
| p-Isobutoxyphenyl | C | Na |
| 2-methoxy-4-methylphenyl | C | Na |
| 2-methoxy-3-methylphenyl | C | Na |
| 3-methoxy-2-methylphenyl | C | Na |
| 3-methoxy-4-methylphenyl | C | Na |
| 4-methoxy-2-methylphenyl | C | Na |
| 4-methoxy-3-methylphenyl | C | Na |
| 5-methoxy-2-methylphenyl | C | Na |
| 5-methoxy-3-methylphenyl | C | Na |
| 6-methoxy-3-methylphenyl | C | Na |
| 3-t-butyl-4-methoxyphenyl | B | K |
| 5-ethyl-2-methoxyphenyl | B | K |
| 4-methoxy-3,5-dimethylphenyl | B | K |
| 2,5-dimethoxyphenyl | F | H |
| 3,4-dimethoxyphenyl | F | H |
| 3,4-di-isopropoxyphenyl | F | H |
| 4-methoxy-2,5-dipropylphenyl | F-1 | K |
| 4-methoxy-3,5-dipropylphenyl | F-1 | K |
| 4-methoxy-3,5-di-isopropoxyphenyl | F-1 | K |
| 2-chloro-4-methoxyphenyl | A | Na |
| 4-chloro-3-methoxyphenyl | A | Na |
| 2-bromo-5-methoxyphenyl | A | Na |
| 3-bromo-4-methoxyphenyl | A | Na |
| 4-bromo-3-methoxyphenyl | A | Na |
| 5-bromo-2-methoxyphenyl | A | Na |
| 4-butoxy-2-chlorophenyl | E | Na |
| 2,5-dichloro-4-ethoxyphenyl | B | K |
| 3-ethyl-4-methoxyphenyl | B | K |

NOTE.—R₄ = penicillanic acid residue.

EXAMPLE XII

The following penicillins are prepared by the procedures of Example XI from the appropriate aryl halo carbonyl ketenes of Examples II and III.

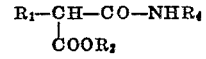

For each of the $R_2$ values listed, $R_1$=2-thienyl, 3-thienyl, 2-pyridyl, 2-furyl and σ-tolyl, and $R_4$=penicillanic acid residue.

| $R_2$ | Method | M |
|---|---|---|
| Methyl | A | Na |
| Ethyl | A | Na |
| n-Butyl | A | Na |
| t-Butyl | A | Na |
| Hexyl | B | Na |
| Decyl | D | K |
| Tetradecyl | B | Na |
| Octadecyl | D | K |
| 2-chloroethyl | A | Na |
| 3-chloropropyl | A | Na |
| 1-methyl-2-chloroethyl | A | Na |
| 2-chloro-1-butyl | A | Na |
| 4-chloro-1-butyl | A | Na |
| 1-ethyl-2-chloroethyl | A | Na |
| 1-methyl-3-chloropropyl | A | Na |
| 1,1-dimethyl-2-chloroethyl | A | Na |
| 2-bromoethyl | B | K |
| 3-bromopropyl | B | K |
| 1-methyl-2-bromoethyl | B | K |
| 1-ethyl-2-bromoethyl | B | K |
| 1,3-dichloropropyl | A | Na |
| 1,1-dichloromethylethyl | A | Na |
| 2-bromo-3-chloropropyl | A | Na |
| 1,4-dibromo-2-butyl | A | Na |
| 3,4-dichloro-2-butyl | A | Na |
| 1-bromomethyl-2-chloroethyl | A | Na |
| 1,1-dimethyl-2,2-dichloroethyl | A | Na |
| 2,2,3-tribromopropyl | A | Na |
| 2,2,3-trichlorobutyl | A | Na |
| 2,2,3,3-tetrabromopropyl | A | Na |
| 2,2,2-trichloroethyl | A | Na |
| 2,2,2-trifluoroethyl | A | Na |
| 3,3,3-trifluoropropyl | A | Na |
| 2-nitroethyl | B | K |
| 3-nitropropyl | B | K |
| 2-nitrobutyl | B | K |
| 4-nitrobutyl | B | K |
| 2,2-dinitroethyl | C | Na |
| 1-ethyl-2,2-dinitroethyl | C | Na |
| 2-chloro-2-nitropropyl | B | Na |
| 3-methyl-3-nitropropyl | B | Na |
| 2-chloro-2-nitrobutyl | B | Na |
| 1-trichloromethyl-2-nitroethyl | B | Na |
| 1-trifluoromethylethyl | A | Na |
| 1,1-dimethyl-2,2,2-trifluoroethyl | A | Na |
| 1,1-dimethyl-2,2,2-trichloroethyl | A | Na |
| 2-methoxyethyl | F-1 | K |
| 2-n-butoxyethyl | F-1 | K |
| 3-methoxypropyl | F-1 | K |
| 3-sec-butoxypropyl | F-1 | K |
| 4-methoxy-n-butyl | F-1 | K |
| 1,1-dimethyl-2-methoxyethyl | F-1 | K |
| 2-cyanoethyl | E | K |
| 4-cyanobutyl | E | K |
| 1-cyano-2-chloropropyl | B | K |
| 1-cyano-2,2-dichloroethyl | B | K |
| 1-cyano-2,2,2-trichloroethyl | B | K |
| 1-methyl-1-(1'-cyano-1'-methylethoxy)ethyl | B | K |
| 2-acetoxyethyl | B | Na |
| 2-butyryloxyethyl | B | Na |
| 3-acetoxypropyl | B | Na |
| 2-acetoxy-n-butyl | B | Na |
| 1-methyl-2-acetoxyethyl | B | Na |
| Carbomethoxymethyl | B | Na |
| Carbobutoxymethyl | B | Na |
| 3-carbobutoxypropyl | B | Na |
| 4-carbethoxybutyl | C | Na |
| 2-carbethoxypropyl | C | Na |
| 1-carbethoxypropyl | C | Na |
| 1-trichloromethyl-2-carbomethoxyethyl | B | K |
| 1-carbethoxy-2-chloropropyl | B | K |
| 1-carbethoxy-2,2-dichloropropyl | B | K |
| 1-carbomethoxy-2,2,2-trichloroethyl | B | K |
| 1-carbomethoxy-2-chloroethyl | B | K |
| 1-carbomethoxymethyl-2,2,2-trichloroethyl | B | K |
| Acetonyl | E | Na |
| 1-methyl-3-oxobutyl | E | Na |
| 4-oxopentyl | E | Na |
| 1,1-dimethylacetonyl | E | Na |
| 1-ethyl-2-oxobutyl | E | Na |
| 1-acetyl-1-methylpropyl | B | Na |
| 1,2-dimethyl-3-oxobutyl | B | Na |
| 2-methyl-3-oxopentyl | B | Na |
| 1-acetonylbutyl | B | Na |
| 1-methyl-3-oxohexyl | B | Na |
| 2-acetylpropyl | B | Na |
| 3-oxopentyl | B | Na |
| 4-oxohexyl | B | Na |
| 5-oxohexyl | B | Na |
| 1-methoxy-2,2,2-trichloroethyl | A | Na |
| 1-ethoxy-2,2,2-trichloroethyl | A | Na |
| 1-butoxy-2,2,2-trichloroethyl | A | Na |
| 1-methoxy-2,2,2-trifluoroethyl | A | Na |
| 1-ethoxy-2,2,2-trifluoroethyl | A | Na |
| 2,3-diacetoxypropyl | B | K |
| 2,3-dicaproyloxypropyl | B | K |
| 2,3-distearoyloxypropyl | B | K |
| (1,2,3-tricarbomethoxy)-2-propyl | B | K |
| (1,2,3-tricarbobutoxy)-2-propyl | B | K |
| 2-chloro-3,3-dimethoxypropyl | B | K |
| 3,3-diethoxypropyl | B | K |
| 2-oxo-3-chloropropyl | B | Na |
| 1-trichloromethyl-3-oxobutyl | B | K |
| 2-fluoroethyl | A | Na |
| 3-fluoropropyl | A | Na |
| 1-trichloromethyl-2,3,3,3-tetrachloropropyl | A | Na |
| 4,4,4-trifluorobutyl | A | Na |
| 1-methoxy-2-chloro-2,2-difluoroethyl | A | Na |
| Phenyl | B | Na |
| σ-Tolyl | B | Na |
| m-Tolyl | B | Na |
| p-Tolyl | B | Na |
| σ-Ethylphenyl | B | Na |
| p-N-propylphenyl | B | Na |
| σ-Isopropylphenyl | B | Na |
| p-t-Butylphenyl | B | Na |
| σ-Methoxyphenyl | B | Na |
| p-Methoxyphenyl | B | Na |
| m-Ethoxyphenyl | B | Na |
| p-N-butoxyphenyl | B | Na |
| σ-Chlorophenyl | A | Na |
| m-Chlorophenyl | A | Na |
| p-Chlorophenyl | A | Na |
| m-Bromophenyl | A | Na |
| m-Fluorophenyl | A | Na |
| p-Fluorophenyl | A | Na |
| σ-Formylphenyl | A | Na |
| m-Formylphenyl | A | Na |
| p-Acetylphenyl | A | Na |
| p-Butyrylphenyl | A | Na |
| σ-Nitrophenyl | C | K |
| m-Nitrophenyl | C | K |
| m-Carbomethoxyphenyl | C | Na |
| p-Carbomethoxyphenyl | C | Na |
| σ-Carbethoxyphenyl | C | Na |
| p-Carbo-n-propoxyphenyl | C | Na |
| σ-Dimethylaminophenyl | F-1 | K |
| σ-Di-n-butylaminophenyl | F-1 | K |
| m-Di-n-propylaminophenyl | F-1 | K |
| p-Methylethylaminophenyl | F-1 | K |
| p-Methylisopropylaminophenyl | F-1 | K |
| 2,3-dimethylphenyl | D | K |
| 2,6-dimethylphenyl | D | K |
| 2,5-diethylphenyl | D | K |
| 2,4-di-n-propylphenyl | D | K |
| 5-ethyl-3-methylphenyl | D | K |
| 4-isopropyl-3-methylphenyl | D | K |
| 3-methyl-4-t-butylphenyl | B | Na |
| 2,4,6-trimethylphenyl | B | Na |
| 4,5-dimethyl-2-isopropylphenyl | B | Na |
| 2,4-dimethyl-3-ethylphenyl | B | Na |
| 2,3,4,6-tetramethylphenyl | B | Na |
| 4-butyl-5-isopropyl-2-methylphenyl | B | Na |
| Pentamethylphenyl | B | Na |
| 2,6-dichlorophenyl | A | Na |
| 2,4-dibromophenyl | A | Na |
| 2,3,4-trichlorophenyl | A | Na |
| 2,4,6-tribromophenyl | A | Na |
| 2,3,5,6-tetrachlorophenyl | A | Na |
| Pentachlorophenyl | A | Na |
| Pentabromophenyl | A | Na |
| 3,5-dinitrophenyl | C | Na |
| 2,3,6-trinitrophenyl | C | Na |
| 2,3,4,6-tetranitrophenyl | C | Na |
| Pentanitrophenyl | C | Na |
| 2,3,5-trifluorophenyl | A | Na |
| 2,3,5,6-tetrafluorophenyl | A | Na |
| Pentafluoro | A | Na |
| 2-chloro-5-fluorophenyl | A | Na |
| 2-bromo-3-fluorophenyl | A | Na |
| 2,4-dichloro-3-fluorophenyl | A | Na |
| 4-bromo-3,5-difluorophenyl | A | Na |
| 2-bromo-3,5-dichloro-4-fluorophenyl | A | Na |
| 3-fluoro-2,4,6-trichlorophenyl | A | Na |
| 2-methoxy-4-methylphenyl | A | Na |
| 5-bromo-2-methoxyphenyl | A | Na |
| 2-chloro-6-methoxyphenyl | A | Na |
| 2-ethoxy-3-methylphenyl | B | K |
| 2-methoxy-6-propylphenyl | B | K |
| 2-carbomethoxy-5-fluorophenyl | B | K |
| 5-fluoro-2-methoxyphenyl | B | K |
| 2-acetyl-4-fluorophenyl | B | K |
| 6-chloro-2-methylphenyl | B | Na |
| 2-chloro-5-methylphenyl | B | Na |
| 2-fluoro-4-methylphenyl | B | Na |
| 2-bromo-4-t-butylphenyl | B | Na |
| 2-chloro-4-isopropylphenyl | B | Na |
| 2-ethyl-4-fluorophenyl | B | Na |
| 2-isobutyl-4-fluorophenyl | B | Na |
| 5-bromo-2,3-dimethylphenyl | B | K |
| 4-chloro-2,3-dimethylphenyl | B | K |
| 5-chloro-2,4-dimethylphenyl | B | K |
| 4-chloro-6-isopropyl-3-methylphenyl | B | Na |
| 4-bromo-3-isopropyl-6-methylphenyl | B | K |
| 4-chloro-2,3-diethylphenyl | B | K |
| 4,6-dibromo-2-methylphenyl | B | K |
| 2,4-dichloro-3,5-dimethylphenyl | B | K |
| 4-chloro-2,3,5-trimethylphenyl | B | K |
| 4-chloro-2-nitrophenyl | B | K |
| 4-chloro-2,6-dinitro-6-methylphenyl | E | K |
| 3-fluoro-4-nitrophenyl | B | K |
| 3-chloro-4-fluoro-6-nitrophenyl | B | K |
| 6-bromo-4-fluoro-2-nitrophenyl | E | K |
| 2,6-dibromo-3-fluoro-6-nitrophenyl | E | K |
| 4-chloro-5-fluoro-2-nitrophenyl | E | K |
| 4-acetyl-2-fluoro-5-nitrophenyl | E | K |
| 2-acetyl-6-bromo-4-fluorophenyl | E | K |
| 2-fluoro-4-butyrylphenyl | E | K |
| 3,4-dicarbomethoxy-2,5,6-tribromophenyl | B | K |
| 2-acetyl-4-chlorophenyl | B | K |
| 4-acetyl-2-bromophenyl | B | K |
| 2-acetyl-3,5-dichlorophenyl | A | Na |
| 2-acetyl-6-chloro-4-methylphenyl | A | Na |
| 4-chloro-2-propionylphenyl | A | Na |

| R₂ | Method | M |
|---|---|---|
| 2-acetyl-6-dimethylaminophenyl | F-1 | K |
| 4-dimethylamino-2-methylphenyl | F-1 | K |
| 4-carbomethoxy-2-dimethylaminophenyl | F-1 | K |
| 2-carbomethoxy-5-dimethylaminophenyl | F-1 | K |
| 4-t-butyl-3-nitrophenyl | B | Na |
| 2-methyl-4-nitro-5-isopropylphenyl | B | Na |
| 6-nitro-1,2,3,4-tetramethylphenyl | B | Na |
| 2-methoxy-5-nitro-4-propylphenyl | B | Na |
| 2,6-dimethoxyphenyl | A | Na |
| 3,4-dimethoxy-4-methylphenyl | A | Na |
| 3,5-diethoxy-2,6-dimethylphenyl | A | Na |
| 3,4,5-trimethoxyphenyl | A | Na |
| m-Acetylphenyl | B | K |
| o-Propionylphenyl | B | K |
| 3-carbomthoxy-5-methoxyphenyl | B | K |
| 2-carbomethoxy-6-methoxyphenyl | B | K |
| 2,5-dicarbomethoxyphenyl | B | K |
| 3,4-dicarbethoxyphenyl | B | K |
| 2,6-dicarbomethoxyphenyl | B | K |
| 2,4-dicarbomethoxy-3,5-dimethylphenyl | B | K |
| 4-carbomethoxy-2,5-dimethyl-4-methoxyphenyl | E | K |
| 2-carbomethoxy-6-methoxy-4-methylphenyl | E | K |
| 4-carbomethoxy-2,6-dichlorophenyl | E | K |
| 2-carbomethoxy-3,5-dimethoxy-4,6-dimethylphenyl | E | K |
| 5-carbomethoxy-2,3-dimethoxyphenyl | E | K |
| 2-bromo-4-carbomethoxy-6-methoxyphenyl | E | K |
| 4-carbomethoxy-2-methoxy-3-nitrophenyl | E | K |
| 3-carbomethoxy-2,4-dinitro-6-methoxyphenyl | E | K |
| 4-indanyl | A | Na |
| 5-indanyl | A | Na |
| 5-methyl-4-indanyl | A | Na |
| 1-methyl-4-indanyl | A | Na |
| 7-methyl-4-indanyl | A | Na |
| 3-methyl-4-indanyl | A | Na |
| 1-methyl-5-indanyl | A | Na |
| 6-methyl-5-indanyl | A | Na |
| 6-t-butyl-5-indanyl | A | Na |
| 4,6-dimethyl-5-indanyl | C | Na |
| 1,1-dimethyl-4-indanyl | C | Na |
| 1,1,2-trimethyl-4-indanyl | C | Na |
| 1,1,2-triethyl-4-indanyl | B | K |
| 1,1,2,3-tetramethyl-4-indanyl | B | K |
| 1,1,5,6-tetramethyl-4-indanyl | B | K |
| 5-chloro-4-indanyl | A | Na |
| 7-bromo-4-indanyl | B | K |
| 6-chloro-5-indanyl | A | Na |
| 1,1,7-trimethyl-4-indanyl | B | K |
| 4-(1-indanyl)phenyl | B | K |
| 1-naphthyl | B | Na |
| 2-naphthyl | B | Na |
| 1-(5,6,7,8-tetrahydronaphthyl) | B | Na |
| 2-(5,6,7,8-tetrahydronapththyl) | B | Na |
| 3-(2-methyl-4-pyronyl) | B | Na |
| 4-quinolyl | F-1 | K |
| 6-quinolyl | F-1 | K |
| 8-quinolyl | F-1 | K |
| 5-(1,4-naphthoquinonyl) | B | Na |
| 6-(1,4-naphthoquinonyl) | B | Na |
| 4-(coumarinyl) | C | K |
| 6-(coumarinyl) | C | K |
| 3-thianaphthenyl | B | Na |
| 1-phenazinyl | F-1 | K |
| 2-phenazinyl | F-1 | K |
| 2-(anthraquinonyl) | B | Na |
| 4-(6-methylquinolyl) | F-1 | K |
| 1-fluorenyl | A | Na |
| 2-fluorenyl | A | Na |
| 6-(1,2-naphthoquinonyl) | B | Na |
| 1-anthraquinonyl | B | Na |
| 7-isoquinolyl | F-1 | K |
| 8-isoquinolyl | F-1 | K |
| 5-(1,3-benzodioxolyl) | B | K |
| 3-(4-pyronyl) | B | K |
| 1-(3-methyl-5,6,7,8-tetrahydronaphthyl) | C | Na |
| 2-(1-methyl-5,6,7,8-tetrahydronaphthyl) | C | Na |
| 2-(4-methyl-5,6,7,8-tetrahydronaphthyl) | C | Na |
| 1-(4,8-dimethyl-5,6,7,8-tetrahydronaphthyl) | E | K |
| 2-(1,6-dimethyl-5,6,7,8-tetrahydronaphthyl) | E | K |
| 1-(2,4,6-trimethyl-5,6,7,8-tetrahydronaphthyl) | E | K |
| 1-(3,4,6-trimethyl-5,6,7,8-tetrahydronaphthyl) | E | K |
| 2-(1,5,6-trimethyl-5,6,7,8-tetrahydronaphthyl) | E | K |
| 2-(3,4,7-trimethyl-5,6,7,8-tetrahydronaphthyl) | E | K |
| 1-(1,2,4-triethyl-5,6,7,8-tetrahydronaphthyl) | E | K |
| 2-(5,5,8,8-tetramethyl-5,6,7,8-tetrahydronaphthyl) | E | K |
| 4-bromo-2-carbomethoxy-5-methylphenyl | C | Na |
| 2-chloro-4,5-dimethyl-6-nitrophenyl | B | Na |
| 2-isobutyryl-4,6-dimethylphenyl | C | Na |
| 2-acetyl-5-dimethylaminophenyl | F-1 | Na |
| 2-furyl | E | Na |
| 3-furyl | E | Na |
| 2-(1,4-naphthoquinonyl) | B | K |
| Cyclopropyl | A | Na |
| Cyclobutyl | A | Na |
| Cyclopentyl | A | Na |
| Cyclohexyl | A | Na |
| Cycloheptyl | A | Na |
| 1-methyl-1-cyclopentyl | A | Na |
| 2-methyl-1-cyclopentyl | A | Na |
| 3-methyl-1-cyclopentyl | A | Na |
| 2,2-dimethyl-1-cyclopentyl | B | K |
| 1,3-dimethyl-1-cyclopentyl | B | K |
| 2,4-dimethyl-1-cyclopentyl | B | K |
| 1,2,2-trimethyl-1-cyclopentyl | B | K |
| 1,2,5-trimethyl-1-cyclopentyl | B | K |
| 1,2,4-trimethyl-1-cyclopentyl | N | K |
| 1-isopropyl-1-cyclopentyl | B | K |
| 3-isopropyl-1-cyclopentyl | B | K |
| 1-methyl-1-cyclohexyl | B | K |
| 2-methyl-1-cyclohexyl | B | K |
| 4-methyl-1-cyclohexyl | B | K |
| 1-ethyl-1-cyclohexyl | B | K |
| 1-isopropyl-1-cyclohexyl | B | K |
| 3-isopropyl-1-cyclohexyl | B | K |
| 4-t-butyl-1-cyclohexyl | B | K |
| 2,2-dimethyl-1-cyclohexyl | B | K |
| 1,2-dimethyl-1-cyclohexyl | B | K |
| 1,3-dimethyl-1-cyclohexyl | C | Na |
| 2,6-dimethyl-1-cyclohexyl | C | Na |
| 3,5-dimethyl-1-cyclohexyl | C | Na |
| 1,2,2-trimethyl-1-cyclohexyl | D | Na |
| 2,2,6-trimethyl-1-cyclohexyl | D | Na |
| 1,3,3-trimethyl-1-cyclohexyl | D | Na |
| 2,2,5-trimethyl-1-cyclohexyl | E | Na |
| 1,2,6-trimethyl-1-cyclohexyl | E | Na |
| 1,3,5-trimethyl-1-cyclohexyl | E | Na |
| 2-methyl-6-propyl-1-cyclohexyl | E | Na |
| 1-propyl-3-methyl-1-cyclohexyl | E | Na |
| 1,4-dimethyl-1-cyclohexyl | F | K |
| 1-ethyl-2-methyl-1-cyclohexyl | F | K |
| 2,2,6,6-tetramethyl-1-cyclohexyl | F-1 | K |
| 1,2,4,5-tetramethyl-1-cyclohexyl | F-1 | K |
| 1-methyl-1-cycloheptyl | F-1 | K |
| 1-(1,2,3,4-tetrahydronaphthyl) | F-1 | K |
| 3-methyl-1-indanyl | B | K |
| 3-ethyl-1-indanyl | B | K |
| 5-methyl-1-indanyl | B | K |
| 7-methyl-1-indanyl | B | K |
| 2,2-dimethyl-1-indanyl | B | K |
| 2,3-diethyl-1-indanyl | B | K |
| 3,3-dimethyl-1-indanyl | B | K |
| 2-chloro-1-indanyl | A | Na |
| 2-bromo-1-indanyl | A | Na |
| 3-bromo-1-indanyl | A | Na |
| 4-chloro-1-indanyl | A | Na |
| 1-chloro-2-indanyl | A | Na |
| 9-fluorenyl | B | K |
| 2,3,4-trimethyl-1-cyclopentyl | B | K |
| 4,4-dimethyl-1-cyclohexyl | B | K |
| 1,4,5-trimethyl-1-cyclohexyl | B | K |
| 2-propyl-4-methyl-1-cyclohexyl | B | K |
| 2,6-diethyl-1-cyclohexyl | B | K |
| 2,4-dipropyl-1-cyclopentyl | B | K |
| 3-isobutyl-5-methyl-1-cyclohexyl | B | K |
| 2,2,3,6,6-pentamethyl-1-cyclohexyl | B | K |
| 1,5-dimethyl-2-isopropyl-1-cyclohexyl | B | K |
| 2-methyl-4-sec-butyl-1-cyclohexyl | B | K |
| 1-(2-methyl-1,2,3,4-tetrahydronaphthyl) | B | K |
| 1-(3-methyl-1,2,3,4-tetrahydronaphthyl) | B | K |
| 1-(4-methyl-1,2,3,4-tetrahydronaphthyl) | B | K |
| 1-(7-methyl-1,2,3,4-tetrahydronaphthyl) | B | K |
| 1-(1,3-dimethyl-1,2,3,4-tetrahydronaphthyl) | B | K |
| 1-(2,4-dimethyl-1,2,3,4-tetrahydronaphthyl) | B | K |
| 1-(3,4-dimethyl-1,2,3,4-tetrahydronaphthyl) | B | K |
| 1-(5,8-dimethyl-1,2,3,4-tetrahydronaphthyl) | B | K |
| 1-(1,2,7-trimethyl-1,2,3,4-tetrahydronaphthyl) | B | K |
| 1-(1,4,7-trimethyl-1,2,3,4-tetrahydronaphthyl) | B | K |
| 1-(4,5,7-trimethyl-1,2,3,4-tetrahydronaphthyl) | B | K |
| 1-(1,5,8-trimethyl-1,2,3,4-tetrahydronaphthyl) | B | K |
| 2-(1-methyl-1,2,3,4-tetrahydronaphthyl) | B | K |
| 2-(6-methyl-1,2,3,4-tetrahydronaphthyl) | B | K |
| 2-(2,6-dimethyl-1,2,3,4-tetrahydronaphthyl) | B | K |
| 2-(4,4-dimethyl-1,2,3,4-tetrahydronaphthyl) | B | K |
| 2-(1,1,4,4-tetramethyl-1,2,3,4-tetrahydronaphthyl) | B | K |
| 2-[1,2,3,4-tetrahydronaphthyl] | F-1 | K |
| 1-indanyl | B | K |
| 2-indanyl | B | K |
| 2-methyl-1-indanyl | B | K |
| 1-methyl-1-indanyl | B | K |
| 2-methyl-2-indanyl | B | K |
| 1-ethyl-1-indanyl | B | K |
| 2-bicyclo-[4.4.0]-decyl | A | Na |
| 3-bicyclo-[4.4.0]-decyl | A | Na |
| 7-adamantanyl | A | Na |
| Thujyl | B | K |
| Fenchyl | B | K |
| 1-(1-methyl-1,2,3,4-tetrahydronaphthyl) | B | K |
| 2-pyridylmethyl | B | Na |
| 4-pyridylmethyl | B | Na |
| 4-imidazolylmethyl | B | Na |
| 2-(N-phenylimidazolyl)methyl | B | Na |
| Phthalimidomethyl | B | Na |
| 2-(N-methylanilono)ethyl | B | Na |
| 2-dimethylaminoethyl | F-1 | Na |
| 2-dibutylaminoethyl | F-1 | Na |
| 2-diisopropylaminoethyl | F-1 | K |
| 3-diethylaminopropyl | F-1 | Na |
| 2-(2-imidazolino)ethyl | F | H |
| 2-piperidinoethyl | F | H |
| 3-morpholinopropyl | F | H |
| 3-thiomorpholinopropyl | F-1 | K |
| 2-pyrrolidinoethyl | F-1 | K |
| 2-(2-imidazolino)ethyl | F-1 | K |
| 2-pyrroloethyl | F-1 | K |
| 2-(N-methyl)piperazinoethyl | F | H |
| 3-(N-butyl)piperazinopropyl | F | H |
| 2-(1,4,5,6-tetrahydropyrimidino)ethyl | F-1 | K |
| 3-pyrrolopropyl | F-1 | K |
| 3-imidazolopropyl | F-1 | K |
| 3-di-(n-propylamino)-2-propyl | F-1 | K |
| 3-diethylamino-1-propyl | F-1 | K |
| 3-pyrrolidino-2-propyl | F-1 | K |
| 3-piperidino-2-propyl | F-1 | K |
| 3-diethylamino-2-propyl | F-1 | K |
| 3-morpholino-2-propyl | F-1 | K |
| 3-di-(n-butyl)amino-2-propyl | F-1 | K |
| 3-dimethylamino-2-propyl | F-1 | K |
| 2-acetamidoethyl | B | K |
| 3-butyramidopropyl | B | K |
| 3-acetamido-2-propyl | B | K |

TABLE—Continued

| R₂ | Method | M |
|---|---|---|
| 2-acetamido-1-propyl | B | K |
| 2-diethylaminoethyl | A | K |
| 2-(methylethylamino)ethyl | A | K |
| 2-(ethylbutylamino)ethyl | A | K |
| 2-(methylisopropylamino)ethyl | B | K |
| 3-(methylpropylamino)propyl | B | K |
| 3-(ethylisopropylamino)propyl | B | K |
| 2-aziridinoethyl | B | K |
| 2-thiomorpholinoethyl | B | K |
| 2-(4-methylpiperdino)ethyl | B | K |
| 3-diisopropylaminopropyl | C | Na |
| 3-pipiridinopropyl | C | Na |
| 3-pyrrolidinopropyl | C | Na |
| 3-(1,4,5,6-tetrahydropyrimidino)propyl | C | Na |
| 3-azetidinopropyl | B | K |
| 3-(2,6-dimethylpiperidino)propyl | B | K |
| 2-(N-ethylanilino)ethyl | F-1 | K |
| 3-(N-methylanilino)propyl | F-1 | K |
| 3-(methylethylamino)-2-propyl | C | Na |
| 3-(ethylbutylamino)-2-propyl | C | Na |
| 3-pyrrolo-2-propyl | D | K |
| 3-(2-imidazolino)-2-propyl | D | K |
| 3-imidazolo-2-propyl | D | K |
| 2-dimethylamino-1-propyl | D | K |
| 2-di(n-butyl)amino-1-propyl | E | K |
| 2-N-methylpiperazino-1-propyl | E | K |
| 2-pyrrolo-1-propyl | E | K |
| 2-(2-imidazolino)-1-propyl | E | K |
| 2-(2,5-dimethylpyrrolidino)-1-propyl | E | K |
| Aziridinomethyl | E | K |
| Piperidinomethyl | E | K |
| (2-imidazolino)methyl | E | K |
| N-ethylpiperazinomethyl | E | K |
| (4-methylpiperidino)methyl | E | K |
| Pyrrolomethyl | E | K |
| 3-(N-isopropylanilino)propyl | F-1 | K |
| 3-(N-methylanilino)-2-propyl | F-1 | K |
| 2-(N-methylanilino)-1-propyl | F-1 | K |
| 3-(N-methyl)pyridyl | F-1 | K |
| Allyl | A | Na |
| Crotyl | A | Na |
| 3-buten-1-yl | A | Na |
| 3-penten-1-yl | A | Na |
| 1-penten-5-yl | B | K |
| 2-methyl-3-buten-1-yl | B | K |
| 5-hexen-2-yl | B | K |
| 4-hexen-1-yl | B | K |
| 1-hexen-4-yl | B | K |
| 3-hexen-2-yl | C | Na |
| 2-methyl-3-penten-2-yl | C | Na |
| 4-methyl-3-penten-2-yl | C | Na |
| 2,2-dimethyl-3-buten-1 | D | K |
| 2-hepten-1-yl | D | K |
| 6-hepten-1-yl | B | Na |
| 2-hepten-4-yl | B | Na |
| 2-methyl-3-hexen-2-yl | B | Na |
| 2-methyl-4-hexen-3-yl | B | Na |
| 2-methyl-5-hexen-2-yl | E | K |
| 2-methyl-5-hexen-4-yl | F | Na |
| 3-methyl-2-hexen-4-yl | F | Na |
| 3-methyl-5-hexen-3-yl | F-1 | Na |
| 2,2-dimethyl-3-penten-1-yl | F-1 | Na |
| 2,3-dimethyl-2-penten-4-yl | F-1 | Na |
| 2,4-diemthyl-2-penten-4-yl | B | Na |
| 2,2,3-trimethyl-3-buten-1-yl | B | Na |
| 2-octen-1-yl | B | Na |
| 1-octen-3-yl | B | Na |
| Propargyl | A | Na |
| 1-butyn-3-yl | A | Na |
| 2-butyn-1-yl | A | Na |
| 1-pentyn-3-yl | A | Na |
| 2-methyl-3-butyn-1-yl | A | Na |
| 2-hexyn-1-yl | B | Na |
| 1-hexyn-3-yl | B | Na |
| 2-heptyn-1-yl | B | Na |
| 2,3-dimethyl-4-pentyn-3-yl | B | Na |
| 5-methyl-3-hexyn-2-yl | B | Na |
| 3-ethyl-1-pentyn-3-yl | B | Na |
| 3-methyl-1-heptyn-e-yl | C | Na |
| 2,4-dimethyl-5-hexyn-3-yl | C | Na |
| 2,2,3-trimethyl-4-pentyn-3-yl | C | Na |
| 3-octyn-1-yl | C | Na |
| 3-octyn-2-yl | C | Na |
| Benzyl | A | Na |
| σ-Chlorobenzyl | A | Na |
| p-Bromobenzyl | A | Na |
| m-Methylbenzyl | B | Na |
| p-Ethylbenzyl | B | Na |
| σ-Nitrobenzyl | C | K |
| m-Nitrobenzyl | C | K |
| σ-Methoxybenzyl | C | K |
| p-Ethoxybenzyl | C | K |
| p-Butyrylbenzyl | B | K |
| σ-Carbomethoxybenzyl | B | Na |
| σ-Fluorobenzyl | A | Na |
| σ-Dimethylaminobenzyl | F-1 | K |
| Benzohydryl | B | Na |
| Trityl | B | Na |
| Cholesteryl | B | Na |
| 2-furylmethyl | D | Na |
| 3-pyridylmethyl | F | H |
| [2,2-diethyl-1,3-dioxolon-4-yl]-methyl | B | Na |
| (2-pyrrolidono)methyl | B | Na |
| (4-imidazolyl)methyl | F-1 | K |
| 1-indanylmethyl | B | Na |
| Phthalimidomethyl | F-1 | K |
| (4-N-methyl)pyridyl | F-1 | K |

Substitution of R₂OH by R₇SH in this procedure produces the following penicillins:

$$R_1-CH-CONHR_4$$
$$|$$
$$COSR_7$$

| R₇ | Method | M |
|---|---|---|
| Phenyl | A | Na |
| σ-Tolyl | A | Na |
| p-Tolyl | A | Na |
| m-Tolyl | B | K |
| p-Tolyl | B | K |
| p-Isopropylphenyl | B | K |
| p-t-butylphenyl | B | K |
| 2,5-dimethylphenyl | B | K |
| 2,5-diethylphenyl | B | K |
| 2-methyl-5-isopropylphenyl | B | K |
| 4-t-butyl-2-isopropylphenyl | B | K |
| σ-Chlorophenyl | B | Na |
| p-Chlorophenyl | B | Na |
| m-Bromophenyl | B | Na |
| p-Fluorophenyl | B | Na |
| 2,4-dichlorophenyl | A | Na |
| 3,4-dichlorophenyl | A | Na |
| 2,3,5-trichlorophenyl | A | Na |
| 2,4-dibromophenyl | A | Na |
| 2,4,5-tribromophenyl | A | Na |
| 4-chloro-2-methylphenyl | B | Na |
| 6-chloro-3-methylphenyl | B | Na |
| 3-chloro-4-methylphenyl | B | Na |
| 6-chloro-3-isopropylphenyl | B | Na |
| 2-bromo-4-isopropylphenyl | B | Na |
| 2-chloro-3,5-dimethylphenyl | B | Na |
| 5-chloro-2,4-dimethylphenyl | B | Na |
| 4,6-dichloro-3-methylphenyl | A | Na |
| 2,4-difluorophenyl | A | Na |
| m-Trifluoromethylphenyl | A | Na |
| p-Trifluoromethylphenyl | A | Na |
| m-Methoxyphenyl | C | Na |
| p-Methoxyphenyl | C | Na |
| σ-Ethoxyphenyl | C | Na |
| p-Butoxyphenyl | C | Na |
| 2-methoxy-4-methylphenyl | C | Na |
| 3-methoxy-4-methylphenyl | C | Na |
| 3-methoxy-4-methylphenyl | C | Na |
| 5-methoxy-3-methylphenyl | C | Na |
| 3-t-butyl-4-methoxyphenyl | B | K |
| 4-methoxy-2,5-dimethylphenyl | B | K |
| 2,5-dimethoxyphenyl | F | H |
| 3,4-di-isopropoxyphenyl | F | H |
| 4-methoxy-2,5-dipropylphenyl | F-1 | K |
| 2-chloro-4-methoxyphenyl | A | Na |
| 4-bromo-3-methoxyphenyl | A | Na |
| 5-bromo-2-methoxyphenyl | A | Na |
| 4-butoxy-2-chlorophenyl | E | Na |
| 2,4-dichloro-4-ethoxyphenyl | B | K |
| 3-ethyl-4-methoxyphenyl | B | K |

EXAMPLE XIII

Other arylhalocarbonyl ketenes of Examples II and III wherein R₁ is 3-furyl, 3-pyridyl, 4-pyridyl, p-tolyl, σ-methoxyphenyl, p-methoxyphenyl, p-trifluoromethylphenyl, p-chlorophenyl, σ-dimethylaminophenyl and p-dimethylaminophenyl, are converted to penicillins by the methods of Example XI. For convenience only the R₂ values are listed.

| R₂ | Method | M |
|---|---|---|
| Methyl | A | Na |
| n-Butyl | A | Na |
| Decyl | D | K |
| Tetradecyl | B | Na |
| 2-chloroethyl | A | Na |
| 3-chloropropyl | A | Na |
| 3-chloro-1-butyl | A | Na |
| 1-methyl-3-chloropropyl | A | Na |
| 2,2-dimethyl-2-chloroethyl | A | Na |
| 2-bromoethyl | B | K |
| 3-bromopropyl | B | K |
| 4-bromo-1-butyl | B | K |
| 1,3-dichloropropyl | A | Na |
| 2,3-dibromopropyl | A | Na |
| 2-bromo-3-chloropropyl | A | Na |
| 3,4-dichloro-1-butyl | A | Na |
| 2,2-dichloroethyl | A | Na |
| 2,3,3-tribromopropyl | A | Na |
| 2,2,3-trichlorobutyl | A | Na |
| 2,2,3,3-tetrabromoproyl | A | Na |
| 2,2,2-trichloroethyl | A | Na |
| 2,2,2-trifluoroethyl | A | Na |
| 3,3,3-trifluoropropyl | A | Na |
| 2-nitroethyl | B | K |
| 3-nitropropyl | B | K |
| 3-nitrobutyl | B | K |
| 1-methyl-2-nitropropyl | B | K |
| 2,2-dinitroethyl | C | Na |
| 1-methyl-2,2-dinitroethyl | C | Na |
| 2-bromo-2-nitroethyl | B | Na |
| 2-chloro-2-nitropropyl | B | Na |
| 1-methyl-2-bromo-2-nitroethyl | B | Na |
| 2-chloro-2-nitrobutyl | B | Na |
| 1-trichloromethyl-2-nitroethyl | B | Na |
| 1-trifluoromethylethyl | A | Na |

TABLE—Continued

| R₂ | Method | M |
|---|---|---|
| 1,1-dimethyl-2,2,2-trifluoroethyl | A | Na |
| 2-methoxyethyl | F-1 | K |
| 2-n-butoxyethyl | F-1 | K |
| 3-methoxypropyl | F-1 | K |
| 3-sec-butoxypropyl | F-1 | K |
| 4-ethoxy-n-butyl | F-1 | K |
| 1,1-dimethyl-2-methoxyethyl | F-1 | K |
| 2-cyanoethyl | E | K |
| 3-cyanopropyl | E | K |
| 1-cyano-2-chloropropyl | B | K |
| 1-cyano-2,2-dichloropropyl | B | K |
| 1-cyano-2,2,2-trichloroethyl | B | K |
| 1-cyano-2,2,2-tribromoethyl | B | K |
| 1-methyl-1-(1'-cyano-1'-methylethoxy)propyl | B | Na |
| 2-acetoxyethyl | B | Na |
| 2-acetoxypropyl | B | Na |
| 3-butyryloxypropyl | B | Na |
| 4-propionyloxy-n-butyl | B | Na |
| Carbobutoxymethyl | B | Na |
| 2-carbethoxyethyl | B | Na |
| 3-carbobutoxypropyl | B | Na |
| 4-carbethoxybutyl | C | Na |
| 2-carbethoxypropyl | C | Na |
| 1-trichloromethyl-2-carbomethoxyethyl | B | K |
| 1-carbethoxy-2-chloropropyl | B | K |
| 1-carbethoxy-2,2-dichloropropyl | B | K |
| 1-carbomethoxy-2,2,2-trichloroethyl | B | K |
| 1-carbethoxy-2,2-dichloroethyl | B | K |
| 1-carbomethoxymethyl-2,2,2-trichloroethyl | B | K |
| Acetonyl | E | Na |
| 2-oxopentyl | E | Na |
| 2-methyl-3-oxobutyl | E | Na |
| 1,1-dimethylacetonyl | E | Na |
| 1-acetyl-1-methylpropyl | B | Na |
| 2-methyl-3-oxopentyl | B | Na |
| 1-acetonylbutyl | B | Na |
| 1-ethyl-2-methyl-3-oxobutyl | B | Na |
| 4-oxohexyl | B | Na |
| 1-methoxy-2,2,2-trichlorethyl | A | Na |
| 1-ethoxy-2,2,2-trichloroethyl | A | Na |
| 1-methoxy-2,2,2-trifluoroethyl | A | Na |
| 1-butoxy-2,2,2-trifluoroethyl | A | Na |
| 2,3-diacetoxypropyl | B | K |
| 2,3-dicapryloxypropyl | B | K |
| 2,3-distearoyloxypropyl | B | K |
| (1,2,3-tricarbomethoxy)-2-propyl | B | K |
| (1,2,3-tricarbobutoxy)-2-propyl | B | K |
| 2-chloro-3,3-dimethoxypropyl | B | K |
| 1-methyl-2,2-diethoxyethyl | B | K |
| 2-oxo-3-chloropropyl | B | Na |
| 1-trichloromethyl-3-oxobutyl | B | K |
| 2-fluoroethyl | A | Na |
| 1-nitro-1-trifluoromethyl-2,2,2-trifluoroethyl | A | Na |
| 4,4,4-trifluorobutyl | A | Na |
| Dicarbethoxyethoxymethyl | B | Na |
| 1,1-dicarbethoxymethyl-2-ethoxyethyl | B | Na |
| Carbethoxyethoxymethyl | B | Na |
| Chlorodicarbomethoxymethyl | B | Na |
| Bromodicarbomethoxymethyl | B | Na |
| 1-isopropoxy-2,2,2-trichloroethyl | A | Na |
| 1-t-butoxy-2,2,2-trichloroethyl | A | Na |
| Dicarbomethoxyethoxymethyl | B | Na |
| Phenyl | B | Na |
| o-Tolyl | B | Na |
| P-tolyl | B | Na |
| M-ethylphenyl | B | Na |
| o-n-Propylphenyl | B | Na |
| o-Isopropylphenyl | B | Na |
| p-t-Butylphenyl | B | Na |
| o-Methoxyphenyl | B | Na |
| p-Methoxyphenyl | B | Na |
| m-Ethoxyphenyl | B | Na |
| p-n-Butoxyphenyl | B | Na |
| o-Chlorophenyl | A | Na |
| p-Chlorophenyl | A | Na |
| m-Bromophenyl | A | Na |
| p-Fluorophenyl | A | Na |
| o-Formylphenyl | A | Na |
| m-Formylphenyl | A | Na |
| o-Acetylphenyl | A | Na |
| p-Butyrylphenyl | A | Na |
| o-Nitrophenyl | C | K |
| m-Nitrophenyl | C | K |
| o-Carbomethoxyphenyl | C | Na |
| m-Carbomethoxyphenyl | C | Na |
| p-Carbo-n-propoxyphenyl | C | Na |
| o-Dimethylaminophenyl | F-1 | K |
| o-Diethylaminophenyl | F-1 | K |
| o-Di-n-butylaminophenyl | F-1 | K |
| m-Di-n-propylaminophenyl | F-1 | K |
| p-Methylethylaminophenyl | F-1 | K |
| p-Methylisopropylaminophenyl | F-1 | K |
| 2,3-dimethylphenyl | D | K |
| 2,5-dimethylphenyl | D | K |
| 2,3-diethylphenyl | D | K |
| 2,4-di-n-propylphenyl | D | K |
| 6-ethyl-2-methylphenyl | D | K |
| 2-methyl-4-sec-butylphenyl | B | Na |
| 3-methyl-4-t-butylphenyl | B | Na |
| 2,3,4-trimethylphenyl | B | Na |
| 2,6-dimethyl-4-ethylphenyl | B | Na |
| 4,6-dimethyl-2-methylphenyl | B | Na |
| 4,5-dimethyl-2-isopropylphenyl | B | Na |
| 2,3,4,6-tetramethylphenyl | B | Na |
| 4-butyl-5-isoporpyl-2-methylphenyl | B | Na |
| Pentamethylphenyl | B | Na |
| 2,6-dichlorophenyl | A | Na |
| 2,6-dibromophenyl | A | Na |
| 2,4,6-trichlorophenyl | A | Na |
| 2,4,6-tribromophenyl | A | Na |
| 2,3,5,6-tetrachlorophenyl | A | Na |
| Pentachlorophenyl | A | Na |
| 2,4-dinitrophenyl | C | Na |
| 2,3,4,6-tetranitrophenyl | C | Na |
| Pentanitrophenyl | C | Na |
| 2,4-difluorophenyl | A | Na |
| 2,4,6-trifluorophenyl | A | Na |
| Pentafluorophenyl | A | Na |
| 3-chloro-4-fluorophenyl | A | Na |
| 2-bromo-4-fluorophenyl | A | Na |
| 2,6-dichloro-4-fluorophenyl | A | Na |
| 4,6-dibromo-2-fluorophenyl | A | Na |
| 2-bromo-3,5-dichloro-4-fluorophenyl | A | Na |
| 3-fluoro-2,4,6-trichlorphenyl | A | Na |
| 4-bromo-3-methoxyphenyl | A | Na |
| 2-chloro-6-methoxyphenyl | A | Na |
| 3-methoxy-2-methylphene | B | K |
| 2-methoxy-6-propylphenul | B | K |
| 2-carbomethoxy-5-fluorophenyl | B | K |
| 5-fluoro-2-methoxyphenyl | B | K |
| 4-acetyl-2-fluorophenyl | B | K |
| 4-chloro-2-methylphenyl | B | Na |
| 2-bromo-6-methylphenyl | B | Na |
| 2-bromo-4-t-butylphenyl | B | Na |
| 2-chloro-4-isopropylphenyl | B | Na |
| 2-isobutyl-4-fluorophenyl | B | K |
| 6-bromo-3,4-dimethylphenyl | B | K |
| 4-chloro-2,3-dimethylphenyl | B | K |
| 4-bromo-3-isopropyl-3-methylphenyl | B | K |
| 4-chloro-2,3-diethylphenyl | B | K |
| 2-chloro-3,4-dimethylphenyl | B | K |
| 4,6-dibromo-2-methylphenyl | B | K |
| 2,4-dichloro-3,5-dimethylphenyl | B | K |
| 4-chloro-2,3,5-trimethylphenyl | B | K |
| 4-chloro-2-nitrophenyl | B | K |
| 6-chloro-2,4-dinitrophenyl | B | K |
| 3-chloro-4-fluoro-6-nitrophenyl | B | K |
| 2,4-dibromo-3-fluoro-6-nitrophenyl | B | K |
| 4-chloro-5-fluoro-2-nitrophenyl | E | K |
| 4-acetyl-2-fluoro-5-nitrophenyl | E | K |
| 2-acetyl-6-bromo-4-fluorophenyl | E | K |
| 2-fluoro-4-propionylphenyl | E | K |
| 3,4-dicarbomethoxy-2,5,6-tribromophenyl | B | K |
| 2-acetyl-4-chlorophenyl | B | K |
| 2-acetyl-3,5-dichlorophenyl | A | Na |
| 2-acetyl-6-chloro-4-methylphenyl | A | Na |
| 4-chloro-2-propionylphenyl | A | Na |
| 2-acetyl-6-dimethylaminophenyl | F-1 | K |
| 4-dimethylamino-2-methylphenyl | F-1 | K |
| 4-carbomethoxy-2-dimethylaminophenyl | F-1 | K |
| 4-t-butyl-3-nitrophenyl | B | Na |
| 2-methyl-5-isopropylphenyl | B | Na |
| 6-nitro-1,2,3,4-tetramethylphenyl | B | Na |
| 2-methoxy-5-nitro-4-propylphenyl | B | Na |
| 2-ethyl-6-methyl-4-nitrophenyl | B | Na |
| 2,3-dimethoxyphenyl | A | Na |
| 3,5-dimethoxy-4-methylphenyl | A | Na |
| 2,5-dimethoxy-4-propylphenyl | A | Na |
| 3,4,5-trimethoxyphenyl | A | Na |
| m-acetylphenyl | B | K |
| o-Propionylphenyl | B | K |
| p-Propionylphenyl | B | K |
| 2-carbomethoxy-4-methoxyphenyl | B | K |
| 2-carbomethoxy-6-methoxyphenyl | B | K |
| 3,4-dicarbomethoxyphenyl | B | K |
| 2,3-dicarbethoxyphenyl | B | K |
| 2,4-dicarbethoxyphenyl | B | K |
| 2,4-dicarbomethoxy-3,5-dimethylphenyl | B | K |
| 4-carbomethoxy-2,5-dimethyl-4-methoxyphenyl | E | K |
| 4-carbomethoxy-2,6-dichlorophenyl | E | K |
| 2-carbomethoxy-3,5-dimethoxy-4,6-dimethylphenyl | E | K |
| 2-bromo-4-carbomethoxy-6-methoxyphenyl | E | K |
| 5-carbomethoxy-2-methoxy-3-nitrophenyl | E | K |
| 3-carbomethoxy-2,4-dinitro-6-methoxyphenyl | E | K |
| 4-indanyl | A | Na |
| 5-indanyl | A | Na |
| 5-methyl-4-indanyl | A | Na |
| 6-methyl-4-indanyl | A | Na |
| 3-methyl-4-indanyl | A | Na |
| 1-methyl-5-indanyl | A | Na |
| 7-methyl-5-indanyl | A | Na |
| 6-t-butyl-5-indanyl | A | Na |
| 4,6-dimethyl-5-indanyl | C | Na |
| 1,1-dimethyl-4-indanyl | C | Na |
| 1,1,2-triethyl-4-indanyl | B | K |
| 1,1,2,3-tetramethyl-4-indanyl | B | K |
| 5,7-dimethyl-4-indanyl | B | K |
| 7-chloro-4-indanyl | A | Na |
| 7-bromo-4-indanyl | A | Na |
| 6-chloro-5-indanyl | A | Na |
| 1,1,7-trimethyl-4-indanyl | B | K |
| 4-(1-indanyl)phenyl | B | K |
| 2,4-(dicyclopent-2-enyl)phenyl | B | K |
| 4-(α,α-dimethylbenzyl)phenyl) | B | K |
| 1-naphthyl | B | Na |
| 2-naphthyl | B | Na |
| 1-(5,6,7,8-tetrahydronaphthyl) | B | Na |
| 2-(5,6,7,8-tetrahydronaphthyl) | B | Na |
| 3-(2-methyl-4-pyronyl) | B | Na |
| 3-quinolyl | F-1 | K |
| 5-quinolyl | F-1 | K |
| 8-quinolyl | F-1 | K |
| 5-(1,4-naphthoquinonyl) | B | Na |
| 6-(1,4-naphthoquinonyl) | B | Na |
| 4-(coumarinyl) | C | K |
| 5-(coumarinyl) | C | K |
| 3-thianaphthenyl | B | Na |
| 1-phenazinyl | F-1 | K |

TABLE—Continued

| R₂ | Method | M |
|---|---|---|
| 2-phenazinyl | F-1 | K |
| 2-(anthraquinonyl) | B | Na |
| 2-(4-methylquinolyl) | F-1 | K |
| 1-fluorenyl | A | Na |
| 2-fluorenyl | A | Na |
| 7-(1,2-naphthoquinonyl) | B | Na |
| 1-anthraquinonyl | B | Na |
| 8-isoquinolyl | F-1 | K |
| 4-(1,3-benzodioxolyl) | B | K |
| 5-(1,3-benzodioxolyl) | B | K |
| 3-(4-pyronyl) | B | K |
| 1-(4-methyl-5,6,7,8-tetrahydronaphthyl) | C | Na |
| 2-(3-methyl-5,6,7,8-tetrahydronaphthyl) | C | Na |
| 2-(5-methyl-5,6,7,8-tetrahydronaphthyl) | C | Na |
| 1-(4,4-dimethyl-5,6,7,8-tetrahydronaphthyl) | E | K |
| 2-(1,6-dimethyl-5,6,7,8-tetrahydronaphthyl) | E | K |
| 1-(2,4,7-trimethyl-5,6,7,8-tetrahydronaphthyl) | E | K |
| 2-(1,5,6-trimethyl-5,6,7,8-tetrahydronaphthyl) | E | K |
| 2-(3,4,6-trimethyl-5,6,7,8-tetrahydronaphthyl) | E | K |
| 1-(1,2,4-triethyl-5,6,7,8-tetrahydronaphthyl) | E | K |
| 2-(5,5,8,8-tetramethyl-5,6,7,8-tetrahydronaphthyl) | E | K |
| 4-bromo-2-carbomethoxy-5-methylphenyl | F | H |
| 2-acetyl-6-chloro-5-methylphenyl | B | K |
| 2-acetyl-4,5-dimethyl-6-ethylphenyl | D | Na |
| 2-acetyl-5-dimethylaminophenyl | F-1 | K |
| 2-furyl | C | K |
| 3-furyl | C | K |
| 2-(1,4-naphthoquinonyl) | B | K |
| Cyclopropyl | A | Na |
| Cyclobutyl | A | Na |
| Cyclopentyl | A | Na |
| Cyclohexyl | A | Na |
| Cycloheptyl | A | Na |
| 1-methyl-1-cyclopentyl | A | Na |
| 3-methyl-1-cyclopentyl | A | Na |
| 1,3-methyl-1-cyclopentyl | B | K |
| 2,5-methyl-1-cyclopentyl | B | K |
| 1,2,2-trimethyl-1-cyclopentyl | B | K |
| 1,2,5-trimethyl-1-cyclopentyl | B | K |
| 1-isopropyl-1-cyclopentyl | B | K |
| 3-isopropyl-1-cyclopentyl | B | K |
| 1-methyl-1-cyclohexyl | B | K |
| 3-methyl-1-cyclohexyl | B | K |
| 1-ethyl-1-cyclohexyl | B | K |
| 1-isopropyl-1-cyclohexyl | B | K |
| 4-t-butyl-1-cyclohexyl | B | K |
| 4,4-isopropyl-1-cyclohexyl | B | K |
| 1,2-isopropyl-1-cyclohexyl | B | K |
| 3,4-dimethyl-1-cyclohexyl | C | Na |
| 1,3-dimethyl-1-cyclohexyl | C | Na |
| 2,4-dimethyl-1-cyclohexyl | C | Na |
| 2,2,3-trimethyl-cyclohexyl | D | Na |
| 1,3,3-trimethyl-cyclohexyl | D | Na |
| 2,4,4-trimethyl-cyclohexyl | D | Na |
| 3,3,5-trimethyl-cyclohexyl | E | Na |
| 1,4,4-trimethyl-cyclohexyl | E | Na |
| 1,3,4-trimethyl-cyclohexyl | E | Na |
| 2-chloro-1-indanyl | E | Na |
| 3-bromo-1-indanyl | E | Na |
| 2-methyl-6-propyl-1-cyclohexyl | E | Na |
| 2-propyl-4-methyl-1-cyclohexyl | E | Na |
| 1,4-dimethyl-1-cyclohexyl | F | K |
| 1-ethyl-3-methyl-1-cyclohexyl | F | K |
| 2,6-diethyl-1-cyclohexyl | F | K |
| 2,2,5,5-tetraethyl-1-cyclohexyl | F-1 | K |
| 1,2,4,5-tetraethyl-1-cyclohexyl | F-1 | K |
| 1-methyl-1-cycloheptyl | F-1 | K |
| 1-(1,2,3,4-tetrahydronaphthyl) | F-1 | K |
| 2-(1,2,3,4-tetrahydronaphthyl) | F-1 | K |
| 1-indanyl | B | K |
| 2-indanyl | B | K |
| 1-methyl-1-indanyl | B | K |
| 1-ethyl-1-indanyl | B | K |
| 2-bicyclo-[4·4·0]-decyl | A | Na |
| 3-bicyclo-[4·4·0]-decyl | A | Na |
| 7-adamantanyl | A | Na |
| Thujyl | B | K |
| 1-(1-methyl-1,2,3,4-tetrahydronaphthyl) | B | K |
| 1-(2-chloro-1,2,3,4-tetrahydronaphthyl) | B | K |
| 2-dimethylaminoethyl | F-1 | K |
| 3-diethylaminopropyl | F-1 | K |
| 2-piperidinoethyl | F-1 | K |
| 3-morpholinopropyl | F-1 | K |
| 3-thiomorpholinopropyl | F-1 | K |
| 2-pyrrolidinoethyl | F-1 | K |
| 2-(2-imidazolino)ethyl | F-1 | K |
| 2-pyrroloethyl | F-1 | K |
| 3-(N-methyl)piperazinopropyl | F-1 | K |
| 2-di-(n-propyl)aminoethyl | B | Na |
| 2-di-(n-butyl)aminoethyl | B | Na |
| 3-diisopropylaminopropyl | B | Na |
| 3-imidazolopropyl | B | Na |
| 3-(2-imidazolinopropyl) | B | Na |
| 3-(2,5-dimethylpyrrolidino)propyl | B | Na |
| 3-aziridinopropyl | B | Na |
| 3-pyrrolopropyl | B | Na |
| Aziridinomethyl | C | K |
| Pyrrolidinomethyl | C | K |
| Morpholinomethyl | C | K |
| (1,4,5,6-tetrahydropyrimidino)methyl | C | K |
| Pyrrolomethyl | C | K |
| 3-diisopropylamino-2-propyl | C | K |
| 2-dimethylamino-1-propyl | C | K |
| 3-aziridino-2-propyl | C | K |
| 2-(N-methylanilino)ethyl | B | Na |
| 2-(N-ethylanilino)ethyl | F-1 | K |
| 3-(N-methylanilino)propyl | F-1 | K |
| 3-(N-isopropylanilino)propyl | F-1 | K |
| 3-(N-methylanilino)-2-propyl | F-1 | K |
| 2-(N-methylanilino)-1-propyl | F-1 | K |
| 3-N-ethylpiperazino-2-propyl | B | Na |
| 3-(2-imidazolino)-2-propyl | A | Na |
| 3-(4-methylpiperidino)2-propyl | A | Na |
| 2-aziridino-1-propyl | B | K |
| 2-morpholino-1-propyl | B | K |
| 2-thiomorpholino-1-propyl | B | K |
| 2-imidazolo-1-propyl | B | K |
| 2-(1,4,5,6-tetrahydropyrimidino)-1-propyl | B | K |
| 2-dipropylamino-1-propyl | B | K |
| 2-butyramidoethyl | B | K |
| 3-acetamidopropyl | B | K |
| 2-acetamido-1-propyl | B | K |
| 2-piperidinoethyl | B | K |
| 3-piperidinopropyl | B | K |
| 2-pyrrolidinoethyl | B | K |
| 2-(1,4,5,6-tetrahydropyrimidino)ethyl | F-1 | K |
| 3-di-(n-propylamino)-2-propyl | F-1 | K |
| 2-diethylamino-1-propyl | F-1 | K |
| 3-pyrrolidino-2-propyl | F-1 | K |
| 3-piperidino-2-propyl | F-1 | K |
| 3-diethylamino-2-propyl | F-1 | K |
| 3-morpholino-2-propyl | F-1 | K |
| 3-di-(n-butyl)amino-2-propyl | F-1 | K |
| 3-dimethylamino-2-propyl | F-1 | K |
| 2-azetidinoethyl | F-1 | K |
| 3-azetidino-2-propyl | F-1 | K |
| 2-pyridylmethyl | B | Na |
| 4-pyridylmethyl | B | Na |
| 4-imidazolylmethyl | B | Na |
| 2-(N-phenylimidazolyl)methyl | B | Na |
| Phthalimidomethyl | B | Na |
| Benzyl | A | Na |
| σ-Chlorobenzyl | A | Na |
| m-Chlorobenzyl | A | Na |
| p-Bromobenzyl | A | Na |
| m-Methylbenzyl | B | Na |
| σ-Nitrobenzyl | C | K |
| p-Ethoxybenzyl | C | K |
| m-Acetylbenzyl | B | K |
| σ-Carbomethoxybenzyl | B | Na |
| σ-Fluorobenzyl | A | Na |
| p-Dimethylaminobenzyl | F-1 | K |
| Benzohydryl | B | Na |
| Trityl | B | Na |
| Cholesteryl | B | Na |
| 2-furylmethyl | D | Na |
| 2-pyridylmethyl | F | H |
| 2,2-dimethyl-1,3-dioxolon-4-yl-1-methyl | B | Na |
| 2-pyrrolidonomethyl | B | Na |
| (4-imidazolyl)methyl | F-1 | K |
| 2-indanylmethyl | B | Na |
| Phthalimidomethyl | F-1 | K |

The above procedure is repeated but using the appropriate thiophenol R₇SH in place of R₂OH to produce penicillins of the formula:

$$R_1-CH-CONHR_4$$
$$\quad\quad |$$
$$\quad COSR_7$$

| R₇ | Method | M |
|---|---|---|
| Phenyl | A | Na |
| σ-Tolyl | A | Na |
| m-Tolyl | A | Na |
| p-Ethylphenyl | B | K |
| p-Isopropylphenyl | B | K |
| p-Butylphenyl | B | K |
| p-Sec-butylphenyl | B | K |
| 3,5-dimethylphenyl | B | K |
| 2,5-diethylphenyl | B | K |
| 4-t-butyl-2-isopropylphenyl | B | K |
| σ-Chlorophenyl | B | Na |
| m-Chlorophenyl | B | Na |
| p-Bromophenyl | B | Na |
| p-Fluorophenyl | B | Na |
| 3,4-dichlorophenyl | A | Na |
| 2,4,5-trichlorophenyl | A | Na |
| 2,4-dibromophenyl | A | Na |
| 2,4,5-tribromophenyl | A | Na |
| 4-chloro-2-methylphenyl | B | Na |
| 3-chloro-4-methylphenyl | B | Na |
| 5-bromo-2-methylphenyl | B | Na |
| 4-chloro-3,5-dimethylphenyl | B | K |
| 5-chloro-2,4-dimethylphenyl | B | K |
| 2,4-dichloro-3-methylphenyl | A | Na |
| 2,4-difluorophenyl | A | Na |
| m-Difluorophenyl | A | Na |
| p-Methoxyphenyl | C | Na |
| σ-Ethoxyphenyl | C | Na |
| m-Ethoxyphenyl | C | Na |
| p-Isobutoxyphenyl | C | Na |
| 3-methoxy-4-methylphenyl | C | Na |
| 6-methoxy-3-methylphenyl | C | Na |
| 3-t-butyl-4-methoxyphenyl | B | K |
| 4-methoxy-3,5-dimethylphenyl | B | K |
| 3,4-dimethoxyphenyl | F | H |
| 3,4-di-isopropoxyphenyl | F | H |
| 4-methoxy-3,5-dipropylphenyl | F-1 | K |
| 4-methoxy-3,5-di-isopropoxyphenyl | F-1 | K |
| 4-chloro-3-methoxyphenyl | A | Na |
| 2-bromo-5-methoxyphenyl | A | Na |
| 4-butoxy-2-chlorophenyl | E | Na |
| 2,5-dichloro-4-ethoxyphenyl | B | K |

EXAMPLE XIV

Again following the procedures of Example XI, the aryl halo carbonyl ketenes wherein the aryl group, $R_1$, for each of the $R_2$ values given, is m-tolyl, m-methoxyphenyl, m-trifluoromethylphenyl, σ-isopropylphenyl, σ-chlorophenyl, σ-bromophenyl, m-bromophenyl, m-chlorophenyl, σ-butoxyphenyl, σ-butylphenyl, σ-diethylaminophenyl, p-di-(n-propyl)aminophenyl, σ-dibutylaminophenyl and m-dimethylaminophenyl are converted to penicillins of Formula III.

| $R_2$ | Method | D |
|---|---|---|
| Methyl | A | Na |
| Ethyl | A | Na |
| i-Propyl | A | Na |
| n-Butyl | A | Na |
| t-Butyl | A | Na |
| Octyl | D | K |
| Dodecyl | B | Na |
| Octadecyl | D | K |
| 2-chloroethyl | A | Na |
| 3-chloropropyl | A | Na |
| 2-chloro-1-butyl | A | Na |
| 4-chloro-1-butyl | A | Na |
| 1-methyl-3-chloropropyl | A | Na |
| 2,2-dimethyl-2-chloroethyl | A | Na |
| 2-bromoethyl | B | K |
| 1-methyl-2-bromoethyl | B | K |
| 4-bromo-1-butyl | B | K |
| 1,3-dichloropropyl | A | Na |
| 1,1-dichloromethylethyl | A | Na |
| 2-chloro-3-bromopropyl | A | Na |
| 1,4-dibromo-2-butyl | A | Na |
| 3,4-dichloro-1-butyl | A | Na |
| 1-bromomethyl-2-chloroethyl | A | Na |
| 2,3-dibromo-2-methylpropyl | A | Na |
| 2,2-dichloroethyl | A | Na |
| 2,3,3-tribromopropyl | A | Na |
| 2,2,3-trichlorobutyl | A | Na |
| 2-chloro-2,3-dibromobutyl | A | Na |
| 2,2,3,3-tetrabromopropyl | A | Na |
| 2,2,2-trichloroethyl | A | Na |
| 2,2,2-trifluoroethyl | A | Na |
| 2-(2-trifluoromethyl)propyl | A | Na |
| 2-nitroethyl | B | K |
| 3-nitropropyl | B | K |
| 3-nitrobutyl | B | K |
| 1-methyl-2-nitropropyl | B | K |
| 2,2-dinitroethyl | C | Na |
| 1-methyl-2,2-dinitroethyl | C | Na |
| 2-chloro-2-nitropropyl | B | Na |
| 2-bromo-2-nitropropyl | B | Na |
| 1-methyl-2-chloro-2-nitroethyl | B | Na |
| 1-methyl-2-bromo-2-nitroethyl | B | Na |
| 1-trichloromethyl-2-nitroethyl | B | Na |
| 1-trifluoromethylethyl | A | Na |
| 1,1-dimethyl-2,2,2-trichlorethyl | A | Na |
| 2-methoxyethyl | F-1 | K |
| 2-isopropoxyethyl | F-1 | K |
| 3-sec-butoxypropyl | F-1 | K |
| 4-methoxy-n-butyl | F-1 | K |
| 4-butoxy-n-butyl | F-1 | K |
| 1,1-dimethyl-2-ethoxyethyl | F-1 | K |
| 2-cyanoethyl | E | K |
| 3-cyanopropyl | E | K |
| 2-cyano-1-methylethyl | E | K |
| 1-cyano-2-chloropropyl | B | K |
| 1-cyano-2,2-dichloropropyl | B | K |
| 1-cyano-2,2,2-trichloroethyl | B | K |
| 1-cyano-2,2,2-tribromoethyl | B | K |
| 2-acetoxyethyl | B | Na |
| 2-butyryloxyethyl | B | Na |
| 3-acetoxypropyl | B | Na |
| 1-methyl-3-acetoxypropyl | B | Na |
| Carbomethoxymethyl | B | Na |
| 2-carbethoxyethyl | B | Na |
| 3-carbobutoxypropyl | B | Na |
| 4-carbethoxybutyl | C | Na |
| 1-carbethoxypropyl | C | Na |
| 1-chloromethyl-2-carbethoxyethyl | B | K |
| 1-trichloromethyl-2-carbomethoxyethyl | B | K |
| 1-carbethoxy-2,2-dichloropropyl | B | K |
| 1-carbomethoxy-2,2,2-trichloroethyl | B | K |
| 1-carbomethoxy-2-chloroethyl | B | K |
| 1-carbomethoxymethyl-2,2,2-trichloroethyl | B | K |
| Acetonyl | E | Na |
| 4-oxopentyl | E | Na |
| 2-methyl-3-oxobutyl | E | Na |
| 1-methyl-4-oxopentyl | E | Na |
| 1-methyl-3-oxobutyl | E | Na |
| 2-acetylbutyl | B | Na |
| 2-acetylpropyl | B | Na |
| 3-oxopentyl | B | Na |
| 5-oxohexyl | B | Na |
| 1-methoxy-2,2,2-trichloroethyl | A | Na |
| 1-propoxy-2,2,2-trichloroethyl | A | Na |
| 1-methoxy-2,2,2-trifluoroethyl | A | Na |
| 1-ethoxy-2,2,2-trifluoroethyl | A | Na |
| 2,3-diacetoxypropyl | B | K |
| 2,3-dicaproyloxypropyl | B | K |
| 2,3-distearoyloxypropyl | B | K |
| (1,2,3-tricarbomethoxy)-2-propyl | B | K |
| (1,2,3-tricarbobutoxy)-2-propyl | B | K |
| 3,3-diethoxypropyl | B | K |
| 2-chloro-3,3-dimethoxypropyl | B | Na |
| 2-oxo-3-chloropropyl | B | K |
| 1-trichloromethyl-3-oxobutyl | B | K |
| 3-fluoropropyl | A | Na |
| 2,2,3,3,4,4,4-heptafluorobutyl | A | Na |
| 1-methoxy-2-chloro-2,2-difluoroethyl | A | Na |
| Dicarbethoxyethoxymethyl | B | Na |
| 1,1-dicarbethoxymethyl-2-ethoxyethyl | B | Na |
| Carbethoxyethoxymethyl | B | Na |
| Chlorodicarbomethoxymethyl | B | Na |
| Bromodicarbomethoxymethyl | B | Na |
| 1-isopropoxy-2,2,2-trichloroethyl | A | Na |
| 1-t-butoxy-2,2,2-trichloroethyl | A | Na |
| Dicarbomethoxyethoxymethyl | B | Na |
| Phenyl | B | Na |
| σ-Tolyl | B | Na |
| m-n-Propylphenyl | B | Na |
| σ-Isopropylphenyl | B | Na |
| p-t-Butylphenyl | B | Na |
| σ-Methoxyphenyl | B | Na |
| m-Methoxyphenyl | B | Na |
| σ-Ethoxyphenyl | B | Na |
| p-n-Butoxyphenyl | B | Na |
| σ-Chlorophenyl | A | Na |
| m-Chlorophenyl | A | Na |
| m-Bromophenyl | A | Na |
| p-Fluorophenyl | A | Na |
| m-Formylphenyl | A | Na |
| σ-Acetylphenyl | A | Na |
| p-Butyrylphenyl | A | Na |
| m-Nitrophenyl | C | K |
| p-Nitrophenyl | C | K |
| m-Carbomethoxyphenyl | C | Na |
| σ-Carbethoxyphenyl | C | Na |
| p-Carbo-n-propoxyphenyl | C | Na |
| σ-Dimethylaminophenyl | F-1 | K |
| σ-Di-n-butylaminophenyl | F-1 | K |
| m-Di-n-propylaminophenyl | F-1 | K |
| p-Methylisopropylaminophenyl | F-1 | K |
| 3,4-dimethylphenyl | D | K |
| 2,4-diethylphenyl | D | K |
| 2,6-di-n-propylphenyl | D | K |
| 6-ethyl-2-methylphenyl | D | K |
| 2-methyl-6-n-propylphenyl | D | K |
| 2-methyl-4-sec-butylphenyl | B | Na |
| 2,3,4-trimethylphenyl | B | Na |
| 3,4,5-trimethylphenyl | B | Na |
| 2,6-dimethyl-4-ethylphenyl | B | Na |
| 4,6-dimethyl-2-methylphenyl | B | Na |
| 4,5-dimethyl-2-isopropylphenyl | B | Na |
| 2,3,4,6-tetramethylphenyl | B | Na |
| 4-butyl-5-isopropyl-2-methylphenyl | B | Na |
| Pentamethylphenyl | B | Na |
| 2,6-dichlorophenyl | A | Na |
| 2,4-dibromophenyl | A | Na |
| 2,4,6-trichlorophenyl | A | Na |
| 2,4,6-tribromophenyl | A | Na |
| Pentachlorophenyl | A | Na |
| 3,5-dinitrophenyl | C | Na |
| Pentanitrophenyl | C | Na |
| 2,3,5-trifluorophenyl | A | Na |
| Pentafluorophenyl | A | Na |
| 3-chloro-4-fluorophenyl | A | Na |
| 2,6-dichloro-4-fluorophenyl | A | Na |
| 4-bromo-3,5-difluorophenyl | A | Na |
| 3-fluoro-2,4,6-trichlorophenyl | A | Na |
| 2-methoxy-4-methylphenyl | A | Na |
| 5-bromo-2-methoxyphenyl | A | Na |
| 2-chloro-6-methoxyphenyl | A | Na |
| 2-ethoxy-3-methylphenyl | B | K |
| 2-carbomethoxy-5-fluorophenyl | B | K |
| 5-fluoro-2-methoxyphenyl | B | K |
| 2-acetyl-4-fluorophenyl | B | K |
| 4-chloro-2-methylphenyl | B | Na |
| 4-fluoro-3-methylphenyl | B | Na |
| 2-bromo-4-t-butylphenyl | B | Ka |
| 6-bromo-3,4-dimethylphenyl | B | K |
| 4-chloro-2,3-dimethylphenyl | B | K |
| 4-chloro-6-isopropyl-3-methylphenyl | B | Na |
| 4-chloro-2,3-diethylphenyl | B | K |
| 2-chloro-3,4-diethylphenyl | B | K |
| 2,4-dichloro-3,5-dimethylphenyl | B | K |
| 4-chloro-2,3,5-trimethylphenyl | B | K |
| 4-chloro-2,6-dinitrophenyl | B | K |
| 3-fluoro-4-nitrophenyl | B | K |
| 4-chloro-5-fluoro-2-nitrophenyl | E | K |
| 4-acetyl-2-fluoro-5-nitrophenyl | E | K |
| 2-fluoro-4-propionylphenyl | E | K |
| 3,4-dicarbomethoxy-2,5,6-tribromopheny | E | K |
| 2-acetyl-4-chlorophenyl | B | K |
| 2-acetyl-6-chloro-4-methylphenyl | A | Na |
| 4-chloro-2-propionylphenyl | A | Na |
| 2-acetyl-6-dimethylaminophenyl | F-1 | K |
| 4-dimethylamino-2-methylphenyl | F-1 | K |
| 4-carbomethoxy-2-dimethylaminophenyl | F-1 | K |
| 2-methoxy-5-nitro-4-propylphenyl | B | Na |
| 2-nitro-3,4,5-trimethylphenyl | B | Na |
| 2,6-dimethoxyphenyl | A | Na |
| 3,5-dimethoxy-4-methylphenyl | A | Na |
| 3,5-diethoxy-2,6-dimethylphenyl | A | Na |
| 3,4,5-trimethoxyphenyl | A | Na |
| m-Acetylphenyl | B | K |
| σ-Propionylphenyl | B | K |
| 3-carbomethoxy-5-methoxyphenyl | B | K |
| 3,4-dicarbethoxyphenyl | B | K |
| 2,6-dicarbomethoxyphenyl | B | K |
| 4-carbomethoxy-3,5-dimethyl-4-methoxyphenyl | E | K |
| 4-carbomethoxy-2,6-dichlorophenyl | E | K |
| 2-carbomethoxy-3,5-dimethoxy-4,6-dimethylphenyl | E | K |

TABLE—Continued

| R₂ | Method | D |
|---|---|---|
| 2-bromo-4-carbomethoxy-6-methoxyphenyl | E | K |
| 4-carbomethoxy-2-methoxy-3-nitrophenyl | E | K |
| 3-carbomethoxy-2,4-dinitro-6-methoxyphenyl | E | K |
| 4-indanyl | A | Na |
| 5-indanyl | A | Na |
| 5-methyl-4-indanyl | A | Na |
| 3-methyl-4-indanyl | A | Na |
| 1-methyl-5-indanyl | A | Na |
| 6-t-butyl-5-indanyl | A | Na |
| 4,6-dimethyl-5-indanyl | C | Na |
| 1,1,2,3-tetramethyl-4-indanyl | B | K |
| 5,7-dimethyl-4-indanyl | B | K |
| 5-chloro-4-indanyl | A | Na |
| 6-chloro-5-indanyl | A | Na |
| 1,7-dimethyl-4-indanyl | B | K |
| 4-(1-indanyl)phenyl | B | K |
| 2,4-(dicyclopent-2-enyl)phenyl | B | K |
| 4-(α,α-dimethylbenzyl)phenyl | B | K |
| 1-naphthyl | B | Na |
| 2-naphthyl | B | Na |
| 1-(5,6,7,8-tetrahydronaphthyl) | B | Na |
| 2-(5,6,7,8-tetrahydronaphthyl) | B | Na |
| 3-(2-methyl-4-pyronyl) | B | Na |
| 4-quinolyl | F-1 | K |
| 7-quinolyl | F-1 | K |
| 5-(1,4-naphthoquinonyl) | B | Na |
| 6-(1,4-naphthoquinonyl) | B | Na |
| 6-(coumarinyl) | C | K |
| 4-thinanphthenyl | B | K |
| 1-phenazinyl | F-1 | K |
| 2-phenazinyl | F-1 | K |
| 2-(anthraquinonyl) | B | Na |
| 4-(6-methylquinolyl) | F-1 | K |
| 1-fluorenyl | A | Na |
| 2-fluorenyl | A | Na |
| 6-(1,2-naphthoquinonyl) | B | Na |
| 7-(1,2-naphthoquinonyl) | B | Na |
| 1-anthraquinonyl | B | Na |
| 7-isoquinolyl | F-1 | K |
| 5-(1,3-benzodioxolyl) | B | K |
| 3-(4-pyronyl) | B | K |
| 1-(3-methyl-5,6,7,8-tetrahydronaphthyl) | C | Na |
| 2-(4-methyl-5,6,7,8-tetrahydronaphthyl) | C | Na |
| 1-(4,8-dimethyl-5,6,7,8-tetrahydronaphthyl) | E | K |
| 1-(3,4,6-trimethyl-5,6,7,8-tetrahydronaphthyl) | E | K |
| 2-(3,4,6-trimethyl-5,6,7,8-tetrahydronaphthyl) | E | K |
| 2-(5,5,8,8-tetramethyl-5,6,7,8-tetrahydronaphthyl) | E | K |
| 2-acetyl-5-dimethylaminophenyl | F-1 | K |
| 2-acetyl-5-ethoxyphenyl | B | Na |
| 2-butyryl-3,5-dimethylphenyl | B | K |
| 2-furyl | B | K |
| 3-furyl | B | K |
| Cyclopropyl | A | Na |
| Cyclobutyl | A | Na |
| Cyclopentyl | A | Na |
| Cyclohexyl | A | Na |
| Cycloheptyl | A | Na |
| 1-methyl-1-cyclopentyl | A | Na |
| 2-methyl-1-cyclopentyl | A | Na |
| 2,2-dimethyl-1-cyclopentyl | B | K |
| 1,3-dimethyl-1-cyclopentyl | B | K |
| 2,4-dimethyl-1-cyclopentyl | B | K |
| 1,2,5-trimethyl-1-cyclopentyl | B | K |
| 1,2,4-trimethyl-1-cyclopentyl | B | K |
| 1-isopropyl-1-cyclopentyl | B | K |
| 1-methyl-1-cyclohexyl | B | K |
| 1-ethyl-1-cyclohexyl | B | K |
| 1-isopropyl-1-cyclohexyl | B | K |
| 4-t-butyl-1-cyclohexyl | B | K |
| 2,2-dimethyl-1-cyclohexyl | B | K |
| 1,2-dimethyl-1-cyclohexyl | B | K |
| 1,3-dimethyl-1-cyclohexyl | C | Na |
| 3,5-dimethyl-1-cyclohexyl | C | Na |
| 1,2,2-trimethyl-1-cyclohexyl | D | Na |
| 1,3,3-trimethyl-1-cyclohexyl | D | Na |
| 3,3,5-trimethyl-1-cyclohexyl | E | Na |
| 1-chloro-2-indanyl | B | K |
| 2-bromo-1-indanyl | B | K |
| 1,2,6-trimethyl-1-cyclohexyl | E | Na |
| 2-methyl-6-propyl-1-cyclohexyl | E | Na |
| 1-propyl-3-methyl-1-cyclohexyl | E | Na |
| 1,4-dimethyl-1-cyclohexyl | F | K |
| 1-ethyl-2-methyl-1-cyclohexyl | F | K |
| 1,2,4,5-trimethyl-1-cyclohexyl | F-1 | K |
| 1-methyl-1-cycloheptyl | F-1 | K |
| 1-(1,2,3,4-tetrahydronaphthyl) | F-1 | K |
| 1-indanyl | B | K |
| 2-indanyl | B | K |
| 2-methyl-1-indanyl | B | K |
| 1-methyl-1-indanyl | B | K |
| 1-ethyl-1-indanyl | B | K |
| 2-bicyclo-[4.4.0]-decyl | A | Na |
| 7-adamantanyl | A | Na |
| Fenchyl | B | K |
| 1-(1-methyl-1,2,3,4-tetrahydronaphthyl) | B | K |
| 2-(3-chloro-1,2,3,4-tetrahydronaphthyl) | B | K |
| 2-piperidinoethyl | F-1 | K |
| 2-morpholinoethyl | F-1 | K |
| 3-thiomorpholinopropyl | F-1 | K |
| 2-pyrrolidinoethyl | F-1 | K |
| 3-pyrrolopropyl | F-1 | K |
| 2-(1,4,5,6-tetrahydropyrimidino)ethyl | F-1 | K |
| 3-di-(n-propylamino)-2-propyl | F-1 | K |
| 3-pyrrolidinopropyl | B | K |
| 2-dimethylaminoethyl | F | H |
| 2-dibutylaminoethyl | F | H |
| 2-pyrroloethyl | F | H |
| 2-imidazoloethyl | F | H |
| 2-(2,5-dimethylpyrrolidino)ethyl | F | H |
| 2-azetidinoethyl | F-1 | K |
| 2-azetidino-1-propyl | F-1 | K |
| 3-dimethylaminopropyl | F-1 | K |
| 3-diisopropylaminopropyl | F-1 | K |
| 3-aziridinopropyl | F-1 | K |
| 3-(N-methylpiperazino)propyl | F-1 | K |
| 3-(2-imidazolino)propyl | F-1 | K |
| 3-(1,4,5,6-tetrahydropyrimidino)propyl | F-1 | K |
| Pyrrolidinomethyl | C | Na |
| Thimorpholinomethyl | C | Na |
| Pyrrolomethyl | C | Na |
| (2-imidazolino)methyl | C | Na |
| Piperidinomethyl | C | Na |
| 2-pyrrolidino-1-propyl | C | Na |
| 2-morpholino-1-propyl | C | Na |
| 2-pyrrolo-1-propyl | C | Na |
| 2-imidazolo-1-propyl | C | Na |
| 3-imidazolo-2-propyl | C | Na |
| 3-(2-imidazolino)-2-propyl | C | Na |
| 2-(methylethylamino)ethyl | C | Na |
| 2-(methylbutylamino)ethyl | C | Na |
| 3-(methylpropylamino)ethyl | C | Na |
| 3-(methylethylamino)-2-propyl | C | Na |
| 2-(methylbutylamino)-1-propyl | C | Na |
| 2-acetamindoethyl | C | Na |
| 3-propionamidopropyl | C | Na |
| 3-acetamido-2-propyl | C | Na |
| 2-diethylamino-1-propyl | F-1 | K |
| 3-pyrrolidino-2-propyl | F-1 | K |
| 3-piperidino-2-propyl | F-1 | K |
| 3-diethylamino-2-propyl | F-1 | K |
| 3-morpholino-2-propyl | F-1 | K |
| 3-di-(n-butyl)amino-2-propyl | F-1 | K |
| 3-dimethylamino-2-propyl | F-1 | K |
| 2-(2,6-dimethylpiperidino)ethyl | F-1 | K |
| 3-(methylethylamino)propyl | F-1 | K |
| 3-piperidinopropyl | F-1 | K |
| 2-(N-methylanilino)ethyl | B | Na |
| 2-(N-ehtylanilino)ethyl | F-1 | K |
| 3-(N-methylanilino)propyl | F-1 | K |
| 3-(N-isopropylanilino)propyl | F-1 | K |
| 3-(N-methylanilino)-2-propyl | F-1 | K |
| 2-(N-methylanilino)-1-propyl | F-1 | K |
| 2-pyridylmethyl | B | Na |
| 4-pyridylmethyl | B | Na |
| 4-imidazolylmethyl | B | Na |
| 2-(N-phenylimidazolyl)methyl | B | Na |
| Phthalimidomethyl | B | Na |
| 3-(N-methyl)pyridyl | F-1 | K |
| Allyl | A | Na |
| Crotyl | A | Na |
| 3-penten-1-yl | A | Na |
| 1-penten-5-yl | B | K |
| 2-methyl-3-buten-1-yl | B | K |
| 5-hexen-2-yl | B | K |
| 1-hexen-4-yl | B | K |
| 2-hexen-4-yl | B | K |
| 3-hexen-1-yl | C | K |
| 2-methyl-3-penten-2-yl | C | Na |
| 4-methyl-4-penten-2-yl | D | K |
| 2,3-dimethyl-3-buten-1-yl | D | K |
| 2-hepten-1-yl | D | K |
| 1-hepten-4-yl | B | Na |
| 2-methyl-3-hexen-2-yl | B | Na |
| 2-methyl-4-hexen-6-yl | B | Na |
| 2-methyl-5-hexen-2-yl | E | K |
| 2-methyl-5-hexen-4-yl | F | Na |
| 3-methyl-3-hexen-2-yl | F | Na |
| 2,2-dimethyl-3-penten-1-yl | F-1 | Na |
| 2,4-dimethyl-1-penten-3-yl | F-1 | Na |
| 2,2,3-trimethyl-3-buten-1-yl | B | Na |
| 2-octen-1-yl | B | Na |
| 4-octen-1-yl | B | Na |
| Propargyl | A | Na |
| 1-butyn-3-yl | A | Na |
| 1-butyn-3-yl | A | Na |
| 1-pentyn-3-yl | A | Na |
| 3-methyl-1-pentyn-3-yl | B | Na |
| 2-hexyn-1-yl | B | Na |
| 2-heptyn-1-yl | B | Na |
| 5-methyl-3-hexyn-2-yl | B | Na |
| 3-ethyl-1-pentyn-3-yl | B | Na |
| 3-methyl-1-heptyn-3-yl | B | Na |
| 3-octyn-1-yl | C | Na |
| Benzyl | A | Na |
| p-Chlorobenzyl | A | Na |
| o-Bromobenzyl | A | Na |
| p-Methylbenzyl | B | Na |
| o-Ethylbenzyl | B | Na |
| m-Nitrobenzyl | C | K |
| m-Methoxybenzyl | C | K |
| p-Acetylbenzyl | B | K |
| p-Carbomethoxybenzyl | B | K |
| p-Fluorobenzyl | A | Na |
| o-Dimethylaminobenzyl | F-1 | K |
| Benzohydryl | B | Na |
| Trityl | B | Na |
| Cholesteryl | B | Na |
| 2-furylmethyl | D | Na |
| 2-pyridylmethyl | F | H |
| [2,2-dimethyl-1,3-dioxolon-4-yl]-methyl | B | Na |
| (2-pyrrolidono)methyl | B | Na |
| (4-imidoazolyl)methyl | F-1 | K |
| 1-indanylmethyl | B | Na |
| Phthalimidomethyl | F-1 | K |

Repetition of the above procedure but using the appropriate thiophenol $R_7SH$ in place of $R_2OH$ produces the following penicillins:

$$R_1-\underset{\underset{COSR_7}{|}}{CH}-CONHR_4$$

| $R_7$ | Method | M |
|---|---|---|
| Phenyl | A | Na |
| o-Tolyl | A | Na |
| m-Tolyl | A | Na |
| o-Isopropylphenyl | B | K |
| p-Butylphenyl | B | K |
| 2,5-dimethylphenyl | B | K |
| 3-methyl-5-ethylphenyl | B | K |
| 2-methyl-5-isopropylphenyl | B | K |
| o-Chlorophenyl | B | Na |
| p-Chlorophenyl | B | Na |
| m-Bromophenyl | B | Na |
| p-Fluorophenyl | B | Na |
| 3,4-dichlorophenyl | A | Na |
| 2,3,5-trichlorophenyl | A | Na |
| 2,4-dibromophenyl | A | Na |
| 2,4,5-tribromophenyl | A | Na |
| 6-Chloro-3-methylphenyl | B | Na |
| 4-chloro-3-methylphenyl | B | Na |
| 6-chloro-3-isopropylphenyl | B | Na |
| 4-bromo-3-methylphenyl | B | Na |
| 2-chloro-3,5-dimethylphenyl | B | K |
| 4,6-dichloro-3-methylphenyl | A | Na |
| 2,4-difluorophenyl | A | Na |
| o-Trifluoromethylphenyl | A | Na |
| p-Methoxyphenyl | C | Na |
| o-Ethoxyphenyl | C | Na |
| m-Ethoxyphenyl | C | Na |
| p-Butoxyphenyl | C | Na |
| 2-methoxy-3-methylphenyl | C | Na |
| 4-methoxy-2-methylphenyl | C | Na |
| 5-methoxy-2-methylphenyl | C | Na |
| 5-ethyl-2-methoxyphenyl | B | K |
| 4-methoxy-2,5-dimethylphenyl | B | K |
| 2,5-dimethoxyphenyl | F | H |
| 3,4-di-isopropoxyphenyl | F | H |
| 4-methoxy-2,5-dipropylphenyl | F-1 | K |
| 4-methoxy-3,5-di-isopropoxyphenyl | F-1 | K |
| 2-chloro-4-methoxyphenyl | A | Na |
| 4-bromo-3-methoxyphenyl | A | Na |
| 4-butoxy-2-chlorophenyl | E | Na |
| 2,5-dichloro-4-ethoxyphenyl | B | K |

EXAMPLE XV

The sodium and potassium salts of Examples XI–XIV are converted to the corresponding acids by careful neutralization of aqueous solutions of their salts with aqueous phosphoric acid followed by extraction of the acid form into methylisobutylketone. The methylisobutylketone solutions are washed with water, dried with anhydrous sodium sulfate, filtered and evaporated to give the free acids.

EXAMPLE XVI

The free acids of Examples XI–XV are converted to their calcium, magnesium, ammonium, procaine, N,N'-dibenzylethylenediamine, N - ethylpiperidine, dibenzylamine, 1 - ephenamine, triethylamine, N - benzyl - β-phenethylamine, N,N - bis(dehydroabietyl)ethylenediamine and benzhydrylamine salts by reaction of aqueous solutions thereof with one equivalent of the appropriate base. The salts are recovered by freeze drying.

EXAMPLE XVII

The benzyl and substituted benzyl esters of Examples XI–XIV are converted to their corresponding free acids by catalytic hydrogenation at room temperature. The general procedure comprises hydrogenating the benzyl ester in water in the presence of a suspension of prehydrogenated 10% palladium on charcoal until hydrogenation is complete. For every 0.05 mole of benzyl ester used, 5.7 g. of catalyst and 1000 ml. of water are used. When hydrogenation is complete as determined by the hydrogen uptake, the reaction mixture is filtered, the filtrate adjusted to pH 7.5 with sodium or potassium bicarbonate then evaporated to dryness under reduced pressure and below 40° C.

The products are purified by column chromatography on cellulose and eluted with butanol-ethanol-water mixture and recovered from the eluate by evaporation of the solvent.

EXAMPLE XVIII

A solution of the triethylamine salt of α-[carbo(5-indanyloxy)]-benzyl penicillin (0.5 g.) in a small volume of saturated aqueous sodium bicarbonate (5 ml.) is stirred at room temperature. Samples are withdrawn at 10 minutes, 30 minutes and then at half-hour intervals and examined by paper chromatography in the system isoamyl acetate:citrate-phosphate buffer (pH 4.5) and by bioautographs (*Bacillus subtilis*). The samples are also extracted with chloroform (3× 3 ml.), the combined extracts concentrated and the concentrate and the spent aqueous sample examined by paper chromatography and bioautographs.

The ester, which initially produces a single spot ($R_f$ 0.91) on a papergram, appears to rapidly equilibrate to two epimers as evidenced by the appearance of two spots in the papergram, $R_f$ 0.81 and 0.91.

Hydrolysis of the ester is essentially complete within two hours as evidenced by the absence of the ester on the papergram and the presence of α-carboxy benzyl penicillin along with a small amount of benzyl penicillin.

In like manner, α-[carbo(5-indanyloxy)]benzylpenicillin sodium salt, α-[carbo(1-ethoxy-2,2,2-trichloroethoxy)] benzylpenicillin sodium salt, α-(carboallyloxy)benzylpenicillin sodium salt, α-(carbocyclohexyloxy)benzylpenicillin sodium salt, and α-(carbophenylthio)benzylpenicillin are converted to the corresponding acids.

EXAMPLE XIX

A solution of the sodium salt of α-[carbo-(2-di-(n-propyl)amino)-ethoxy]benzylpenicillin in water (0.5 g. in 5 ml.) is held at room temperature for 24 hours. The pH is automatically regulated at 7.0–7.2 by the addition of sodium bicarbonate. The solution is then freeze dried and the by-product phenol removed by trituration of the residue with ethanol to give the disodium salt.

Repetition of this procedure but at 35° C. for two hours also produces the disodium salt.

By means of this procedure the following penicillin ester sodium salts are converted to their corresponding disodium salts:

α-[carbo-(5-indanyloxy)]benzylpenicillin
α-[carbo-(dicarbethoxyethoxy methoxy)]benzylpenicillin
α-(carbopropargyloxy)benzylpenicillin
α-[carbo(2-bicyclo-[4·4·0]-decyloxy)]benzylpenicillin
α-(carbophenylthio)benzylpenicillin

EXAMPLE XX

To α-carbo[(2-N-methylanilino)ethoxy]benzylpenicillin sodium salt (0.1 g.) in chloroform (5 ml.) there is added a solution of citrate buffer (pH 5.5, 5 ml.) and the resulting mixture thoroughly shaken for 75 minutes. The aqueous layer is checked every 15 minutes by paper chromatography using the system isoamyl acetate:citrate-phosphate buffer (pH 4.5) and bioautographs (*Bacillus subtilis*).

Within 15 minutes α-carboxybenzyl penicillin is present in the aqueous phase together with a high proportion of the starting ester. After 60 minutes no ester is present in the aqueous phase. The major product observed is α-carboxybenzylpenicillin. A small amount of benzylpenicillin, its degradation product, is also present.

The α-carboxybenzyl penicillin is isolated by lyophilization and the crude product is further purified by chromatography on Sephadex LH 20 (a cross-linked dextrose) available from HB Pharmacia, Uppsala, Sweden.

EXAMPLE XXI

A tablet base is prepared by blending the following ingredients in the proportion by weight indicated.

| | |
|---|---|
| Sucrose, U.S.P. | 80.3 |
| Tapioca starch | 13.2 |
| Magnesium stearate | 6.5 |

Sufficient α-[carbo(2-di-(n-propyl)amino)ethoxy]benzylpenicillin sodium salt is blended into the base to provide tablets containing 25, 100 and 250 mg. of active ingredient.

EXAMPLE XXII

Capsules containing 25, 100 and 250 mg. of active ingredient are prepared by blending sufficient α-[carbo(5-indanyloxy)]benzylpenicillin sodium salt in the following mixture (proportions given in parts by weight).

| | |
|---|---|
| Calcium carbonate, U.S.P. | 17.6 |
| Dicalcium phosphate | 18.8 |
| Magnesium trisilicate | 5.2 |
| Lactose, U.S.P. | 5.2 |
| Potato starch | 5.2 |
| Magnesium stearate A | 0.8 |
| Magnesium stearate B | 0.35 |

EXAMPLE XXIII

A suspension of α-[carbo(1-ethoxy-2,2,2-trichloroethoxy)]benzylpenicillin sodium salt is prepared with the following composition:

| | | |
|---|---|---|
| Penicillin compound | g | 31.42 |
| 70% aqueous sorbitol | g | 714.29 |
| Glycerine, U.S.P. | g | 185.35 |
| Gum acacia (10% solution) | ml | 100 |
| Polyvinyl pyrrolidone | g | 0.5 |
| Butyl parahydroxybenzoate | g | 0.172 |
| Propyl parahydroxybenzoate | g | 0.094 |
| Distilled water to make one liter. | | |

Various sweetening and flavoring agents may be added to this suspension, as well as acceptable colors. The suspension contains approximately 25 mg. of penicillin compound per milliliter.

EXAMPLE XXIV

The sodium salt of α-[carbo-(3-di-(n-propyl)amino)propoxy]benzylpenicillin (10 g.) is intimately mixed and ground with sodium citrate (4% by weight). The ground, dry mixture is filled into vials, sterilized with ethylene oxide and the vials sterilely stoppered. For parenteral administration, sufficient water is added to the vials to form solutions containing 25 mg. of active ingredient per ml.

PREPARATION A

Malonic acids

The following aryl malonic acids not previously described in the literature are prepared by the method of Wallingford et al., J. Am. Chem. Soc. 63, 2056–2059 (1964), which comprises condensing an alkyl carbonate, usually diethyl carbonate, with an equimolar proportion of the desired ethyl aryl acetate in the presence of an excess (4–8 times) of sodium ethylate with continuous removal of by-product alcohol from the reaction mixture. The esters thus produced are hydrolyzed to the acid by known methods.

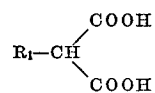

| R₁ | R₁ |
|---|---|
| σ-Methoxyphenyl | 3-pyridyl |
| m-Methoxyphenyl | 4-pyridyl |
| p-Methoxyphenyl | σ-Butoxyphenyl |
| σ-Trifluoromethylphenyl [1] | σ-Dimethylaminophenyl |
| m-Trifluoromethylphenyl | σ-Diethylaminophenyl |
| p-Trifluoromethylphenyl | m-Dimethylaminophenyl |
| σ-Isopropylphenyl | p-Dimethylaminophenyl |
| 3-furyl | |

[1] The necessary σ-trifluoromethylphenylacetic acid is prepared from σ-trifluoromethylbenzonitrile, by the procedure of Corse, et al., J. Am. Chem. Soc. 70, 2841 (1948) which comprises: (a) conversion of the nitrile to σ-trifluoromethylacetophenone by a Grignard reaction with methylmagnesium iodide followed by hydrolysis; (b) reaction of the acetophenone with sulfur and morpholine at 135° C. for 16 hours followed by treatment with glacial acetic acid and hydrochloric acid.

PREPARATION B

Aminoisopropanols

The following aminoisopropanols are prepared by the reaction of propylene oxide with the appropriate amine. The procedure in general comprises reacting the propylene oxide with an aqueous solution of the amine in a 1.0 to 1.4 molar ratio in a sealed tube. The sealed tube is shaken and allowed to stand overnight, then heated to 80° C. for six hours, then at 95° C. for four hours. The tube is then cooled, the contents removed and the aminoisopropanol salted out with potassium carbonate.

The product, if liquid, is separated, dried with solid potassium hydroxide then distilled under reduced pressure. The product, if solid, is filtered off and recrystallized from a suitable solvent.

| NR₅R₆ | NR₅R₆ |
|---|---|
| Dimethylamino | Piperidino |
| Diethylamino | Pyrrolidino |
| Di-n-propylamino | Pyrrolo |
| Diisopropylamino | Morpholino |
| Di-n-butylamino | Thiomorpholino |
| 1,4,5,6-tetrahydropyrimidino | Imidazolino |
| N-ethylpiperazino | Imidazolidino |

PREPARATION C

2-aminopropanols

The following 2-aminopropanols having the formula

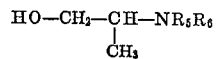

wherein NR₅R₆ represents a di(lower alkyl)amino or a heterocyclic group are prepared by the procedure of Moffett, Org. Syn., Coll. vol. IV, p. 834 which comprises lithium aluminum hydride reduction of the appropriate precursor ester of the formula

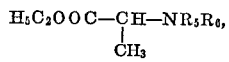

said esters being prepared as described by Moffett, Org. Sny., Coll. vol. IV, p. 466 by reaction of the desired amine with ethyl α-bromopropionate.

| —NR₅R₆ | —NR₅R₆ |
|---|---|
| Di(n-propyl) amino | Piperidino |
| Di(n-butyl) amino | Morpholino |
| Diisopropylamino | Thiomorpholino |
| 1,4,5,6-tetrahydropyrimidino | Pyrrolo |
| N-methylpiperazino | Imidazolino |
| N-n-butylpiperazino | Imidazolidino |

PREPARATION D

Preparation of (lower)alkylsulfinylalkanols

The appropriate (lower)alkylmercaptoalkanol is mixed with an equimolar proportion of m-chloroperbenzoic acid in sufficient chloroform to permit easy stirring. The mixture is refluxed for two hours, then cooled overnight and filtered to remove m-chlorobenzoic acid. The filtrate is then concentrated to about one-third volume, allowed to stand overnight and again filtered to remove m-chlorobenzoic acid. The filtrate was added to water (3 to 4 ml. per ml. of filtrate), stirred thoroughly and again filtered. The product is recovered from the filtrate by removal of the solvent. In this manner the following compounds are prepared:

$$HO-Z_1-\overset{\overset{O}{\|}}{S}-R_1$$

| $Z_1$ | $R_1$ |
|---|---|
| —$CH_2$—$CH_2$— | $CH_3$ |
| —$CH_2$—$CH_2$— | $C_2H_5$ |
| —$CH_2$—$CH_2$— | $C_4H_9$ |
| —$CH_2$—$CH_2$— | i-$C_4H_9$ |
| —$CH_2$—$CH_2$—$CH_2$— | $C_3H_7$ |
| —$CH_2$—$CH_2$—$CH_2$—$CH_2$— | $C_2H_5$ |
| —$CH_2$—$CH(CH_3)$— | $CH_3$ |

Other peracids such as acetic acid, performic acid and monoperphthalic acid, and hydrogen peroxide in glacial acetic acid can be used in place of m-chloroperbenzoic acid. This latter peracid is, however, favored since the by-product m-chlorbenzoic is easily removed and over-oxidation of the mercaptan to the dioxide avoided.

PREPARATION E

Preparation of (lower)alkylsulfonylalkanols (1) The desired (lower)alkylmercaptoalkanol is oxidized according to the method of Preparation B but using two molar proportions of m-chlorobenzoic acid instead of one as oxidizing agent.

(2) Alternatively, the (lower)alkylsulfinylalkanols of preparation B are further oxidized with an equimolar proportion of m-chloroperbenzoic acid to the corresponding sulfonyl compounds. The former method is preferred because of the greater availability of the initial mercaptans relative to the sulfinyl compounds.

The following compounds are thus prepared:

$$HO-Z_1-\overset{\overset{O}{\|}}{\underset{\underset{O}{\|}}{S}}-R^1$$

| $Z_1$ | $R^1$ | Method |
|---|---|---|
| —$CH_2$—$CH_2$— | $CH_3$ | 1 |
| —$CH_2$—$CH_2$— | $C_2H_5$ | 2 |
| —$CH_2$—$CH_2$— | $C_4H_9$ | 1 |
| —$CH_2$—$CH_2$—$CH_2$— | $C_3H_7$ | 1 |
| —$CH_2$—$CH_2$—$CH_2$—$CH_2$— | $C_2H_5$ | 1 |
| —$CH_2$—$CH(CH_3)$— | $CH_3$ | 1 |

What is claimed is:
1. A compound of the formula

$$\begin{array}{c}R_1-C=C=O\\|\\C=O\\|\\O-X''\end{array}$$

wherein $R_1$ is selected from the group consisting of: phenyl and substituted phenyl wherein the substituent is selected from the group consisting of (lower alkyl), chloro, bromo, lower alkoxy, di(lower)alkylamino and trifluoromethyl; and $X''$ is selected from the group consisting of

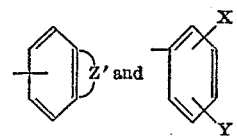

wherein $Z'$ is —$(CH_2)_3$— and wherein X is lower alkyl and Y is selected from the group consisting of hydrogen, lower alkyl and chloro.

2. The compound of claim 1 wherein $R_1$ is phenyl and $X''$ is substituted phenyl of the formula

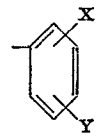

wherein X is lower alkyl and Y is selected from the group consisting of hydrogen, lower alkyl and chloro.

3. The compound of claim 2 wherein X is isopropyl and Y is hydrogen.

4. The compound of claim 2 wherein each of X and Y is lower alkyl.

5. The compound of claim 2 wherein X is lower alkyl and Y is chloro.

6. The compound of claim 3 wherein X is o-isopropyl and Y is hydrogen.

7. The compound of claim 4 wherein each of X and Y is methyl.

8. The compound of claim 5 wherein X is methyl and Y is chloro.

References Cited

Ziegler et al., Monatsch. Chemie, vol. 98, No. 3 (1967), pp. 1104–7.

JAMES A. PATTEN, Primary Examiner

U.S. Cl. X.R.

260—472, 473 R, 473 F, 476 R, 476 C, 477, 585.5, 515 A

UNITED STATES PATENT OFFICE
CERTIFICATE OF CORRECTION

Patent No. 3,790,620   Dated February 5, 1974

Inventor(s) Kenneth Butler

It is certified that error appears in the above-identified patent and that said Letters Patent are hereby corrected as shown below:

Column 2, lines 32-33, the formula reading

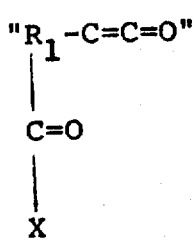   should read   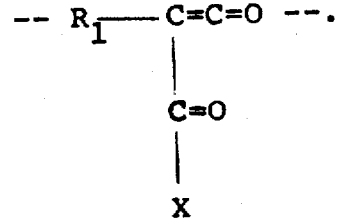

Column 5, lines 15-18, that portion of the formula reading

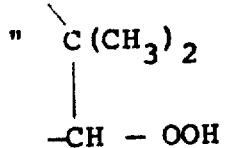   should read   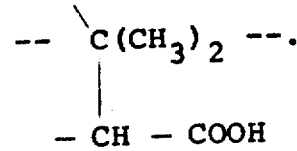

Column 7, line 27, "acrylation" should read -- acylation --.

Column 43, line 26, "m-chlorbenzoic" should read -- m-chlorobenzoic acid --.

Column 43, line 32, "B" should read --D--.

Column 43, line 33, "m-chlorobenzoic" should read -- m-chloroperbenzoic --.

Column 43, line 36, "B" should read -- D --.

Signed and sealed this 10th day of September 1974.

(SEAL)
Attest:

McCOY M. GIBSON, JR.
Attesting Officer

C. MARSHALL DANN
Commissioner of Patents